United States Patent [19]

Yamamoto et al.

[11] Patent Number: 5,728,941
[45] Date of Patent: Mar. 17, 1998

[54] MISFIRE DETECTING APPARATUS USING DIFFERENCE IN ENGINE ROTATION SPEED VARIANCE

[75] Inventors: Kenji Yamamoto, Anjo; Akira Ichikawa, Chiryu; Keiji Wakahara, Kariya, all of Japan

[73] Assignee: Denso Corporation, Kariya, Japan

[21] Appl. No.: 731,050

[22] Filed: Oct. 9, 1996

[30] Foreign Application Priority Data

| Oct. 9, 1995 | [JP] | Japan | 7-261677 |
| Oct. 16, 1995 | [JP] | Japan | 7-266058 |
| Jun. 20, 1996 | [JP] | Japan | 8-160138 |
| Aug. 9, 1996 | [JP] | Japan | 8-211619 |

[51] Int. Cl.$^6$ .................................................. G01M 15/00
[52] U.S. Cl. .................. 73/116; 73/117.3; 123/419; 123/436; 364/431.07
[58] Field of Search ................... 73/116, 117.2, 73/117.3; 364/431.07, 431.08; 123/419, 425, 436

[56] References Cited

U.S. PATENT DOCUMENTS

| 4,445,326 | 5/1984 | Lyon | 73/117.3 |
| 5,041,980 | 8/1991 | Maddock et al. | 364/431.07 |
| 5,237,862 | 8/1993 | Mangrulkar et al. | 73/116 |
| 5,245,865 | 9/1993 | Kayanuma | 73/117.3 |
| 5,245,866 | 9/1993 | Hashiguchi et al. | 364/431.07 |
| 5,263,364 | 11/1993 | Nakayama et al. | 364/431.07 |
| 5,275,037 | 1/1994 | Nakayama et al. | 73/117.3 |
| 5,287,282 | 2/1994 | Imai | 123/436 |
| 5,307,670 | 5/1994 | Imai et al. | 73/117.3 |
| 5,353,636 | 10/1994 | Sakurai et al. | 73/117.3 |
| 5,426,587 | 6/1995 | Imai et al. | 364/431.05 |
| 5,499,537 | 3/1996 | Nakayama et al. | 73/117.3 |
| 5,528,929 | 6/1996 | Ikebuchi | 73/116 |
| 5,539,644 | 7/1996 | Ichikawa et al. | 364/431.08 |

FOREIGN PATENT DOCUMENTS

| 3-275962 | 12/1991 | Japan . |
| 4-110632 | 4/1992 | Japan . |
| 4-318256 | 11/1992 | Japan . |
| 6-200817 | 7/1994 | Japan . |

*Primary Examiner*—George M. Dombroske
*Attorney, Agent, or Firm*—Nixon & Vanderhye P.C.

[57] ABSTRACT

In a misfire detecting apparatus of an internal combustion engine, a difference in rotational-speed variance from a rotation signal NE of a crankshaft and the difference in rotational-speed variance is compared with a predetermined misfire criterion value in order to make a determination as to whether a misfire has occurred in the internal combustion engine. The misfire detecting apparatus is applied to a six-cylinder internal combustion engine. An ECU employed in the misfire detecting apparatus is used for calculating differences in rotational-speed variance by using a 720° CA, a 360° CA, and a 120° CA differential techniques. The differences in rotational-speed variance computed by using the differential techniques are each compared with a respective predetermined misfire criterion value. An outcome of the comparison is used for updating a misfire count. The ECU makes a final determination as to whether a misfire has occurred in the internal combustion engine from data of a plurality of such misfire counts.

29 Claims, 21 Drawing Sheets

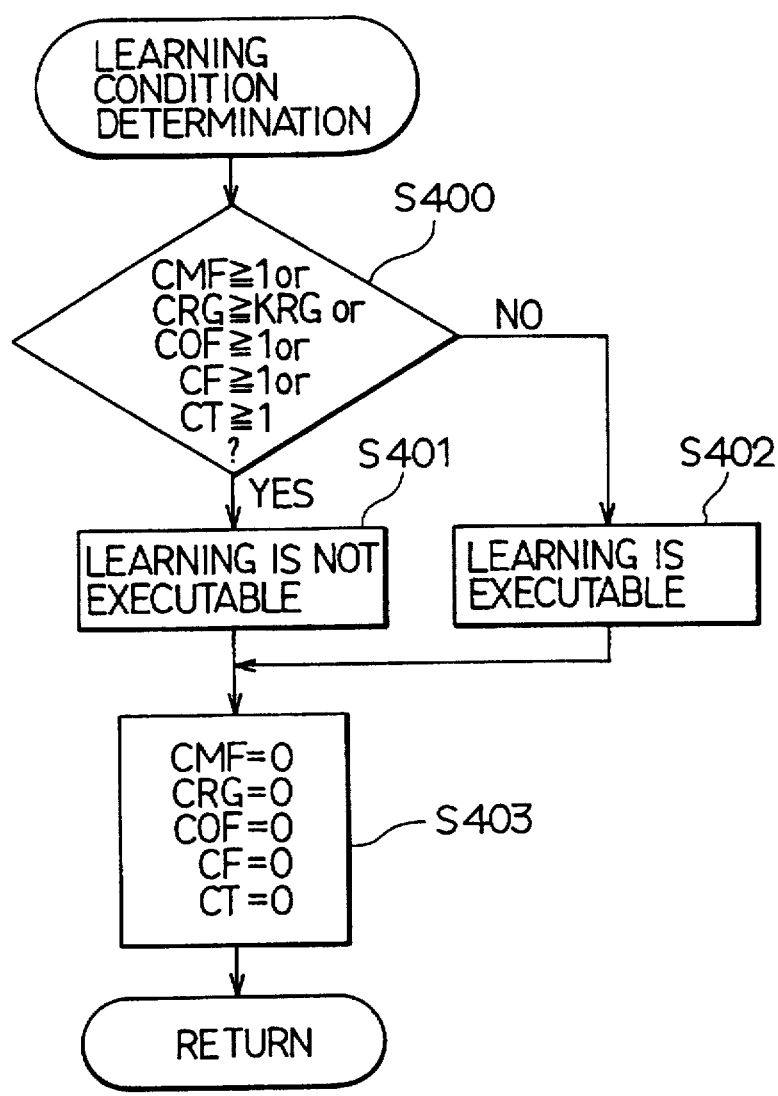

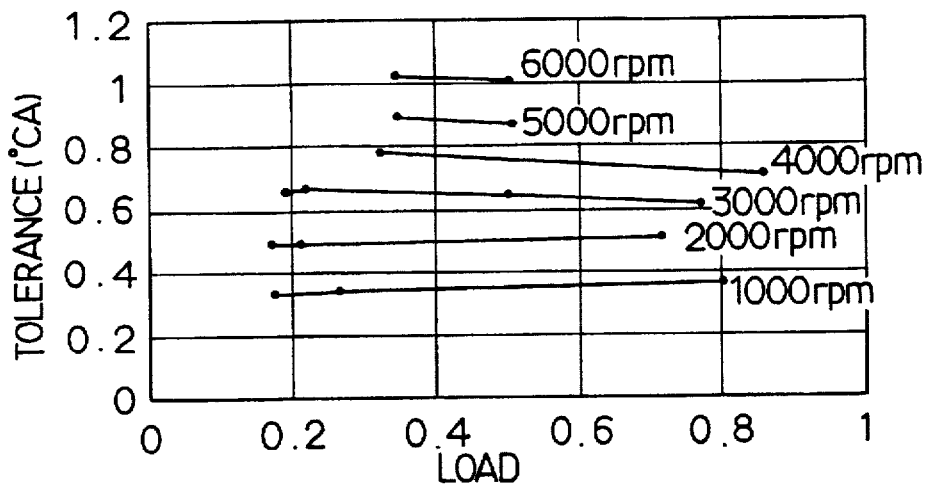
FIG. 14A #2, #5-CYLINDERS
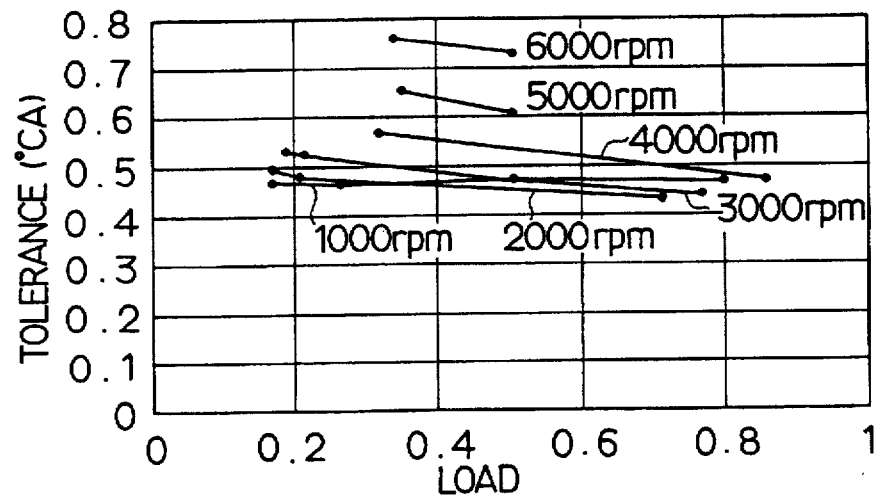
FIG. 14B #3, #6-CYLINDERS
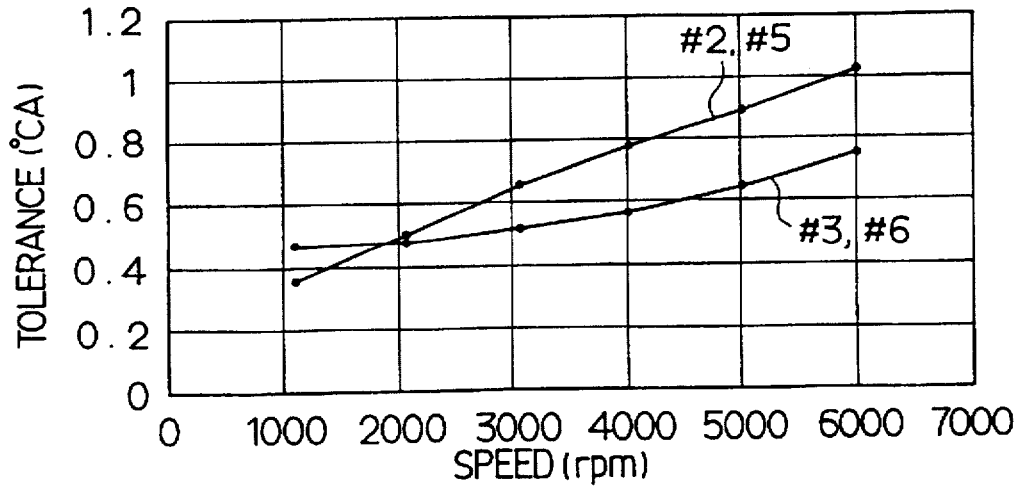
FIG. 15

MISFIRE DETECTING APPARATUS USING DIFFERENCE IN ENGINE ROTATION SPEED VARIANCE

BACKGROUND OF THE INVENTION

1. Field of the Invention

The present invention relates to a misfire detecting apparatus of an internal combustion engine for detecting the occurrence of a misfire in the internal combustion engine by monitoring variations in rotational speed of the output shaft of the internal combustion engine.

2. Related Art

In general, when a misfire occurs in an internal combustion engine during a combustion stroke in a cylinder, the crank angular speed, that is, the rotational angular speed of the crankshaft which serves as an output shaft of the internal combustion engine decreases. Therefore, by monitoring variations in crank angular speed, the occurrence of a misfire in each cylinder can be detected.

However, the crank angular speed being measured varies from cylinder to cylinder even if ignition occurs normally in each cylinder. Such variations in crank angular speed are caused by differences in fuel consumption among cylinders or differences in characteristics of sensors for detecting the crank angle among the cylinders. It is likely that an erroneous determination as to whether or not a misfire has occurred in the internal combustion engine can be made by mistake for a cylinder with a low measured crank angular speed in spite of the fact that ignition occurs normally in the cylinder.

In order to solve this problem, in a conventional misfire detecting apparatus, the following measures are taken:

(A) At a fuel-cut time not affected by the presence/absence of a misfire, deviations in crank angular speed among cylinders are found. Then, a misfire criterion value for a crank angular speed at a fuel injection time is corrected in accordance with the found values of the deviations in crank angular speed among cylinders. This technique is disclosed in Japanese Patent Laid-open No. Hei 4-265475.

(B) At a normal time, deviations in crank angular speed among cylinders are found. Then, under running conditions in which the found values of the deviations are different from each other, normal ignition can be assumed at the time the deviations become equal to each other. The values of the deviations found at that time are used for correcting the crank angular speed. This technique is disclosed in Japanese Patent Laid-open No. Hei 4-110632.

In this way, by learning the deviations in crank angular speed among the cylinders (or the deviations in rotational speed) due to causes other than the occurrence of a misfire, effects of differences in fuel consumption among cylinders or differences in characteristics of sensors for detecting the crank angle among the cylinders can certainly be obviated.

However, such deviations in crank angular speed among cylinders (or deviations in rotational speed) change in accordance with running conditions of the internal combustion engine such as the rotational speed of the internal combustion engine.

Thus, the effects of differences in fuel consumption among the cylinders or differences in characteristics of sensors for detecting the crank angle among the cylinders can not necessarily be eliminated for all operating conditions of the internal combustion engine simply because the deviations in crank angular speed among the cylinders (or the deviations in rotational speed) due to causes other than the occurrence of a misfire have been learned.

In addition, there is also a misfire detecting apparatus of an internal combustion engine of this type disclosed in Japanese Patent Laid-open No. Hei 4-365958. In this misfire detecting apparatus, the occurrence of a misfire is detected by monitoring differences in rotational speed (or crank angular speed) between two cylinders in which consecutive combustion strokes are made in a row. In general, when a misfire occurs in an internal combustion engine during a combustion stroke in a cylinder, the crank angular speed, that is, the rotational angular speed of the crankshaft which serves as an output shaft of the internal combustion engine decreases and, therefore, by monitoring variations in crank angular speed, the occurrence of a misfire in each cylinder can be detected.

In particular, in this misfire detecting apparatus, a first variation is computed as a difference in rotational speed (or crank angular speed) between first two cylinders in which consecutive combustion strokes are made in a row and, at the same time, a second variation in rotational speed (or crank angular speed) is computed as a difference in rotational speed between second two cylinders which operationally lead ahead of the first two cylinders by a crank angle of 360° CA. The occurrence of a misfire in the internal combustion engine is then determined in accordance with a difference between the computed first and second variations. In order to find a difference in variation in rotational speed (or crank angular speed) between two cylinders operationally separated from each other by 360° CA, it is necessary to monitor differences in rotational speed (or crank angular speed) of two cylinders in opposing strokes of an internal combustion engine having an even number of cylinders. In this case, the variations in rotational speeds with about the same period of rotational variation (or about the same level of variations) can be used as parameters. As a result, the number of erroneous detections of misfires can be reduced. It should be noted that, by the two cylinders in opposing strokes, two cylinders in which timings of combustion stroke thereof are separated from each other by one rotation of the crankshaft are meant.

With such a technique, however, a pattern of undetectable misfires exists, depending upon the combination of variations in rotational speed, between which a difference is computed. That is, when both the cylinders operationally separated from each other by 360° CA, that is, when both the two opposing cylinders incur consecutive misfires, the variations in rotational speed kill each other to give an unobservable difference therebetween, making the occurrence of the misfires undetectable. The problem of such an undetectable occurrence of a misfire is not limited only to the combination of cylinders operationally separated from each other by 360° CA. The problem is also encountered as well in the calculation of a difference in rotational-speed variation between two pairs of cylinders in another combination. Also in this case, a pattern of undetectable consecutive misfires occurring in a row in a specific cylinder exists, also resulting in a state in which misfires remain undetected.

In addition, a technique for detecting the occurrence of a misfire based on the fact that, if a misfire occurs while the internal combustion engine is rotating, the rotational speed decreases, is also disclosed in Japanese Patent Laid-open No. Hei. 3-275962. According to this technique, a misfire determination segment (interval) having a predetermined crank-angle width is set for each combustion stroke. During a rotation through the misfire determination segment, a pulse of a signal generated for every predetermined crank angle is output by a sensor. The time required by the crankshaft to rotate over the misfire determination segment, that is, the length of the misfire determination segment measured in terms of time is calculated by summing up gaps between the pulses, that is, by counting the number of pulses. The calculated length (or time duration) of the misfire determination segment is compared with the value calculated in the immediately previous counting to find a difference in time duration between the two misfire determination segments, that is, to find a variation in rotational speed. If the decrease in rotational speed (or the change in time duration of the misfire determination segment) exceeds a misfire criterion value, a misfire is determined to have occurred in the internal combustion engine. In the case of a conventional ordinary misfire detecting apparatus employed in a four cylinder internal combustion engine, for example, the misfire determination segment is set at a value in the range 145° CA ATDC to 235° CA ATDC (that is, 90° CA ATDC) or in the range 175° CA ATDC to 295° CA ATDC (that is, 120° CA ATDC).

However, the degree to which the rotational speed of the internal combustion engine decreases after the occurrence of a misfire in a low-speed zone is different from that in a high-speed zone. In addition, the higher the speed, the more the position of the lowest point (that is, the crank angle) of the decreased internal combustion engine rotational speed is shifted to the fuel-lean side. The higher the speed, the longer the time it takes to restore the rotational speed of the internal combustion engine from the lowest point. Thus, if the position (the crank angle) of the misfire determination segment is fixed as is the case with the conventional misfire detecting apparatus, the position of lowest point may get out off the misfire determination segment or is shifted to a location in close proximity to the boundary of misfire determination segment. As a result, the accuracy of detecting the decrease in rotational speed deteriorates, degrading the misfire detection accuracy itself.

SUMMARY OF THE INVENTION

It is thus a first object of the present invention to detect all misfire patterns generated in an internal combustion engine with a high degree of accuracy.

It is a second object of the present invention to detect the occurrence of a misfire in an internal combustion engine with a very high degree of accuracy without regard to operating conditions of the internal combustion engine. It is an additional object of the present invention to detect the occurrence of a misfire in an internal combustion engine with a high degree of accuracy by using a signal output by an air-fuel ratio sensor.

In addition, it is a third object of the present invention to detect the occurrence of a misfire in an internal combustion engine with a high degree of detection accuracy over the entire rotational-speed range.

In order to achieve the first object described above, differences in rotational speed between cylinders operationally separated from each other by a multiple of units are computed for a plurality of cylinder combinations where a unit is defined as a crank angle obtained by dividing a crank angle by which the crankshaft rotates to complete one combustion cycle in a cylinder by the number of cylinders in the internal combustion engine. Then, the computed differences in rotational speed between cylinders operationally separated from each other by a multiple of units for the cylinder combinations are each compared with a predetermined misfire criterion value.

In such a method for detecting a misfire whereby differences in rotational speed between individual cylinders are measured, however, the differences in rotational speed between cylinders may be cancelled out each other in the event of consecutive misfires occurring in a row in specific cylinders, making it impossible to detect the misfires. None the less, the calculation of the differences based on a two-stage differential technique is carried out for a plurality of cylinder combinations and results of the calculation are individually used for making a determination as to whether or not a misfire has occurred. Thus, even if one difference in variation in rotational speed is cancelled out due to consecutive occurrences of misfires, the occurrences of misfires can still be detected by another difference in rotational-speed variation. As a result, it is possible to detect all misfire patterns generated in an internal combustion engine with a high degree of accuracy.

In order to achieve the second objects described above, the present invention provides a misfire detecting apparatus which learns deviations in crank angular speed for each cylinder (that is, variations in rotational angular speed of the internal combustion engine output shaft) for each operating condition of the internal combustion engine. The misfire detecting apparatus learns variations in rotational angular speed for each cylinder of the output shaft of the internal combustion engine for each operating condition of the internal combustion engine. It should be noted that the misfire detecting apparatus does not necessarily have to learn the variations in rotational angular speed themselves. Instead, the misfire detecting apparatus can learn values equivalent to the variations in rotational angular speed such as deviations in rotation angle.

The variation in rotational angular speed for each cylinder (or a value equivalent to the variation in rotational angular speed) is compared with a predetermined misfire criterion value in order to detect the occurrence of a misfire. By correcting the misfire criterion value or the variation in rotational angular speed for each cylinder (or a value equivalent to the variation in rotational angular speed) using a learned value for the corresponding operating condition every time the comparison is made, a high misfire detection accuracy can be maintained without regard to the operating condition of the internal combustion engine.

When misfires occur in two cylinders operationally separated from each other by 360° CA, desirably, a determination of a normal ignition of the internal combustion engine is effective if the determination is based on the fact that, while the feedback (F/B) control based on the air-fuel ratio is being executed, the sum of air-fuel ratio coefficients and the average value of the air-fuel ratio coefficients or, with control of a learning process of the air-fuel ratio coefficients executed, the sum of the air-fuel ratio coefficients and learned values of the air-fuel ratio coefficients is leaner in fuel than a predetermined value. It should be noted that, in this case, the predetermined value to be compared with the sum of the air-fuel ratio coefficients and the average value of the air-fuel ratio coefficients (or the sum of the air-fuel ratio coefficients and learned values of the air-fuel ratio coefficients) can be an initial tolerance obtained from characteristics of the air-fuel ratio sensor or internal combustion engine characteristics of the individual internal combustion engine.

In addition, in such a case, with the air-fuel ratio sensor activated, the internal combustion engine is determined to have normal ignitions from the fact that the signal output by the air-fuel ratio sensor does not exist on the lean side. In particular, with an oxygen ($O_2$) sensor used as the air-fuel ratio sensor, the internal combustion engine is determined to have normal ignitions from the fact that the period of a signal output by the activated oxygen ($O_2$) sensor is within a predetermined range (including an implication of not being smaller than a predetermined value). With a linear air-fuel ratio sensor serving as the air-fuel ratio sensor, the internal combustion engine is determined to have normal ignitions from the fact that the signal (including an average of the values of the signal or an averaged value thereof) output by the linear air-fuel ratio sensor is not leaner than a predetermined value.

In order to achieve the third object, the present invention provides a misfire detecting apparatus that changes the position (the crank angle) of the misfire determination segment in accordance with the rotational speed of the internal combustion engine.

BRIEF DESCRIPTION OF THE DRAWINGS

FIG. 13 is a flowchart of a routine for making a determination as to whether or not conditions for executing a tolerance learning process are satisfied;

FIGS. 14A and 14B are a set of graphs representing relations between the load and the deviation in crank angle (or the tolerance) between cylinders;

FIG. 15 is a set of graphs representing relations between the rotational speed and the deviation in crank angle (or the tolerance) between cylinders;

DETAILED DESCRIPTION OF THE PREFERRED EMBODIMENTS

The present invention will become more apparent from the following detailed description of presently preferred embodiments with reference to accompanying drawings.

(First Embodiment)

Figure 1:
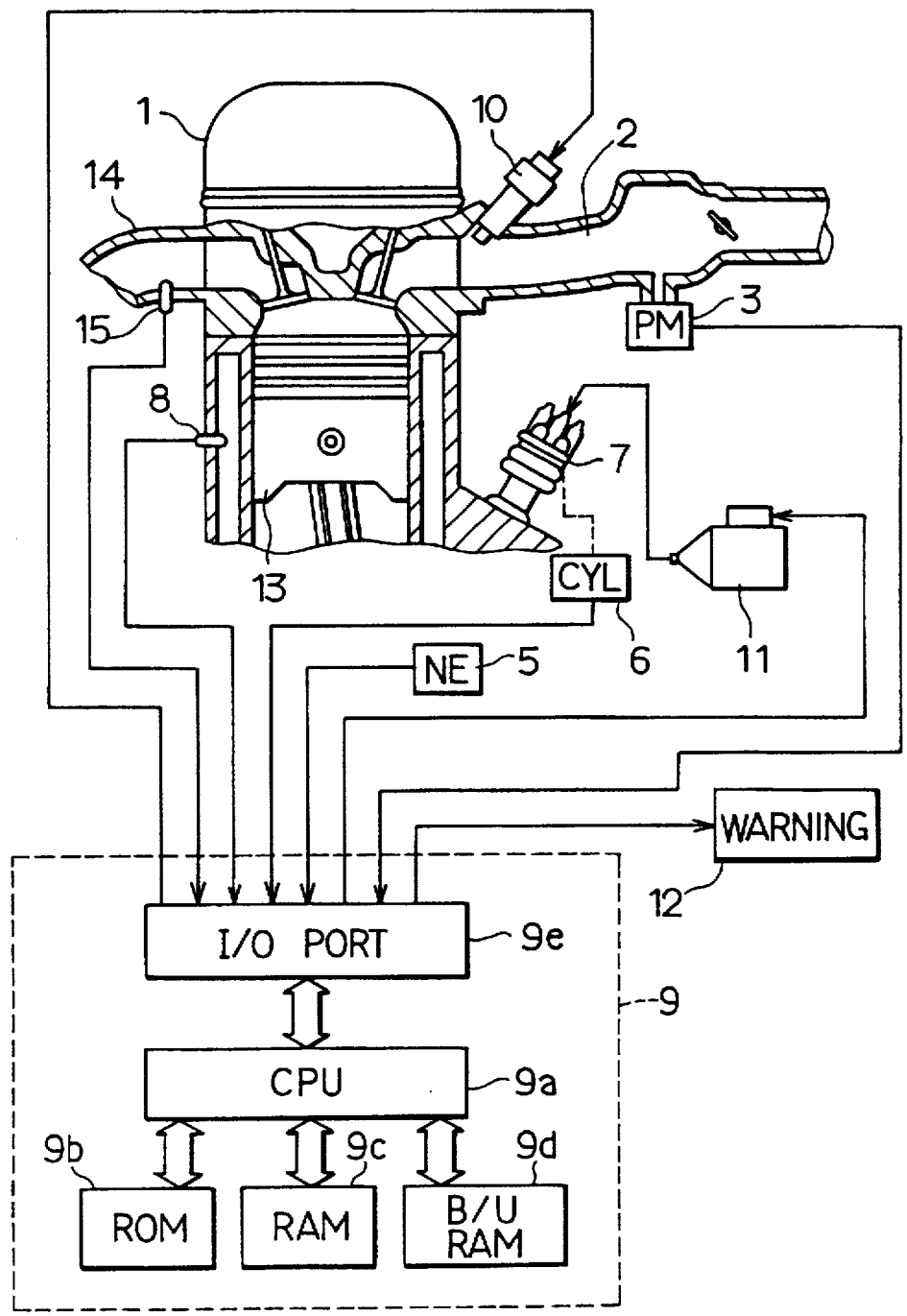
FIG. 1 is a block diagram showing a misfire detecting apparatus according to a first embodiment of the present invention.

FIG. 1 is a block diagram showing a misfire detecting apparatus according to a first embodiment of the present invention.

A misfire detecting apparatus of an internal combustion engine according to the present embodiment is employed in a six cylinder combustion internal combustion engine. In the misfire detecting apparatus according to the first embodiment as shown in FIG. 1, reference numeral 1 denotes an internal combustion engine having six cylinders: a first cylinder (or cylinder #1) to a sixth cylinder (or cylinder #6). It should be noted that, in the internal combustion engine 1 according to the first embodiment, the ignition sequence is assumed to be from cylinder #1 → cylinder #2 → cylinder #3 → cylinder #4 → cylinder #5 → cylinder #6 just for the sake of convenience in the description to follow.

The internal combustion engine 1 is provided with an intake pipe 2 for leading air from an air cleaner which is not shown in the figure to the internal combustion engine 1. In addition, the intake pipe 2 is equipped with an intake-pipe pressure-sensor 3 for detecting successively the air pressure PM inside the intake pipe 2. The detected air pressure PM in the intake pipe 2 is supplied to an electronic control unit 9 to be used as a parameter indicating the operating state of the internal combustion engine 1. The electronic control unit 9 is referred to hereafter as an ECU.

The crankshaft of the internal combustion engine 1, which is also not shown in the figure, is provided with a rotation-angle sensor 5 for outputting a rotation signal NE for each predetermined crank angle of the crankshaft. The rotational speed of the internal combustion engine 1 and other quantities can be computed from the rotation signal NE output by the rotation-angle sensor 5. Much like the detected intake-pipe air pressure PM, the rotation signal NE is also supplied to the ECU 9 as a parameter indicating the operating state of the internal combustion engine 1.

The internal combustion engine 1 also includes a distributor 7 for controlling the ignition timing for each cylinder and the ignition sequence. The distributor 7 has an embedded reference-position sensor 6 for outputting a reference-position signal CYL used for distinguishing the cylinders from each other. Each time a piston 13 of the first cylinder of the internal combustion engine 1, for example, reaches the top position, that is, the compression top dead center (or TDC #1), the reference-position signal CYL is supplied to the ECU 9 much like the intake-pipe air pressure PM and the rotation signal NE. It should be noted that, driven by a rotation power generated by the internal combustion engine 1, the distributor 7 itself is normally rotating at half the rotational speed of the crankshaft.

The internal combustion engine 1 is equipped with a water-temperature sensor 8 for detecting the temperature of cooling water circulating along a cooling-water jacket in the internal combustion engine 1. The internal combustion engine 1 also has a gas exhausting pipe 14 which is provided with an oxygen ($O_2$) sensor 15 for detecting an air-fuel ratio, from the rich (R) side to the lean (L) side, from the concentration of oxygen in the exhaust gas. A signal representing the temperature of the cooling water detected by the water-temperature sensor 8 and a signal indicating the air-fuel ratio from the rich (R) side to the lean (L) side are also supplied to the ECU 9 as parameters indicating the operating state of the internal combustion engine 1.

As shown in FIG. 1, the ECU 9 which receives the detection signals from the water-temperature sensor 8, the oxygen ($O_2$) sensor 15, the intake-pipe pressure sensor 3, the rotation-angle sensor 5 and the reference-position sensor 6 comprises a CPU (Central Processing Unit) 9a, a read-only memory (ROM) unit 9b for storing, among other data, a control program and control constants required in processing carried out by the CPU 9a, a RAM unit 9c serving as a so-called data memory for temporarily storing processed data and the like, a back-up RAM unit 9d with contents thereof backed up by a battery not shown in the figure and an I/O port 9e for inputting and outputting signals from and to external apparatuses.

The ECU 9 executes the following main processings (A) and (B):

(A) Compute proper control quantities for a fuel system and an ignition system of the internal combustion engine 1 from the detection signals output by the sensors described above and output control signals for properly controlling components such as an injector 10 serving as a fuel injecting means and an igniter 11 serving as an ignition means.

(B) Detect whether or not a misfire has occurred in each cylinder of the internal combustion engine 1 from a variety of signals output by the sensors.

It should be noted that, when driving the injector 10 in the main processing (A) described above, the ECU 9 also executes the generally known air-fuel ratio feedback (F/B) control based on the air-fuel ratio obtained from a signal output by the oxygen ($O_2$) sensor 15. In addition, in the detection of whether or not a misfire has occurred in each cylinder of the internal combustion engine during the main processing (B) described above, typically, a warning lamp 12 is turned on to notify the driver or other passengers of the occurrence of a misfire and, at the same time, proper fail-save processing is carried out should the occurrence of a misfire be detected.

Figure 2:
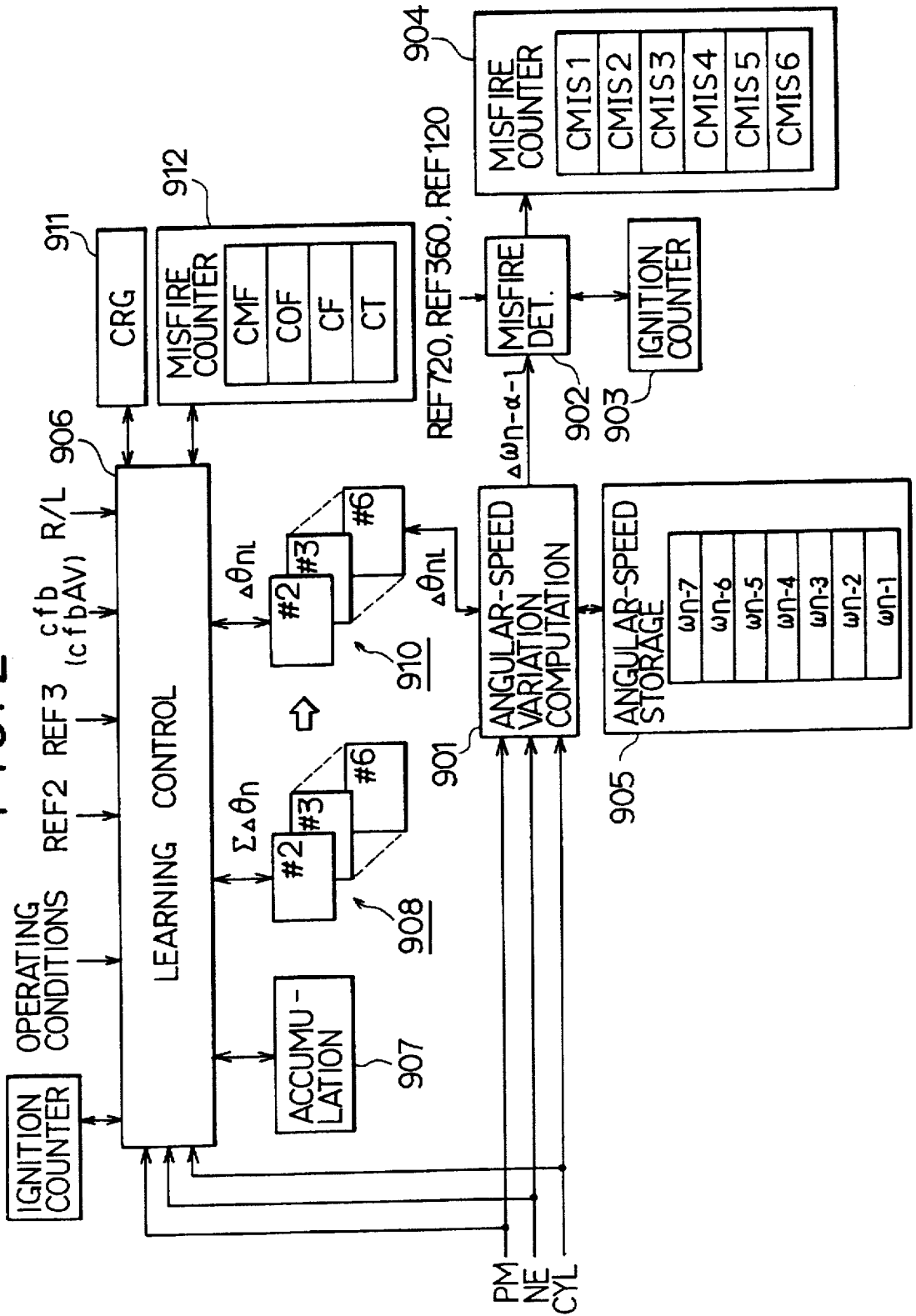
FIG. 2 is a block diagram showing a functional configuration of an ECU (Electronic Control Unit) according to the first embodiment of the present invention.

FIG. 2 is a block diagram showing a configuration of main functional components composing the ECU 9 as part of the misfire detecting apparatus. Next, the configuration and functions of the misfire detecting apparatus according to the first embodiment are explained in detail by referring also to this figure.

An angular-speed variation computing unit 901 employed in the ECU 9 shown in FIG. 2 finds the angular speed of the crankshaft (or the crank angular speed) $\omega n$, where n=1 to 6, for each cylinder from the intake-pipe air pressure PM, the rotation signal NE and the reference-position signal CYL received from the sensors described above and calculates differences in angular-speed variance $\Delta(\Delta\omega)n-1$ among cylinders from the angular speed of the crankshaft (or the crank angular speeds) $\omega n$.

Here, in the case of a six cylinder internal combustion engine like the one in which the misfire detecting apparatus according to the first embodiment is employed, the crank angular speed $\omega n$ is computed in accordance with the following equation:

$$\omega n = (KDSOMG - \Delta\theta nL)/T120i \quad (1)$$

where notation T120i is the time required by the crankshaft to rotate by 120° CA and notation i is the number of processings carried out by the ECU 9.

Notation KDSOMG used in Eq. (1) is a coefficient used for finding the rotational angular speed (in terms of radians) of the crankshaft. In addition, notation $\Delta\theta nL$ is a learned value of the difference in crank angle among cylinders stored in the learned-value memory area 910 of the back-up RAM unit 9d. As will be described later, the learned-value memory area 910 is used for storing deviations (tolerances) in crank angle among cylinders.

The angular-speed variation computing unit 901 finds the crank angular speed $\omega n$ by correcting the difference in crank angle among cylinders by the learned value $\Delta\theta nL$.

In the case of an internal combustion engine having four cylinders, the time duration required by the crankshaft to rotate 180° CA denoted by notation T180i is used in the computation of the crank angular speed $\omega n$.

The angular-speed variation computing unit 901 also computes the difference in angular-speed variance among cylinders $\Delta(\Delta\omega)n-1$ from the current value and a previously found value of the crank angular speed $\omega n$ by executing a two-stage differential calculation based on Eq. (2) as follows:

$$\Delta(\Delta\omega)n-1 = (\omega n - \omega n-1) - (\omega n - \alpha - 1 - \omega n - \alpha - 2) \quad (2)$$

Notation $\omega n$ used in Eq. 2 is the current value of the crank angular speed and notation $\omega n-1$ is a value of the angular speed found in the immediately previous processing. The difference ($wn - \omega n-1$) is a variance in angular speed between cylinders in which combustion strokes are made in a row.

Notation $\alpha$ used in Eq. (2) is a suffix term having a value in the range 0 to 5 in the case of a six cylinder internal combustion engine in which the misfire detecting apparatus according to the first embodiment is employed. Normally, $\alpha$ is set at such a value that a difference in angular speed caused by a misfire is easily reflected in the result of calculation of the difference in angular-speed variance among cylinders $\Delta(\Delta\omega)n-1$.

In the case of the misfire detecting apparatus according to the present embodiment, either a technique based on a two-stage differential calculation for two cylinders operationally separated from each other by 720° CA (referred to hereafter as a 720° CA differential technique), a technique based on a two-stage differential calculation for two cylinders operationally separated from each other by 360° CA (referred to hereafter as a 360° CA differential technique) or a technique based on a two-stage differential calculation for two cylinders operationally separated from each other by 120° CA (referred to hereafter as a 120° CA differential technique) is selected and the value of α is set at 3, 1 or 0 respectively. A difference in angular-speed variance among cylinders Δ(Δω)n−1720, a difference in angular-speed variance among cylinders Δ(Δω)n−1360 and a difference in angular-speed variance among cylinders Δ(Δω)n−1120 can be calculated by using the 720° CA differential technique, the 360° −CA differential technique and the 120° CA differential technique based on Eqs. (3), (4) and (5) respectively.

$$\Delta(\Delta\omega)n-1720=(\omega n-\omega n-1)-(\omega n-6-\omega n-7) \quad (3)$$

$$\Delta(\Delta\omega)n-1360=(\omega n-\omega n-1)-(\omega n-3-\omega n-4) \quad (4)$$

$$\Delta(\Delta\omega)n-1120=(\omega n-\omega n-1)-(\omega n-1-\omega n-2) \quad (5)$$

The 720° CA differential technique, the 360° CA differential technique and the 120° CA differential technique adopted in the present embodiment correspond respectively to a first differential calculating method, a second differential calculating method and a third differential calculating method. In the case of a four cylinder internal combustion engine, α has values in the range 0 to 3.

It should be noted that a value ωn−1 immediately preceding ωn is cataloged successively in an angular-speed storing unit 905 which is typically implemented by either the RAM unit 9c or the back-up RAM unit 9d. In the case of a six cylinder internal combustion engine according to the present embodiment, only seven or fewer previous values ωn−1 to ωn−7 are sufficient.

In addition, a misfire determining unit 902 employed in the ECU 9 shown in FIG. 2 is a component for making a determination as to whether or not a misfire has occurred in the internal combustion engine 1. The misfire determining unit 902 compares the difference in angular-speed variance among cylinders Δ(Δω)n−1720, the difference in angular-speed variance among cylinders Δ(Δω)n−1360 and the difference in angular-speed variance among cylinders Δ(Δω) n−1120 with predetermined misfire criterion values REF720, REF360 and REF120 respectively which are selected in accordance with the difference in angular-speed variance among cylinders to be compared thereto. When the difference in angular-speed variance among cylinders Δ(Δω) n−1720, the difference in angular-speed variance among cylinders Δ(Δω)n−1360 or the difference in angular-speed variance among cylinders Δ(Δω)n−1120 is found greater than the predetermined misfire criterion value REF720, REF360 or REF120 respectively, the contents of counters CMIS1 to CMIS6 of a tentative-misfire counter 904 stored in the RAM unit 9c are incremented by one. The counters CMIS1 to CMIS6 are each provided for one of the six cylinders.

The contents of the counters CMIS1 to CMIS6 associated with the six cylinders are incremented by one successively till the number of ignitions counted by an ignition counter 903 reaches a predetermined value, typically, 100 or 500. However, if the contents of one of the counters CMIS1 to CMIS6 are incremented to 30 before the number of ignitions reaches the predetermined value 100, for example, it is likely that a catalyst converter not shown in the figure or another component is damaged by a misfire. In this case, the ECU 9 therefore warns the driver of the potential danger by turning on the warning lamp 12.

A learning-process control unit 906 employed in the ECU 9 learns deviations (or tolerances) in crank angle among cylinders from the intake-pipe air pressure PM, the rotation signal NE and the reference-position signal CYL received from the sensors described above.

Differences in crank angle between the first cylinder (cylinder #1) and the second to sixth cylinders (cylinders #2 to #6) are learned by carrying out the two following main processings (1) and (2).

(1) Based on the time duration T120i required by the crankshaft to rotate by 120° CA, differences in crank angle Δθn (where n=2 to 6) between the first cylinder (cylinder #1) and the second to sixth cylinders (cylinders #1 to #6) are calculated for each cylinder and each operating condition of the internal combustion engine 1.

(2) On the premise that the internal combustion engine 1 is ignited normally, average values of differences in crankshaft Δθn (where n=2 to 6) between the first cylinder (cylinder #1) and the second to sixth cylinders (cylinders #1 to #6) calculated for all cylinders and all operating conditions of the internal combustion engine 1 are computed and an averaging process is further carried out on the average values to give a learned value ΔθnL of the difference in crank angle.

It should be noted that the counter 907 is used for accumulating the number of calculations carried out in the processing (1). Results of the calculations of the differences in crankshaft Δθn for all cylinders and all operating conditions are stored in a calculated-value memory area 908 of the RAM unit 9c for storing deviations (or tolerances) in crank angle among cylinders. In addition, the learned value ΔθnL of the difference in crank angle is also calculated for each cylinder and each operating condition of the internal combustion engine 1. Learned values of the differences in crankshaft ΔθnL for all cylinders and all operating conditions are stored in the learned-value memory area 910 of the back-up RAM unit 9d for storing deviations (or tolerances) in crank angle among cylinders.

In addition, a rough-road (CRG) counter 911 and a tentative-misfire counter 912 are each used for counting the number of outcomes of determination as to whether or not the internal combustion engine is normally ignited in the processing (2) carried out by the learning-process control unit 906 for a predetermined number of ignitions, typically, 100 ignitions. On the other hand, the ignition counter 909 is used for counting the number of repetitions of the operation to count the number of ignitions.

Next, misfire detecting control carried out by the ECU 9 is explained.

Figure 3:
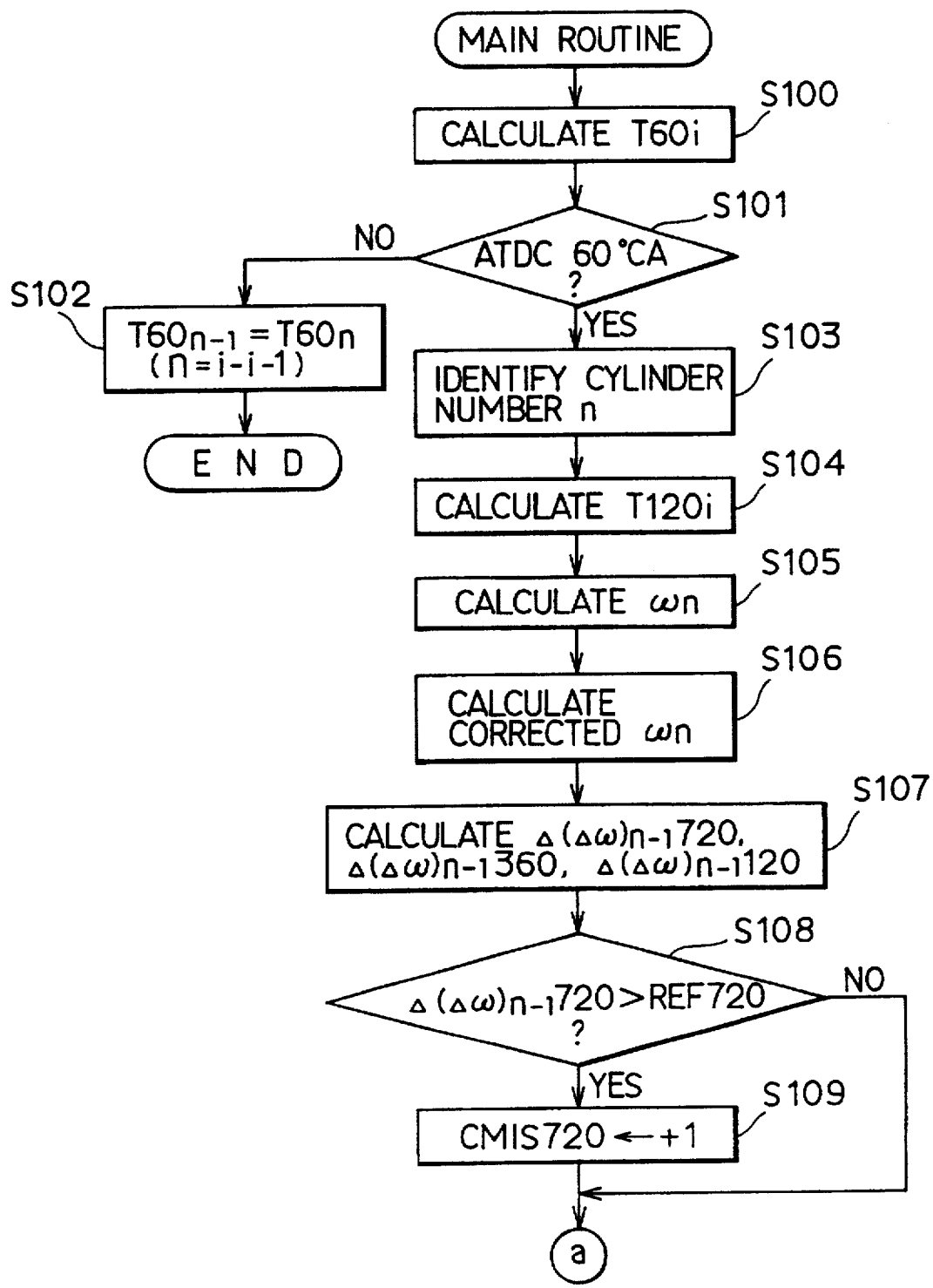
FIG. 3 is a flowchart of a main routine according to the first embodiment of the present invention for making a determination as to whether or not a misfire has occurred.
Figure 4:
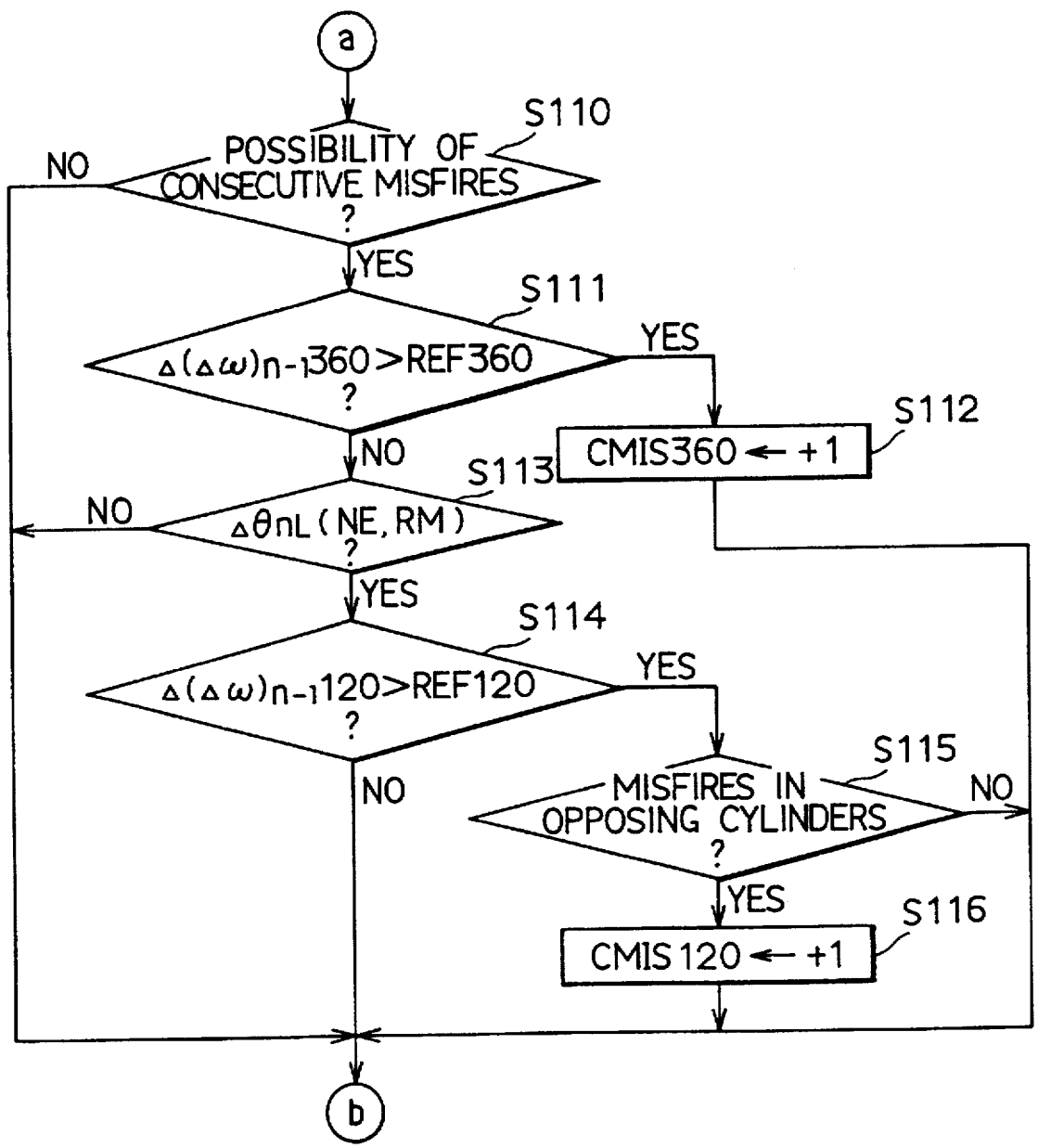
FIG. 4 is a flowchart of the main routine according to the first embodiment of the present invention for making a determination as to whether or not a misfire has occurred, a continuation of the flowchart shown in FIG. 3.
Figure 5:
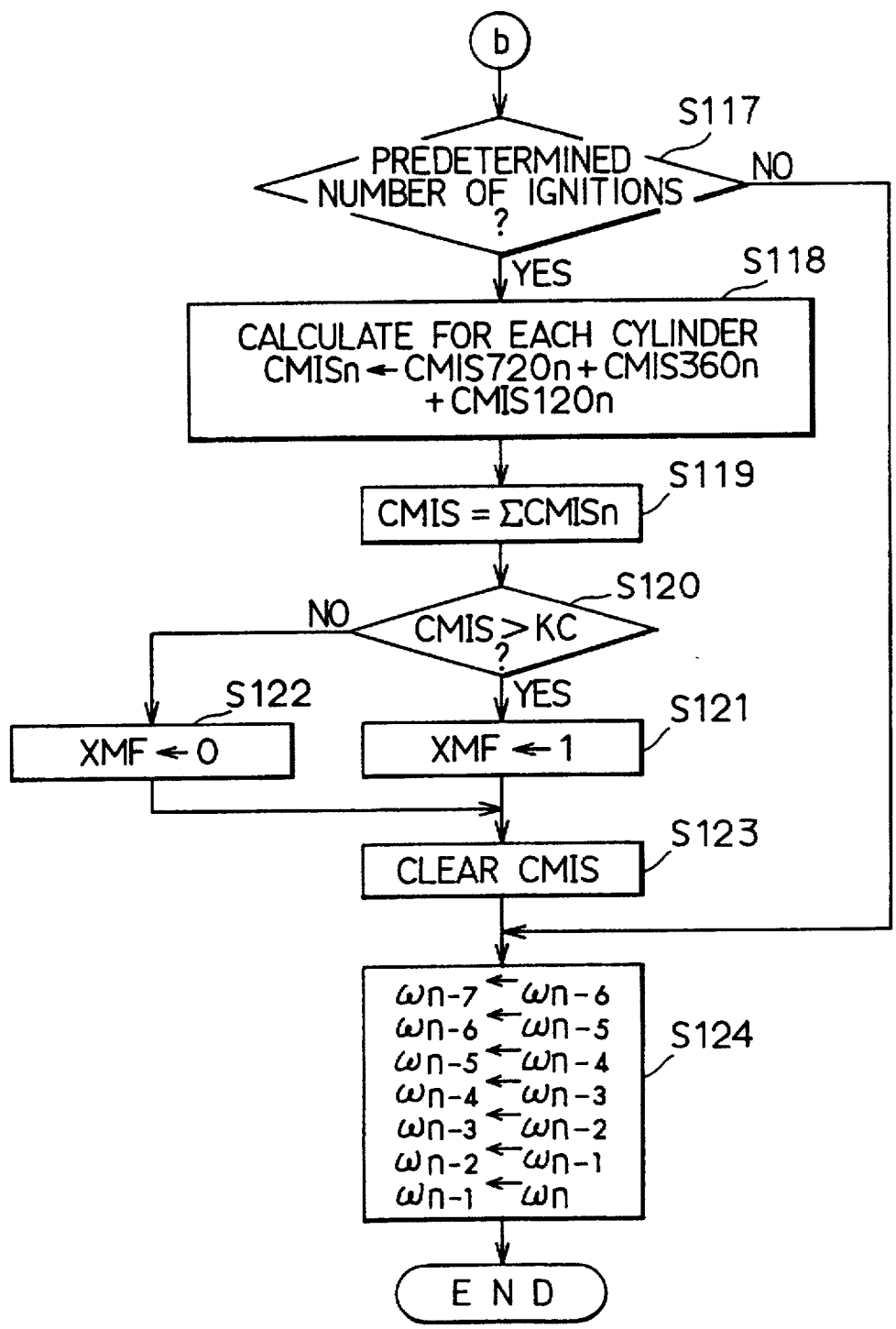
FIG. 5 is a flowchart of the main routine according to the first embodiment of the present invention for making a determination as to whether or not a misfire has occurred, a continuation of the flowcharts shown in FIGS. 3 and 4.
Figure 6:
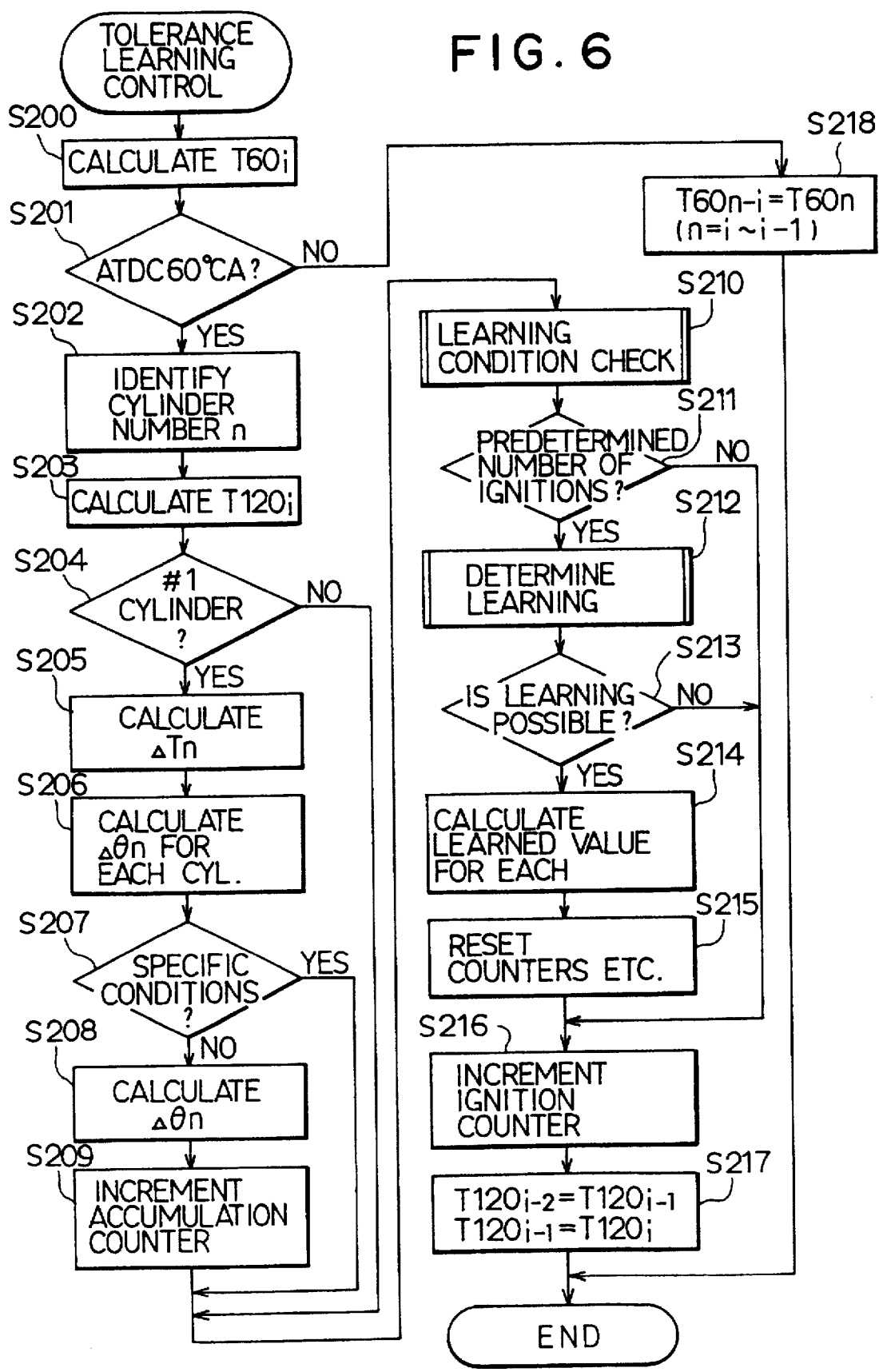
FIG. 6 is a flowchart of a tolerance learning-process control routine according to the first embodiment of the present invention.

FIGS. 3 to 5 show each a flowchart of a main routine for use in conjunction with the angular-speed variation computing unit 901 and the misfire determining unit 902 in making a determination as to whether or not a misfire has occurred. FIG. 6 shows a tolerance learning-process control routine for use in conjunction with the learning-process control unit 906 employed in the ECU 9. Operations to determine the occurrence of a misfire carried out by the misfire detecting apparatus according to the embodiment are explained in detail by referring to FIGS. 3 to 6 as follows.

First of all, the main routine shown in FIGS. 3 to 5 is explained.

This main routine is performed as an angular interrupt handler each time the crank angle of the internal combustion engine 1 becomes equal to 60° CA as is recognized from the rotation signal NE. When the crankshaft rotates 60° CA, the condition of an interrupt is satisfied. At that time, the electronic control unit (ECU) 9 first of all calculates the time duration T60i required by the crankshaft to rotate 60° CA by measuring an interval between the immediately previous execution of this interrupt handling routine and the current execution thereof at a step S100.

The operational flow then goes on to a step S101 at which the ECU 9 uses the reference-position signal CYL to determine whether or not the present interrupt timing is at 60° CA after the top dead center (ATDC). If the present interrupt timing is not at 60° CA after the top dead center (ATDC), the operational flow proceeds to a step S102 at which the ECU 9 stores the time duration T60i as T60i-1 and ends the processing for the time being. It should be noted that subscript i used in the following description denotes the number of processings carried out by the ECU 9.

If the present interrupt timing is at 60° CA after the top dead center (ATDC), on the other hand, the operational flow proceeds to a step S103 at which the ECU 9 continues the processing to determine the occurrence of a misfire. To be more specific, at the step S103, the ECU 9 identifies the number n of the cylinder processed this time from the reference-position signal CYL. The operational flow then goes on to a step S104 at which the ECU 9 sums up the two most recent pieces of data representing the time duration T60i found at the step S100 in order to find the time duration T120i required by the crankshaft to rotate by 120° CA.

The operational flow then proceeds to a step S105 at which the ECU 9 uses the time duration T120i to compute the crank angular speed ωn in accordance with the following equation:

$$\omega n = KDSOMG/T120i \quad (1)'$$

In comparison with Eq. (1), Eq. (1)' does not include the learned value ΔθnL (NE, PM). It should be noted that, in the case of the 720° –CA and –360° –CA differential techniques, the learned value ΔθnL is canceled, allowing Eq. (1)' to be used as a substitute for Eq. (1).

The operational flow then goes on to a step S106 at which the ECU 9 computes the crank angular speed ωn by using Eq. (1), that is, the crank angular speed ωn corrected by the learned value ΔθnL. It should be noted that the learned value ΔθnL is assumed to exist in the learned-value memory area 910 of the RAM unit 9c for storing deviations (or tolerances) in crank angle among cylinders. The learned value ΔθnL (NE, PM) for the rotational speed NE and the internal combustion engine load PM, parameters representing operating conditions of the cylinder, is assumed to exist.

The operational flow then proceeds to a step S107 at which the ECU 9 uses the crank angular speed ωn found at the preceding steps to compute differences in angular-speed variance among cylinders Δ(Δω)n–1 for the (n–1)th cylinder in three ways in accordance with Eqs. (3) to (5) respectively. It should be noted that, in the calculation of Δ(Δω)n–1720 and Δ(Δω)n–1360 using the 720° –CA and 360° –CA differential techniques respectively, the crankshaft speed ωn found at the step S105 is used. In the calculation of Δ(Δω)n–1120 using the 120° –CA differential technique, on the other hand, the crankshaft speed ωn found at the step S106 is used.

Then, the operational flow goes on to a step S108 at which the ECU 9 compares the difference in angular-speed variance among cylinders Δ(Δω)n–1720 for the (n–1)th cylinder computed by using the 720° –CA differential technique with the misfire criterion value REF720. If the difference in angular-speed variance among cylinders Δ(Δω)n–1720 for the (n–1)th cylinder is found greater than the misfire criterion value REF720 at the step S108, a misfire is determined to have occurred and the operational flow goes on to a step S109 at which the ECU 9 increments the contents of the CMIS counter for the cylinder being processed (or the counter CMIS720) of the tentative-misfire counter 904 shown in FIG. 2 by one. If the difference in angular-speed variance among cylinders Δ(Δω)n–1720 for the (n–1)th cylinder is found smaller than or equal to the misfire criterion value REF720 at the step S108 (that is, if Δ(Δω) n–1720≦REF720), on the other hand, the operational flow goes to a step S110 of FIG. 4 with the ECU 9 by-passing the step S109.

The determination made at the step S108 allows a non-periodical occurrence of a misfire, that is an intermittent misfire, to be detected. If consecutive misfires occur in a row in the same cylinder, however, the occurrences of the misfires can not detected. For example, if a misfire has occurred in a combustion stroke of the present misfire by 720° CA, that is, if a misfire has occurred in the same cylinder with timing ahead of the current misfire by one combustion cycle, the 720° CA differential technique will cause variations in rotational speed due to the misfires to cancel each other because the 720° CA differential technique computes the difference between the variations of the same cylinder. As a result, the difference in angular-speed variance among cylinders Δ(Δω)n–1720 for the (n–1)th cylinder computed by using the 720° CA differential technique does not exceed the misfire criterion value REF720, making the occurrences of the consecutive misfires undetected. It should be noted that consecutive misfires occurring in the same cylinder in a row are detected by processing to be described later.

At the step S110 of FIG. 4, the ECU 9 uses the difference in angular-speed variance among cylinders Δ(Δω)n–1720 for the (n–1)th cylinder computed by using the 720° CA differential technique and the misfire criterion value REF720 to determine whether or not there is a possibility of two consecutive misfires' occurring in a row. The difference in angular-speed variance among cylinders Δ(Δω)n–1720 does not change in the case of two consecutive occurrences of misfires but does change only in the case of an intermittent misfire as described above. At the step S110, the values of the difference in angular-speed variance among cylinders Δ(Δω)n720 are used for making a determination affirming that there is a possibility of two consecutive misfires' occurring in a row in case the state of undetected occurrences has been sustained for several consecutive cycles.

If the outcome of the determination made at the step S110 indicates that there is no possibility of two consecutive misfires' occurring in a row, the ECU 9 bypasses steps S111 to S116 of the remaining processing to detect the occurrence of a misfire because an intermittent occurrence of a misfire has already been detected at the steps S108 and S109. Instead, the operational flow goes on to a step S117 shown in FIG. 5 without carrying out processings of the steps S111 to S116. If the outcome of the determination made at the step S110 indicates that there is a possibility of two consecutive misfires' occurring in a row, on the other hand, the operational flow goes on to the step S111 at which the ECU 9 carries out the following processing.

At the step S111, the ECU 9 compares the difference in angular-speed variance among cylinders Δ(Δω)n–1360 for the (n–1)th cylinder computed by using the 360° CA differential technique with the misfire criterion value REF360. If the difference in angular-speed variance among cylinders Δ(Δω)n–1360 for the (n–1)th cylinder is found greater than the misfire criterion value REF360 at the step S111, a misfire is determined to have occurred and the operational flow goes on to a step S112 at which the ECU 9 increments the contents of the CMIS counter for the cylinder being processed (or the counter CMIS360) of the tentative-misfire counter 904 by one. After incrementing the contents of the CMIS counter, the operational flow goes on to a step S117 shown in FIG. 5.

In this case, since the difference in angular-speed variance among cylinders Δ(Δω)n–1360 for the (n–1)th cylinder computed by using the 360° CA differential technique is actually a difference between the (n−1)th pair of cylinders and a pair of cylinders operationally separated from the (n−1)th pair of cylinders by 360° CA, consecutive misfires occurring in a row in opposing cylinders, that is, in a combination of the first and fourth cylinders, a combination of the second and fifth cylinders and a combination of the third and sixth cylinders, can not be detected. However, such misfires occurring in other combinations of cylinders can be detected.

If the outcome of the comparison at the step S111 is a denial (NO), that is, if the difference in angular-speed variance among cylinders $\Delta(\Delta\omega)n-1360$ for the (n−1)th cylinder is-found equal to or smaller than the misfire criterion value REF360 at the step S111 (that is, if $\Delta(\Delta\omega)n-1360 \leq REF360$), the operational flow goes on to a step S113 at which the ECU 9 checks whether or not the learned value $\Delta\theta nL$ exists in the learned-value memory area 910 of the RAM unit 9c for storing deviations (tolerances) in crank angle among cylinders, that is, whether or not the learned value $\Delta\theta nL$ (NE, PM) for the rotational speed NE and the internal combustion engine load PM, parameters representing operating conditions of the cylinder, exists in the learned-value memory area 910. If the learned value $\Delta\theta nL$ (NE, PM) is found present in the learned-value memory area 910 at the step S113 (that is, if the finding of the step S113 is an affirmative YES), the operational flow goes on to a step S114 to compare the difference in angular-speed variance among cylinders $\Delta(\Delta\omega)n-1120$ for the (n−1)th cylinder computed by using the 120° CA differential technique with the misfire criterion value REF120. As described above, the difference in angular-speed variance among cylinders $\Delta(\Delta\omega)n-1120$ for the (n−1)th cylinder computed by using the 120° CA differential technique is a value computed from the crank angular speed $\omega n$ for the cylinder which $\omega n$ has been corrected by using Eq. (1), that is, corrected by using the learned value $\Delta\theta nL$. Therefore, if the learned value $\Delta\theta nL$ (NE, PM) is found not present in the learned-value memory area 910 at the step S113, detection of the occurrence of a misfire is not carried out at the step S114.

If the difference in angular-speed variance among cylinders $\Delta(\Delta\omega)n-1120$ for the (n−1)th cylinder computed by using the 120° CA differential technique is found greater than the misfire criterion value REF120 at the step S114, the ECU 9 determines that there is a possibility of the occurrence of a misfire. Since the difference in angular-speed variance among cylinders $\Delta(\Delta\omega)n-1120$ for the (n−1)th cylinder computed by using the 120° CA differential technique is actually a difference between the (n−1)th pair of cylinders and a pair of cylinders operationally separated from the (n−1)th pair of cylinders by 120° CA, consecutive misfires occurring in a row in two adjacent cylinders can not be detected, but consecutive misfires occurring in a row in two opposing cylinders can be detected.

If the outcome of the determination made at the step S114 is a denial (NO), that is, if the difference in angular-speed variance among cylinders $\Delta(\Delta\omega)n-1120$ for the (n−1)th cylinder computed by using the 120° CA differential technique is found equal to or smaller than the misfire criterion value REF120 at the step S114, on the other hand, the operational flow goes on to a step S115 at which the ECU 9 determines whether or not consecutive misfires have occurred in a row in two opposing cylinders. If the outcome of the determination made at the step S115 is a denial (NO), the operational flow goes on to a step S116 at which the ECU 9 increments the contents of the CMIS counter for the cylinder being processed (or the counter CMIS120) of the tentative-misfire counter 904 by one. Since consecutive misfires occurring in a row in a combination of cylinders other than opposing cylinders have been detected at the step S111, consecutive misfires occurring in a row only in opposing cylinders are detected at the step S114. After incrementing the contents of the counter CMIS120, the operational flow goes on to a step S117 shown in FIG. 5.

At the step S117 shown in FIG. 5, the ECU 9 checks whether or not the number of ignitions counted by the ignition counter 903 has reached a predetermined number of ignitions, typically, 500. If the number of ignitions has reached the predetermined number, the ECU 9 carries out processings at steps S118 to S123 before going on to a step S124. If the number of ignitions has not reached the predetermined number yet, on the other hand, the ECU 9 jumps to the step S124 without carrying out the processings of the steps S118 to S123.

If the outcome of the checking of the step S117 is an affirmation (YES), that is, if the number of ignitions has reached the predetermined number, at the step S118, the ECU 9 sums up the contents of the counters CMIS720, CMIS360 and CMIS120 obtained at the steps S109, S112 and S116 respectively for each cylinder and then calculates the counter CMISn of the tentative-misfire counter 904 for each cylinder (that is, for n=1 to 6) by using Eq. (6).

$$CMISn = CMIS720n + CMIS360n + CMIS120n \qquad (6)$$

It should be noted that, in this case, data representing several misfires is regarded as data which may result from detection errors and can thus be excluded from the calculation.

The operational flow then goes on to a step S119 at which the ECU 9 sums up the contents of all the counters CMISn, where n=1 to 6, of the tentative-misfire counter 904 found at the step S118 to give a count value (CMIS=ECMISn) of the CMIS counter which value represents the number of misfires for all the cylinders.

The operational flow then proceeds to a step S120 at which the ECU 9 compares the contents of the CMIS counter (CMIS) with a predetermined value KC, typically, 100. If CMIS is found greater than KC (CMIS>KC), the operational flow proceeds to a step S121 at which the ECU 9 sets a misfire flag XMF to '1'. If CMIS is found equal to or smaller than or equal to KC (CMIS≤KC), on the other hand, the operational flow continues to a step S122 at which the ECU 9 clears the misfire flag XMF to '0'. If the misfire flag XMF is set to '1', there is a possibility of deteriorating emission or it is likely that a catalyst converter or another component is damaged by a misfire. In this case, the ECU 9 therefore warns the driver of the potential danger by turning on the warning lamp 12.

After setting or clearing the misfire flag XMF, the operational flow goes on to a step S123 at which the ECU 9 clears the CMIS counter and all the other counters such as CMIS720, CMIS 360 and CMIS 120. Finally, the operational flow proceeds to a step S124 at which the ECU 9 updates pieces of data representing the crank angular speed stored in the crank angular-speed storing unit 905 as follows: $\omega n-7$ is discarded, $\omega n-7$ is replaced by $\omega n-6$, $\omega n-6$ is replaced by $\omega n-5$, $\omega n-5$ is replaced by $\omega n-4$, $\omega n-4$ is replaced by $\omega n-3$, $\omega n-3$ is replaced by $\omega n-2$, $\omega n-2$ is replaced by $\omega n-1$ and $\omega n-1$ is replaced by $\omega n$. Then, the ECU 9 ends the processing routine.

In particular, the processings carried out at the steps S105 and S106 correspond to a means for detecting the rotational speed while the processing carried out at the step S107 corresponds to a difference calculating means for calculating a difference in rotational speed. In addition, the processings carried out at the steps S108, S111 and S114 correspond to a comparison means whereas the processings carried out at the steps S109, S112 and S116 correspond to a misfire counting means. The processings carried out at the steps S118 to S122 correspond to final misfire determining processing.

Next, a tolerance learning-process control routine for implementing a learning means is explained by referring to a flowchart shown in FIG. 6.

Much like the main routine described above, the tolerance learning-process control routine is performed as an angular interrupt handler each time the crank angle of the internal combustion engine 1 becomes equal to 60° CA as is recognized from the rotation signal NE.

When the crankshaft rotates 60° CA, the condition of an interrupt is satisfied. At that time, the learning-process control unit 906 of the ECU 9 executes the tolerance learning-process control routine in order to carry out the following processings (1) to (4):

(1) At a step S200, the ECU 9 calculates the time duration T60i required by the crankshaft to rotate 60° CA by measuring an interval between the immediately previous execution of this interrupt handling routine and the current execution thereof.

(2) At a step S201, the ECU 9 uses the reference-position signal CYL to determine whether or not the present interrupt timing is at 60° CA after the top dead center (ATDC).

(3) If the present interrupt timing is not at 60° CA after the top dead center (ATDC), the operational flow goes on to a step S218 at which the ECU 9 stores the time duration T60i as T60i-1 and once ends the processing.

(4) If the present interrupt timing is at 60° CA after the top dead center (ATDC), the operational flow proceeds to a step S202 at which the ECU 9 identifies the number n of the cylinder processed this time from the reference-position signal CYL. The operational flow then goes on to a step S203 at which the ECU 9 sums up the two most recent pieces of data representing the time duration T60i found at the step S200 in order to find the time duration T120i required by the crankshaft to rotate 120° CA.

After calculating the time duration T120i, the operational flow goes on to a step S204 at which the ECU 9 finds out whether or not the cylinder identified at the step S202 is the first cylinder (or cylinder #1). If the cylinder identified at the step S202 is not the first cylinder, the operational flow proceeds to a step S210 at which the ECU 9 checks conditions for execution of the tolerance learning process.

If the cylinder identified at the step S202 is the first cylinder, on the other hand, the operational flow proceeds to a step S205 at which the ECU 9 calculates a deviation time (or an cylinder tolerance time) $\Delta Tn$ between the first cylinder (cylinder #1) and the second to sixth cylinders (cylinders #2 to #6).

For example, the deviation time $\Delta T\#2$ between the first and second cylinders is given by the following equation:

$$\Delta T\#2 = [\{(T120i - T120i - 6)/6\}T120i - 6] - T120i - 5 \quad (7)$$
$$= \{T120i + 5 \times T120i - 6)/6\}T120i - 5$$

The term '(T120i−T120i-6)/6' in the above equation is a transient correction term. By adding such a transient correction term to the calculation of the deviation time, effects of transient variations in rotational deviation due to changes in operating conditions in the internal combustion engine 1 during, for example, acceleration or deceleration can be well eliminated.

Similarly, the deviation time $\Delta T\#3$ between the first and third cylinders, the deviation time $\Delta T\#4$ between the first and fourth cylinders, the deviation time $\Delta T\#5$ between the first and fifth cylinders and the deviation time $\Delta T\#6$ between the first and sixth cylinders are given by Eqs. (8) to (11) respectively as follows:

$$\Delta T\#3 = \{(T120i + 2 \times T120i-6)/3\}T120i-4 \quad (8)$$

$$\Delta T\#4 = \{(T120i + T120i-6)/2\}T120i-3 \quad (9)$$

$$\Delta T\#5 = \{(2 \times T120i + T120i-6)/3\}T120i-2 \quad (10)$$

$$\Delta T\#6 = \{(5 \times T120i + T120i-6)/6\}T120i-1 \quad (11)$$

The time duration T120i-6 required previously by the crankshaft of the first cylinder to rotate by 120° CA and the time durations T120i-5, T120i-4, T120i-3, T120i-2 and T120i-1 required by the crankshaft of the second to sixth cylinders to rotate by 120° CA are calculated at the step S203. These time durations T120i-n are updated at a later step S217.

After computing the deviation times $\Delta T\#n$ between the first and the second to sixth cylinders, the operational flow goes on to a step S206 at which the ECU 9 converts the deviation time $\Delta T\#n$ into a deviation $\Delta\theta n$, that is, a deviation rotation-angle by using Eq. (12) as follows:

$$\Delta\theta n = \Delta Tn \times (120° \ CA/T120i) \quad (12)$$

where notation n used in the above equation represents #2 to #6, the numbers of the five cylinders, that is, the second to sixth cylinders.

After finding the deviation $\Delta\theta n$ between the first cylinder and the second to sixth cylinders, the operational flow goes on to a step S207 at which the ECU 9 determines whether or not the internal combustion engine 1 is currently running under specific operating conditions from information on operations available at that time. The specific operating conditions are so-called specific operating states in which the occurrence of a misfire can not be determined. Such conditions include transient states such as abrupt acceleration and abrupt deceleration, a shift-change state, a fuel-cut time, a fuel restoration time, a start time, an electrical-load introduction time, a purge control state, EGR (exhaust rotary-operational flow control) execution, execution of variable air absorption, a specific operating state causing a large variation in rotation of the crankshaft and a small-load operating zone and a high-rotation zone. Then, on the premise that the internal combustion engine 1 is not under such a specific condition, the operational flow goes on to a step S208 at which the ECU 9 computes the crankshaft deviation $\Delta\theta n$. The operational flow then continues to a step S209 at which the ECU 9 increments the contents of the accumulation counter 907 by one.

When the internal combustion engine 1 is under operating conditions of transient states such as abrupt acceleration and abrupt deceleration, a shift-change state, a fuel-cut time, a fuel restoration time, a start time and an electrical-load introduction time, on the other hand, it is quite within the bounds of possibility that the deviation $\Delta\theta n$ is not equal to a value which is found when the internal combustion engine 1 is in a normal combustion state. When the internal combustion engine 1 is under such an operating condition, the calculation processing is not carried out on the calculated deviation $\Delta\theta n$. It should be noted that, as will be described later, only the so-called normal deviation $\Delta\theta n$ completing the calculation processing in this misfire detecting apparatus according to the present embodiment is supplied to a tolerance learning process to be carried out later.

As described previously, the processing to calculate the deviation $\Delta\theta n$ is carried out at the step S208 for each cylinder and each operating condition and results are stored in the calculated-value memory area 908 of the RAM unit 9c for storing crank-angular deviations (tolerances in crank angle) among cylinders. The structure of the calculated-value memory area 908 is shown in FIG. 7.

Figure 7:
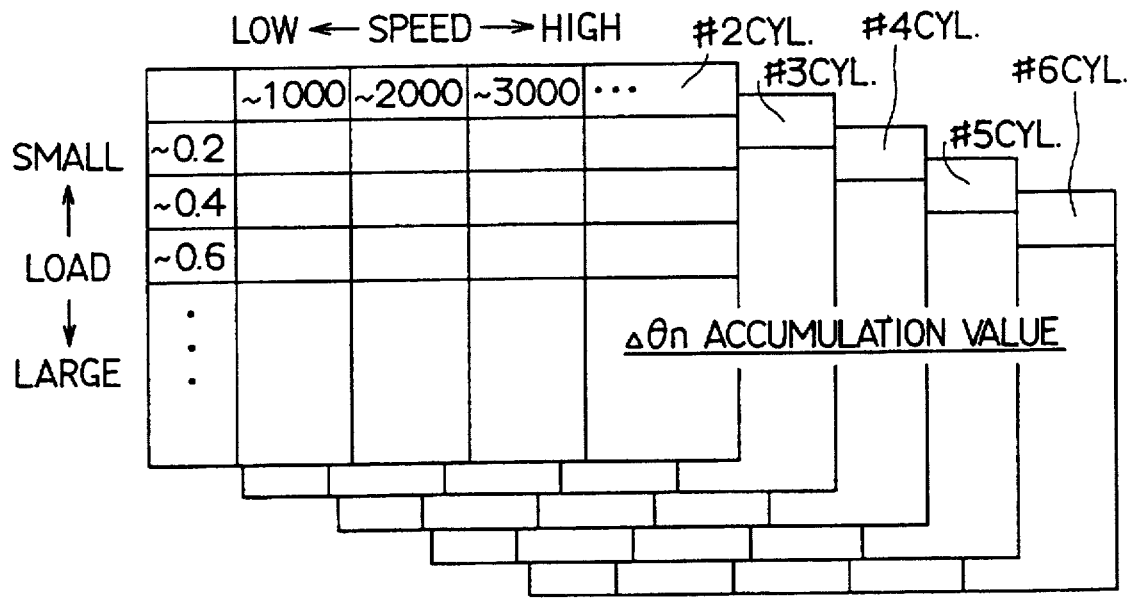
FIG. 7 is a schematic diagram showing a typical structure of a calculated-value memory for storing deviations in crank angle (or tolerances) among cylinders.

As shown in FIG. 7, the calculated-value memory area 908 of the RAM unit 9c for storing deviations (tolerances) in crank angle among cylinders has a structure for storing the deviation ΔΘn for each of the second to sixth cylinders (cylinders #2 to #6) as well as each rotational speed (NE) and each load (intake-pipe pressure PM), operating conditions of the internal combustion engine 1. By repeating the execution of the learning-process control routine, each item of a table shown in FIG. 7 is filled with data 'EΔΘn (NE, PM)' representing a normal deviation ΔΘn. Then, the accumulation counter 907 is used for storing the number of calculations of the deviation ΔΘn (NE, PM) stored in the calculated-value memory area 908 of the RAM unit 9c for-storing deviations (tolerances) in crank angle among cylinders.

After completing the processing to calculate the deviation ΔΘn(NE, PM), the operational flow then goes on to a step S210 at which the ECU 9 checks conditions for determining whether or not the tolerance learning process is to be executed. The checking of the execution conditions are explained in detail by referring to FIGS. 9 and 10.

After checking the conditions for executing the tolerance learning process, the operational flow then continues to a step S211 at which the ECU 9 finds out whether or not the number of ignitions has exceeded a predetermined value, typically, 100 from the contents of the ignition counter 909. If the outcome of the examination done at the step S211 indicates that the number of ignitions has not exceeded the predetermined value, the operational flow then continues to a step S216 at which the ECU 9 increments the contents of the ignition counter 909 by one. The operational flow then goes on to a step S217 at which the ECU 9 updates the time duration T120i required by the crankshaft of each cylinder to rotate 120° CA in accordance with Eqs. (13) to (18) as follows:

$$T120i\text{-}6 = T120i\text{-}5 \quad (13)$$

$$T120i\text{-}5 = T120i\text{-}4 \quad (14)$$

$$T120i\text{-}4 = T120i\text{-}3 \quad (15)$$

$$T120i\text{-}3 = T120i\text{-}2 \quad (16)$$

$$T120i\text{-}2 = T120i\text{-}1 \quad (17)$$

$$T120i\text{-}1 = T120i \quad (18)$$

After updating the time duration T120i, the ECU 9 exits the routine, once ending the processing.

If the outcome of the examination done at the step S211 indicates that the number of ignitions exceeds the predetermined value, the operational flow then continues to a step S212 at which the ECU 9 finds out whether or not the conditions for determining if the tolerance learning process is to be executed are satisfied from results of checking the conditions done at the step S210. The processing carried out at the step S212 to find out whether or not the conditions for determining if the tolerance learning process is to be executed are satisfied will explained later in detail by referring to FIG. 13.

The operational flow then goes on to a step S213 at which the ECU 9 finds out whether the outcome of the determination made at the step S212 indicates that the execution of the tolerance learning process is possible or impossible. The determination is made at the step S212 to find out whether or not the conditions for determining if the tolerance learning process is to be executed are satisfied. If the outcome indicates that the execution of the tolerance learning process is impossible, the ECU 9 executes the processings of the steps S216 and S217 and then exits the routine, ending the processing for the time being. If the outcome indicates that the execution of the tolerance learning process is possible, on the other hand, the operational flow then continues to a step S214 at which the ECU 9 carries out the tolerance learning process.

Data resulting from the execution of the tolerance learning process is stored in the learned-value memory area 910 of the back-up RAM unit 9d for storing deviations (tolerances) in crank angle among cylinders. The structure of the learned-value memory area 910 is shown in FIG. 8.

Figure 8:
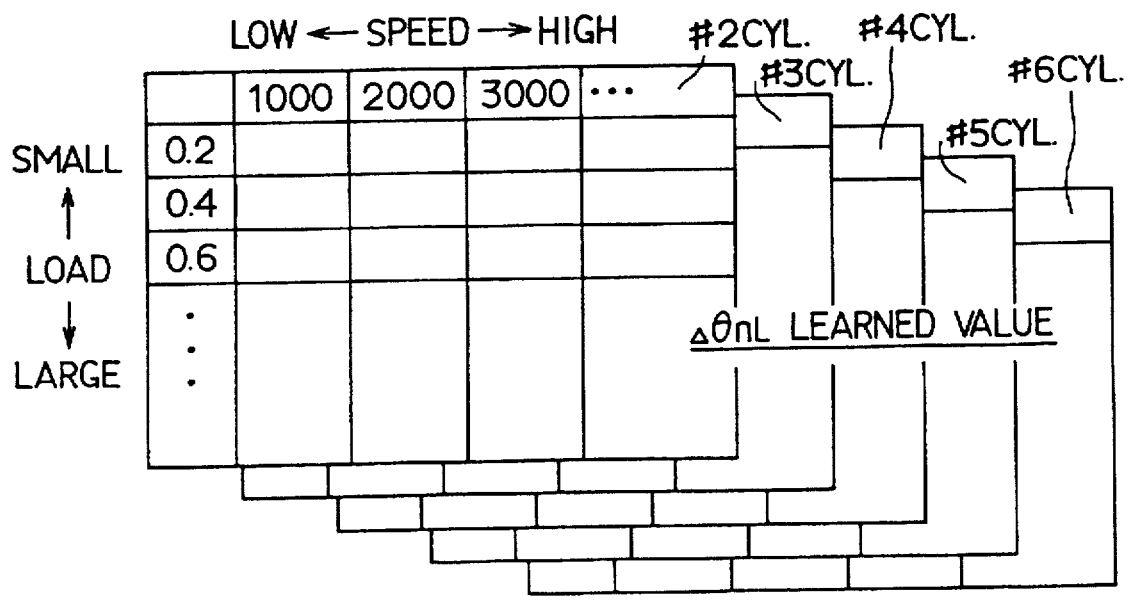
FIG. 8 is a schematic diagram showing a typical structure of learned-value memory for storing deviations in crank angle (or tolerances) among cylinders.

As shown in FIG. 8, much like the calculated-value memory area 908 of the RAM unit 9c shown in FIG. 7 for storing updated deviations (tolerances) in crank angle among cylinders, the learned-value memory area 910 of the back-up RAM unit 9d for storing deviations (tolerances) in crank angle among cylinders has a structure for storing the deviation ΔΘnL for each of the second to sixth cylinders (cylinders #2 to #6) as well as each rotational speed (NE) and each load (intake-pipe pressure PM), operating conditions of the internal combustion engine.

At the step S208, the ECU 9 reads out the deviations ΔΘn(NE, PM) from the calculated-value memory area 908 of the RAM unit 9c for storing deviations (tolerances) in crank angle among cylinders, calculating an average ΔΘn(NE, PM)AV by using Eq. (19) as follows:

$$\Delta\Theta n(NE, PM)AV = E\Delta\Theta n(NE, PM)/(\text{Contents of the accumulation counter}) \quad (19)$$

The average ΔΘn(NE, PM)AV is used in conjunction with the learned value of the deviation ΔΘLn(NE, PM) for each cylinder and each operating condition of the internal combustion engine 1 stored in the learned-value memory area 910 of the back-up RAM unit 9d for storing deviations (tolerances) in crank angle among cylinders in an averaging process based on Eq. (20) as follows:

$$E\Theta nL(NE, PM)AV = \{(8-1) \times \Delta\Theta nL(NE, PM) + \Delta\Theta n(NE,PM)AV \quad (20)$$

From Eq. (20), a new learned value of the deviation ΔΘnL (NE, PM) is obtained. Then, the new learned value of the deviation ΔΘnL (NE, PM) is stored in the learned-value memory area 910 as an update value.

It should be noted that the number 8 used in Eq. (20) is an averaging constant. It is needless to say that a number other than eight can also be used as well depending upon the type of the processing system.

The learned value of the deviation ΔΘnL (NE, PM) is updated only when the calculated value of the deviation EΔΘn (NE, PM) exists in the calculated-value memory area 908. If the calculated value of the deviation EΔΘn (NE, PM) does not exist in the calculated-value memory area 908, the average value ΔΘn (NE, PM)AV thereof can not be found as well. As a result, the averaging process based on Eq. (20) itself can not be executed.

Then, the operational flow of the tolerance control routine goes on to a step S215 at which the ECU 9 which is executing the tolerance learning process resets the calculated-value memory area 908, the accumulation counter 907 and the ignition counter 909. The operational flow then proceeds to the steps S216 and S217 at which the ECU 9 carries out processings indispensable to the next processing before exiting this routine to end the processing for the time being.

By letting the learning-process control unit 906 employed in the ECU 9 carry out processing in accordance with operating conditions of the internal combustion engine 1, the reliability of the value of the crank-angular speed ωn, which is computed as a corrected value by using a tolerance based on the learned value ΔθnL (NE, PM) through the execution of the main routine shown in FIGS. 3 and 5, is naturally improved. The accuracy of a determination made later to determine the occurrence of a misfire is also naturally enhanced as well.

Figure 9:
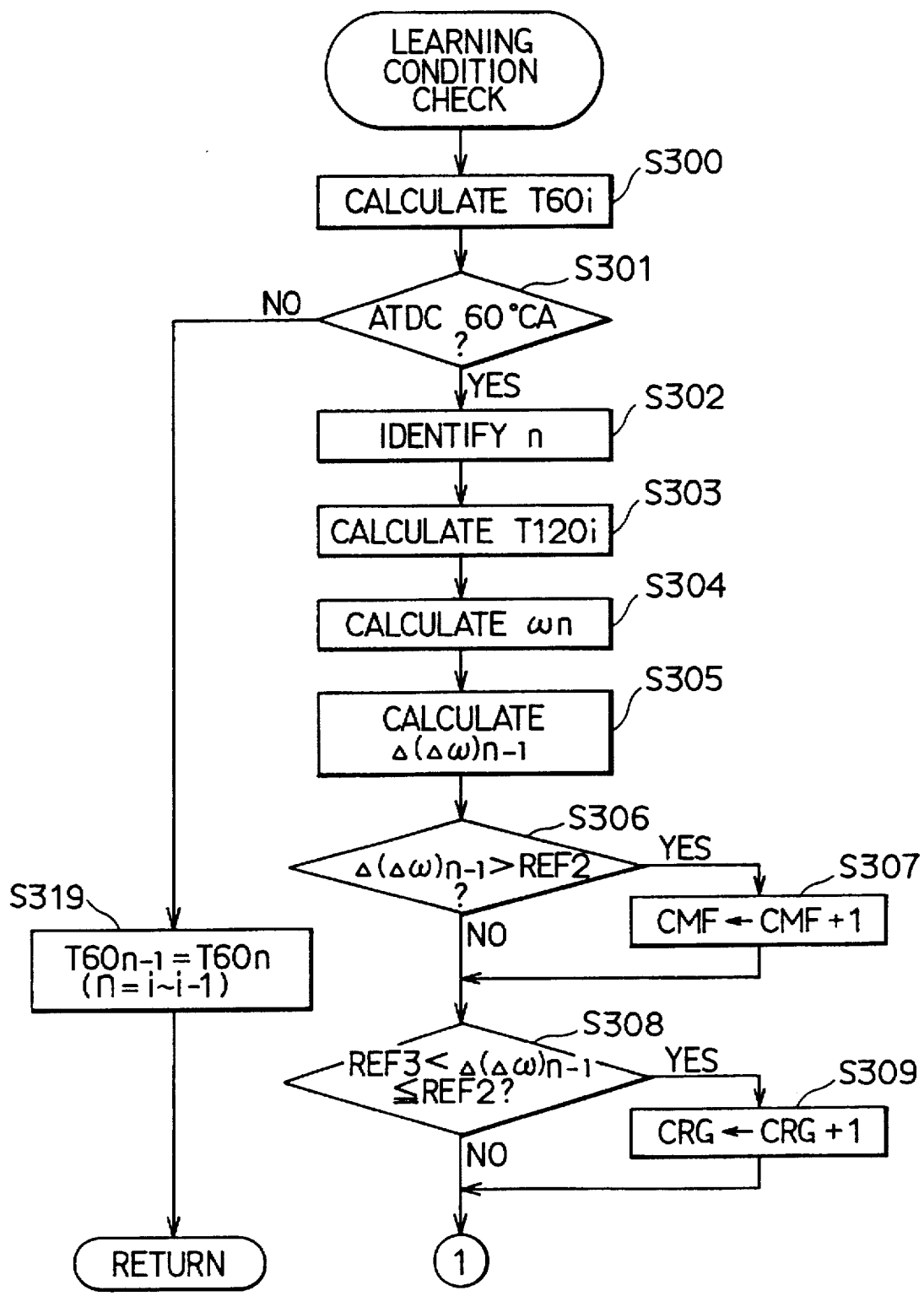
FIG. 9 is a flowchart of a check routine for checking conditions for executing a tolerance learning process.
Figure 10:
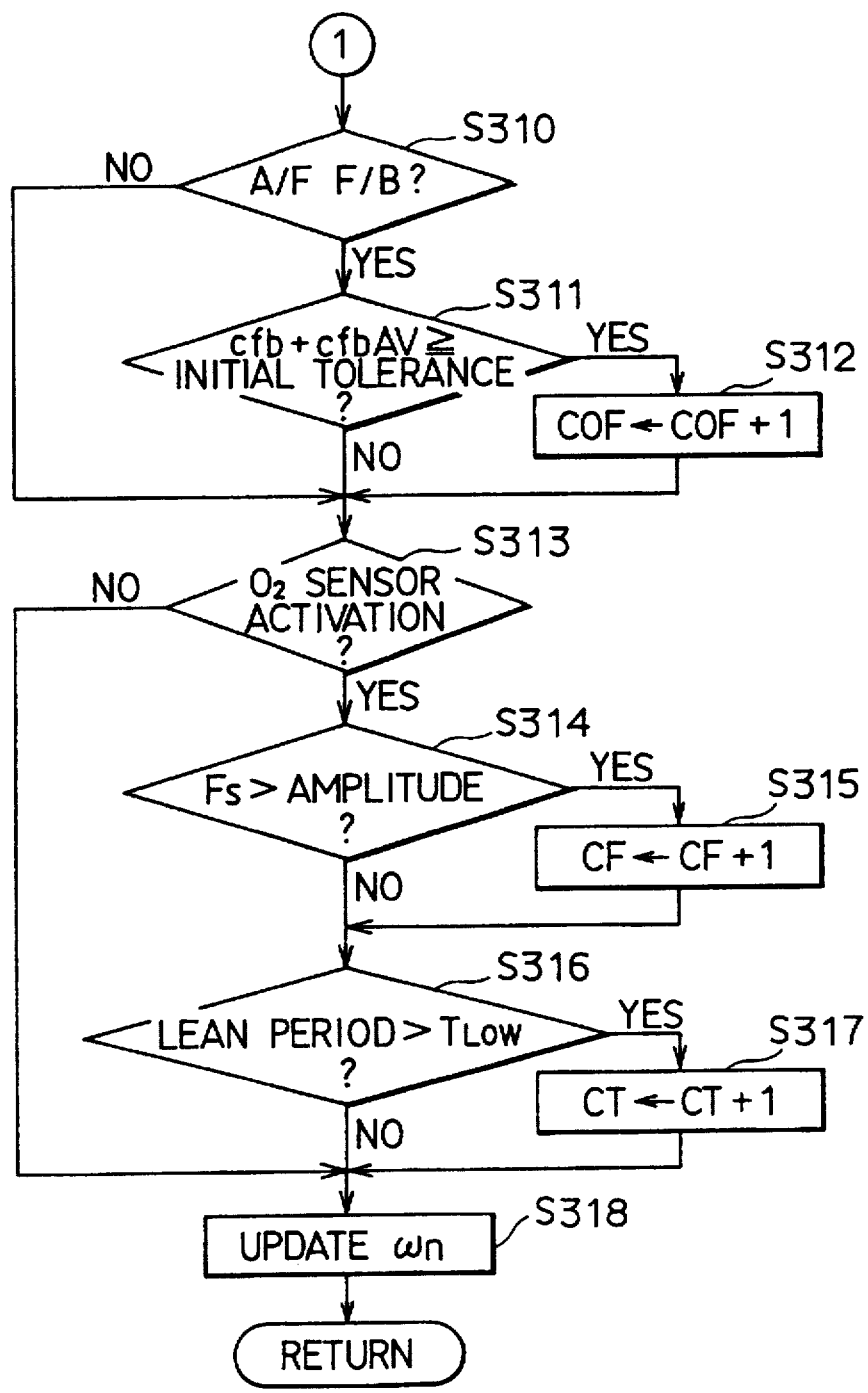
FIG. 10 is a flowchart of a check routine for checking conditions for executing a tolerance learning process.

Next, the processing carried out at the step S210 to check conditions determining whether or not the tolerance learning process is to be executed is explained by referring to FIGS. 9 and 10.

In the routine shown in FIGS. 9 and 10 to check conditions determining whether or not the tolerance learning process is to be executed, much like what is performed so far, the learning-process control unit 906 employed in the ECU 9 carries out the following processings (1) to (4):

(1) At a step S300, the ECU 9 calculates the time duration T60i required by the crankshaft to rotate 60° CA by measuring an interval between the immediately previous execution of this interrupt handling routine and the current execution thereof.

(2) At a step S301, the ECU 9 uses the reference-position signal CYL to determine whether or not the present interrupt timing is at 60° CA after the top dead center (ATDC).

(3) If the present interrupt timing is not at 60° CA after the top dead center (ATDC), the operational flow goes on to a step S319 at which the ECU 9 stores the time duration T60i as T60i-1 and once ends the processing.

(4) If the present interrupt timing is at 60° CA after the top dead center (ATDC), on the other hand, the operational flow proceeds to a step S302 at which the ECU 9 identifies the number n of the cylinder processed this time from the reference-position signal CYL. The operational flow then goes on to a step S303 at which the ECU 9 sums up the two most recent pieces of data representing the time duration T60i found at the step S200 in order to find the time duration T120i required by the crankshaft to rotate 120° CA.

The operational flow then goes on to a step S304 at which the ECU 9 calculates the crank angular speed ωn for each cylinder by using Eq. (1)' given previously. The operational flow then proceeds to a step S305 to calculate a difference in angular-speed variance Δ(Δω)n−1 expressed by Eq. (21) in terms of calculated values of the crank angular speed ωn by using the technique based on a two-stage differential calculation for two cylinders operationally separated from each other by 360° CA (or the 360° −CA differential technique):

$$\Delta(\Delta\omega)n-1=(\omega n-\omega n-1)-(\omega n-3-\omega n-4) \quad (21)$$

As expressed by Eq. (21), the difference in angular-speed variance Δ(Δω)n−1 is a two-stage difference obtained by finding a difference in angular-speed variance between two pairs of cylinders operationally separated from each other by 360° CA.

After computing the difference in angular-speed variance Δ(Δω)n−1, the operational flow then continues to a step S306 at which the ECU 9 compares the difference in angular-speed variance Δ(Δω)n−1 with the misfire criterion value REF2 set in advance for the difference in angular-speed variance Δ(Δω)n−1. If the difference in angular-speed variance Δ(Δω)n−1 is found greater than the misfire criterion value REF2, the operational flow goes on to a step S307 at which the contents of the CMF counter of the tentative-misfire counter 912 is incremented by one. The operational flow then proceeds to a step S308.

If the difference in angular-speed variance Δ(Δω)n−1 is found equal to or smaller than the misfire criterion value REF2 at the step S306, on the other hand, the operational flow goes on to processing of a step S308 without incrementing the contents of the CMF counter of the tentative-misfire counter 912.

At the step S308, the difference in angular-speed variance Δ(Δω)n−1 is compared with a rough-road criterion value REF3 set in advance for the difference in angular-speed variance Δ(Δω)n−1. The rough-road criterion value REF3 is smaller than the misfire criterion value REF2 (that is, REF3<REF2).

On a-rough road, the internal combustion engine 1 is generally put in a state in which a transient variation in rotation is apt to occur. Also if such a state continues, the tolerance learning process should not be carried out.

If the ECU 9 finds the difference in angular-speed variance Δ(Δω)n−1 exceeds the rough-road criterion value REF3 at the step S308 and even though it is found equal to or smaller than the misfire criterion value REF2 at the step 1334 S306, the ECU 9 determines that the internal combustion engine 1 is currently running on a rough road. In this case, the operational flow goes on to a step S309 to increment the contents of the rough-road (CRG) counter 911 by one.

If the difference in angular-speed variance Δ(Δω)n−1 is found equal to or smaller than the rough-road criterion value REF3 at the step S308, on the other hand, the operational flow proceeds to a step S310 without incrementing the contents of the rough-road (CRG) counter 911.

In the routine for checking conditions for the execution of the tolerance learning process, the processing starting from the step S310 shown in FIG. 10 is misfire determining processing for detecting consecutive misfires occurring in a row in cylinders operationally separated from each other by 360° CA which misfires can not be detected by the 360° CA differential technique. The misfire determining is explained as follows.

After the ECU 9 completes the rough-road determination, the operational flow goes on to a step S310 at which the ECU 9 finds out whether or not the feedback (F/B) control based on the air-fuel ratio (A/F) is being executed from a signal output by the oxygen ($O_2$) sensor 15.

It is ascertained by the inventors that, when a misfire occurs in an internal combustion engine 1 which is currently carrying out such feedback (F/B) control, the sum of air-fuel ratio feedback correction coefficients cfb and an average value cfbAV of the air-fuel ratio feedback correction coefficients cfb is shifted to the upper side (that is, the fuel lean (L) side of the air-fuel ratio) than the initial tolerance due to characteristics of the oxygen ($O_2$) sensor 15 and differences in engine characteristics among internal combustion engines.

If the feedback (F/B) control based on the air-fuel ratio is found being executed at the step S310, the operational flow goes on to a step S311 at which the ECU 9 compares the sum of air-fuel ratio feedback correction coefficients cfb and the average value cfbAV with the initial tolerance. If the former is found greater than the latter, a misfire is determined to have occurred, in which case the operational flow proceeds to a step S 312 to increment the contents of the COF counter of the tentative-misfire counter 912 by one.

The determination of the step S311 is made on the assumption that the feedback (F/B) control based on the air-fuel ratio is being carried out. However, it is desirable to make a determination as to whether or not the internal combustion engine 1 is normally ignited even if such feedback (F/B) control is not carried out as in the case of an increased large amount of load fuel for example.

In this connection, it is verified that, if a misfire occurs in an internal combustion engine 1 with the oxygen ($O_2$) sensor 15 activated, either of the following states holds true:
(A) The period of a signal output by the oxygen ($O_2$) sensor 15 is shortened extremely, or
(B) The signal output by the oxygen ($O_2$) sensor 15 stays on the lean (L) side.
Results of measurements with respect to the states (A) and (B) are shown in FIGS. 11 and 12 respectively.

Let the period of a signal output by of the oxygen ($O_2$) sensor 15 be reduced due to a misfire occurring in the internal combustion engine 1. In this case, as shown by the $O_2$ sensor output in FIG. 11, the reduced period can be distinguished from the amplitude period which is in the range 0.5 to 2 Hz for normal ignitions. The reduced period becomes equal to the ignition period shown as 'csgt' in FIG. 11.

Figure 11:
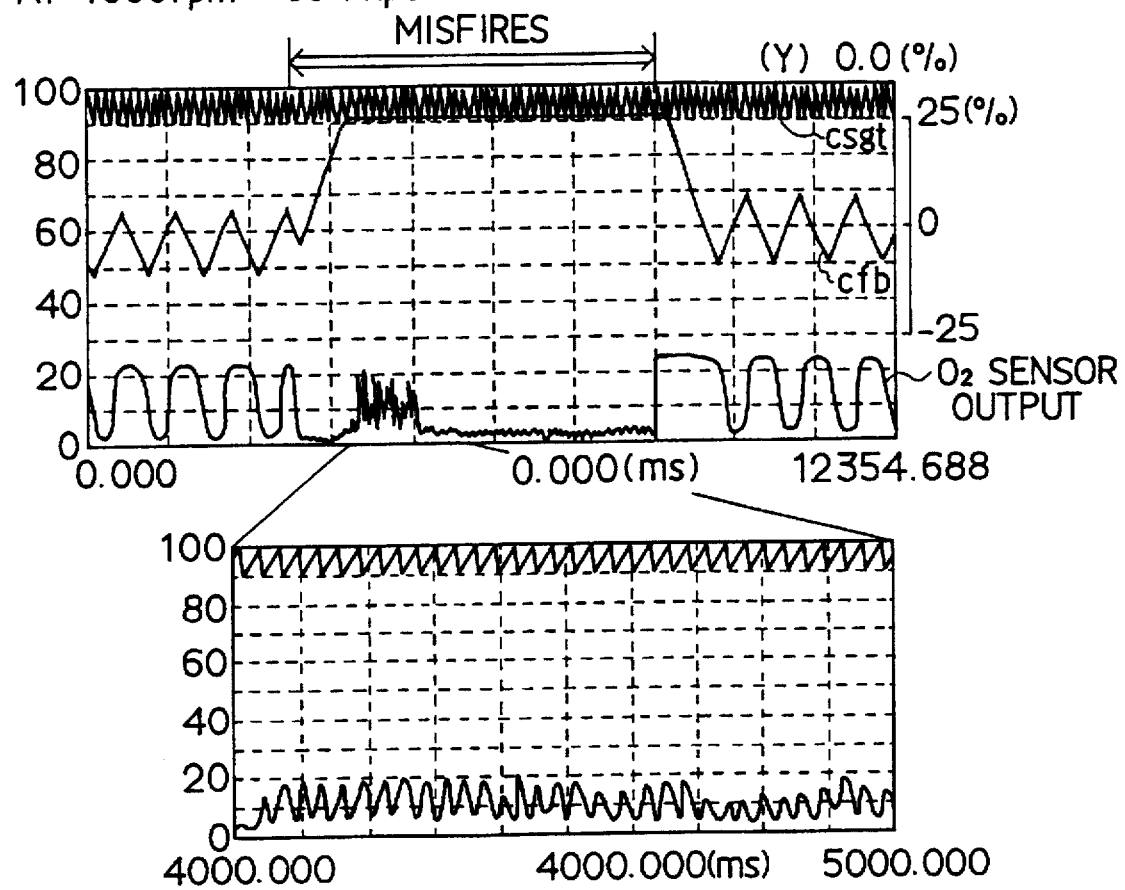
FIG. 11 is a timechart of a typical signal output by an oxygen ($O_2$) sensor in the event of a misfire.
Figure 12:
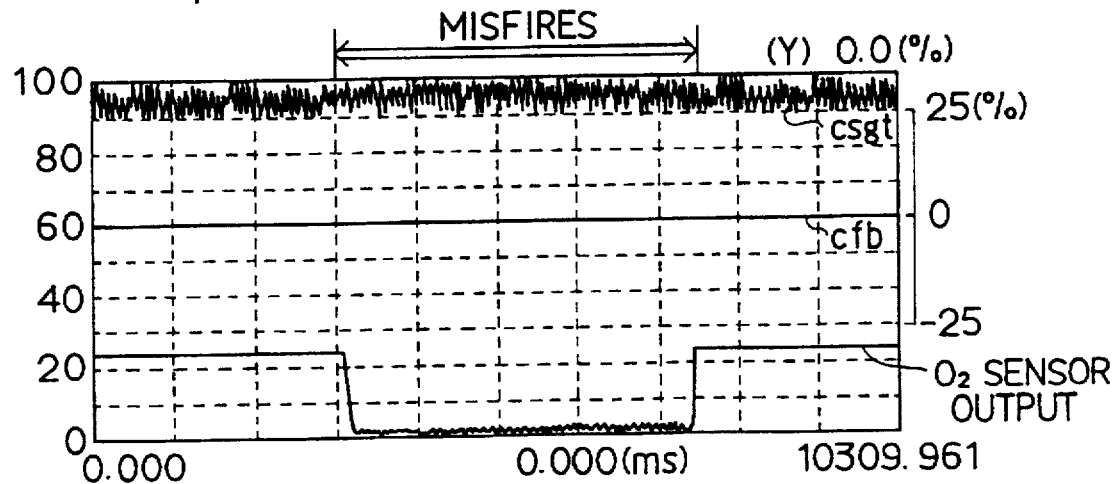
FIG. 12 is a timechart of a typical signal output by an oxygen ($O_2$) sensor in the event of a misfire.

It should be noted that FIG. 11 also shows changes in feedback correction coefficient cfb of the air-fuel ratio with the feedback (F/B) control based on the air-fuel ratio executed. It is obvious from the figure that, when a misfire occurs in the internal combustion engine 1, the sum of air-fuel ratio feedback correction coefficients cfb and an average value cfbAV of the air-fuel ratio feedback correction coefficients cfb is increased to a large value.

In the case of a large amount of load (WOT) increasing in the internal combustion engine 1, the output of the oxygen ($O_2$) sensor 15 remains on the lean (L) side accompanying a misfire occurring in the internal combustion engine. In this case, as shown by the $O_2$ sensor output in FIG. 12, the signal output by the oxygen ($O_2$) sensor 15 is stuck on the lean (L) side than the amplitude period for normal ignitions for a sufficiently long time.

As described above, with the oxygen ($O_2$) sensor 15 activated, it is possible to determine whether or not a misfire has occurred in the internal combustion engine 1 by monitoring the signal output by the oxygen ($O_2$) sensor 15, that is, by checking whether the output signal is on the rich (R) or lean (L) side.

In a routine shown in FIG. 10 for checking conditions for the execution of the tolerance learning process, processing starting from a step S313 makes a determination as to whether or not a misfire has occurred in the internal combustion engine 1 from the signal output by the oxygen ($O_2$) sensor 15 in accordance with the principle described above.

If the outcome of the determination made at the step S310 indicates that the feedback (F/B) control based on the air-fuel ratio is not being carried out or if the sum of air-fuel ratio feedback correction coefficients cfb and an average value cfbAV of the air-fuel ratio feedback correction coefficients cfb is found equal to or smaller than the initial tolerance at the step S311 even with the feedback (F/B) control based on the air-fuel ratio not being carried out, the operational flow goes on to a step S313 at which ECU 9 finds out whether or not the oxygen ($O_2$) sensor 15 is activated.

If the oxygen ($O_2$) sensor 15 is found activated, the operational flow goes on to a step S314 at which the ECU 9 compares the period of a signal output by the oxygen ($O_2$) sensor 15 (that is, the amplitude period) with the amplitude period Fs for normal ignitions to examine whether or not the former is smaller than the latter.

Then, at a step S316, the ECU 9 compares the time duration of the output of the oxygen ($O_2$) sensor staying on the lean (L) side with the time TLOW of the output staying on the lean (L) side for normal ignitions to check whether or not the former is longer than the latter.

If the period of a signal output by the oxygen ($O_2$) sensor 15 (that is, the amplitude period) is found shorter than the amplitude period Fs for normal ignitions at the step S314, the operational flow goes on to a step S315 at which the ECU 9 increments the contents of the CF counter of the tentative-misfire counter 912 by one. In addition, if the time duration of the output of the oxygen ($O_2$) sensor staying on the lean (L) side is found longer than the time TLOW of the output staying on the lean (L) side for normal ignitions at the step S316, the operational flow goes on to a step S317 at which the ECU 9 increments the contents of the CF counter of the tentative-misfire counter 912 by one.

After checking all the items, the operational flow finally goes on to a step S318 at which the ECU 9 carries out processing to update the crank angular speed ωn calculated at the step S304 in addition to the crank angular speed for each cylinder. To be more specific, ωn−5 is discarded, ωn−5 is replaced by ωn−4, ωn−4 is replaced by ωn−3, ωn−3 is replaced by ωn−2, ωn−2 is replaced by ωn−1 and ωn−1 is replaced by ωn. Then the ECU 9 exits the routine for checking conditions for the execution of the tolerance learning process.

The routine checking conditions for the execution of the tolerance learning process is executed repeatedly till the contents of the ignition counter 909 exceed a predetermined value, typically, 100 as has been described in the explanation of the tolerance learning-process control routine with reference to FIG. 6.

FIG. 13 is used for explaining the processing carried out at the step S212 of the tolerance learning-process control routine, that is, the processing to make a determination as to whether or not the conditions for the execution of the tolerance learning process are satisfied.

As described previously, the routine shown in FIG. 13 for making a determination as to whether or not the conditions for the execution of the tolerance learning process are satisfied is performed when the outcome of the examination done at the step S211 shown in FIG. 6 indicates that the number of ignitions exceeds the predetermined value.

When-the routine for making a determination as to whether or not the conditions for the execution of the tolerance learning process are satisfied is performed, first of all, at a step S400, the learning-process control unit 906 of the ECU 9 examines whether or not the contents of any one of the CMF counter, the COF counter, the CF counter and the CT counter composing the tentative-misfire counter 912 are equal to or greater than one or the contents of the rough-road (CRG) counter 911 are equal to or greater than a predetermined rough-road criterion value KRG set for the CRG counter 911.

If the contents of any one of the CMF counter, the COF counter, the CF counter and the CT counter composing the tentative-misfire counter 912 are found equal to or greater than one or the contents of the rough-road (CRG) counter 911 are found equal to or greater than the predetermined rough-road criterion value KRG at the step S400, the operational flow goes on to a step S401 at which the ECU 9 sets a flag at a location in the RAM area 9c to indicate that the tolerance learning process is not executable.

If the contents of all of the CMF counter, the COF counter, the CF counter and the CT counter composing the tentative-misfire counter 912 are found smaller than one or the contents of the rough-road (CRG) counter 911 are found smaller than the predetermined rough-road criterion value KRG at the step S400, on the other hand, the operational flow goes on to a step S402 at which the ECU 9 sets a flag at a location in the RAM area 9c to indicate that the tolerance learning process is executable.

After either of the flags is set, the ECU 9 resets the tentative-misfire counter 912 and the rough-road counter 911 before exiting the routine for making a determination as to whether or not the conditions for the execution of the tolerance learning process are satisfied.

At the step S213 of the tolerance learning-process control routine shown in FIG. 6, the ECU 9 examines the contents of the flag indicating that the tolerance learning process is executable or the flag indicating that the tolerance learning process is not executable to make a determination as to whether or not the execution of the tolerance learning process is possible. In other words, only when all check items are found normal in the routine shown in FIGS. 9 and 10 for making a determination as to whether or not the conditions for the execution of the tolerance learning process are satisfied, is the tolerance learning process under the conditions, that is, the processing to update the learned-value $\Delta\theta nL(NE, PM)$ carried out. As a result, the reliability of the learned-value $\Delta\theta nL$ (NE, PM) is naturally maintained at a high level.

The misfire detecting apparatus according to the present embodiment described above offers the following excellent merits:

(a) In a six cylinder internal combustion engine in which the misfire detecting apparatus according to the present embodiment is used, a difference in angular-speed variance among cylinders $\Delta(\Delta\omega)n-1720$, a difference in angular-speed variance among cylinders $\Delta(\Delta\omega)n-1360$ and a difference in angular-speed variance among cylinders $\Delta(\Delta\omega)n-1120$ calculated by using the 720° –CA differential technique, the 360° –CA differential technique and the 120° –CA differential technique respectively are compared with predetermined misfire criterion values REF720, REF360 and REF120. A result of comparison of the difference in angular-speed variance among cylinders $\Delta(\Delta\omega)n-1720$ calculated by using the 720° –CA differential technique with the predetermined misfire criterion value REF720 can be used for detecting an intermittent occurrence of a misfire. In addition, a result of comparison of the difference in angular-speed variance among cylinders $\Delta(\Delta\omega)n-1120$ calculated by using the 120° –CA differential technique with the predetermined misfire criterion value REF120 can be used for detecting consecutive misfires occurring in a row in opposing cylinders. On the other hand, a result of comparison of the difference in angular-speed variance among cylinders $\Delta(\Delta\omega)n-1360$ calculated by using the 360° –CA differential technique with the predetermined misfire criterion value REF360 can be used for detecting consecutive misfires other than consecutive misfires occurring in a row in opposing cylinders. In this way, since the differential techniques can be used for detecting different misfire patterns, misfires can be prevented from being undetected, making it possible to detect all misfire patterns generated in the internal combustion engine 1 with a high degree of accuracy.

(b) In addition, by using a total number of a plurality of different misfire counts obtained by using the differential techniques, a final determination as to whether or not a misfire has occurred can be made. To be more specific, a warning lamp 12 is turned on to notify the driver of a misfire abnormality in accordance with the total number of various misfire counts. With such a configuration, a good effect is realized particularly when the misfire pattern changes from intermittent misfires to consecutive misfires or vice versa. (c) When the occurrence of a misfire is detected by the implementation of either one of the 720° –CA differential technique, the 360° –CA differential technique and the 120° –CA differential technique, the remaining differential techniques are not implemented. According to the order of priority which is set in accordance with the accuracy of detection thereof, the techniques are put in the following order: the 720° –CA differential technique followed by the 360° –CA differential technique and finally followed by the 120° –CA differential technique. In this way, the occurrence of a misfire can be detected with an even higher degree of accuracy. In addition, since a plurality of differential calculations are carried out exclusively of each other, unnecessary extra calculation can be eliminated, allowing the accuracy of computation to be increased in building a microcomputer-aided misfire detecting apparatus.

(d) By learning the difference in angular-speed variance among cylinders (or the tolerance in angle among cylinders) for each cylinder and for each operating condition in the internal combustion engine 1, an extremely accurate crank angular speed $\omega n$ can be calculated for the cylinder and the operating condition. Therefore, the difference in angular-speed variance among cylinders $\Delta(\Delta\omega)n-1$ computed from changes in crank angular speed naturally becomes accurate as well. As a result, the accuracy of a determination made to determine the occurrence of a misfire by comparison of the difference in angular-speed variance among cylinders with the misfire criterion value can be sustained at an extremely high level. Even if there are variations in change in internal combustion engine rotational speed among the cylinders as is the case with the 120° –CA differential technique, correction processing by using a learned value $\Delta\theta nL$ in the configuration described above allows the accuracy of the misfire detection to be maintained at a high level.

(e) In addition, to say nothing about the occurrence of a misfire determined by means of the 360° –CA differential technique, in particular, consecutive misfires occurring in a row in opposing cylinders operationally separated from each other by 360° CA, which misfires can not be detected so far, can now be detected by using the 360° –CA differential technique. Since a process to learn values to be used in the determination made to determine the occurrences of such misfires is carried out only after normal ignitions have been verified, the accuracy of the learned values can be sustained at a high level.

(f) When the internal combustion engine 1 is currently running under specific operating conditions, that is, the so-called specific operating states in which the occurrence of a misfire can not be determined such as transient states such as abrupt acceleration and abrupt deceleration, a shift-change state, a fuel-cut time, a restoration time, a start time, an electrical-load introduction time, a purge control state, EGR (exhaust rotary-operational flow control) execution, execution of variable air absorption, a specific operating state causing a large variation in rotation of the crankshaft and a small-load operating zone and a high-rotation zone, the execution of the learning process is disabled, allowing the accuracy of the learned values to be sustained at a high level.

(g) By adding a transient correction term to Eqs. (7) to (11) in the calculation of the deviation time $\Delta Tn$, effects of transient variations in rotational deviation due to changes in operating conditions in the internal combustion engine 1 during, for example, acceleration or deceleration can be well eliminated.

It should be noted that, in the misfire detecting apparatus according to the present embodiment, after the first cylinder (or cylinder #1) is identified at the step S204 of the tolerance learning-process control routine shown in FIG. 6, all the deviation times between the first cylinder (or cylinder #1) and the other second to sixth cylinders (or cylinders #2 to #6) are found. In the case of an internal combustion engine having an even number of cylinders, however, since crank angles of cylinders operationally separated from each other by 360° are detected through the same rotor detection unit, the deviation time between these cylinders is small in the first place.

For this reason, a configuration can be made for learning a tolerance between cylinders in each combination of cylinders operationally separated from each other by 360° CA. In the case of a six cylinder internal combustion engine, there are three combinations of such cylinders. With such a configuration, the amount of processing carried out by the ECU 9 as well as the storage capacities of ROM and RAM units and other memory units required for the processing can be reduced considerably.

A cylinder verified at the step S204 of the tolerance learning-process control routine shown in FIG. 6 does not have to be the first cylinder (or cylinder #1). Any other cylinder can be verified. In a word, any scheme will work as long as the deviation times between a particular cylinder (or a pair of cylinders) and other cylinders (or pairs of cylinders) can be calculated.

At the step S208 and the step S214 of the tolerance learning-process control routine shown in FIG. 6, the ECU 6 calculates or learns the deviation $\Delta\theta n$ for each rotational speed NE and each internal combustion engine load PM, parameters representing operating conditions of the internal combustion engine 1, in order to find data stored in memory areas shown in FIGS. 7 and 8 respectively. Even if the operating conditions of the internal combustion engine 1 are taken into consideration, however, the tolerance in rotation deviation shows no variation with the load as indicated by a relation between the load and the tolerance in rotation deviation between a pair of the first and fourth cylinders and a pair of the second and fifth cylinders shown in FIG. 14A, and a relation between the load and the tolerance in rotation deviation between the pair of the first and fourth cylinders and a pair of the third and sixth cylinders shown in FIG. 14B.

For this reason, the column of the internal combustion engine load serving as an operating condition can be eliminated from the memory structures shown in FIGS. 7 and 8, leaving a simplified configuration wherein the difference in crank angle $\Delta\theta n$ is calculated or learned only for each cylinder and each rotational speed. Also with such a configuration, the amount of processing carried out by the ECU 9 as well as the storage capacities of ROM and RAM units and other memory units required for the processing can be reduced considerably.

Even if the difference in crank angle $\Delta\theta n$ is to be calculated or learned for each operating condition of the internal combustion engine 1, there are only few opportunities in the internal combustion engine to calculate or learn the difference in crank angle $\Delta\theta n$. For this reason, learned values are not found and the occurrence of a misfire, if any, can not thus be detected. As shown in FIG. 15, however, the deviation (tolerance) in crank angle among cylinders exhibits a tendency of increasing all but linearly with the rotational speed.

When the tolerances are learned under two highly frequent operating conditions in, for example, a low-rotation zone of the internal combustion engine 1, it is possible to derive the tolerances for the high-rotation zone of the internal combustion engine 1 by the so-called linear interpolation. By adopting this principle, the tolerances for the high-rotation zone of the internal combustion engine 1 are deduced, and by learning the deduced tolerances, the problems described above can be well solved.

According to the same principle, the tolerances in a region beyond the conditions for the tolerance learning process can also be learned in anticipation of a great variation in rotation occurring in the internal combustion engine 1.

When a misfire occurs in the internal combustion engine 1, the unburned gas is burned later on in the exhaust pipe 14. In such a case, the function carried out at the steps S314 and S316 of the routine shown in FIGS. 9 and 10 for checking the conditions for the execution of the tolerance learning process to make a determination as to whether or not a misfire has occurred by using a signal output by the oxygen ($O_2$) sensor 15 may not work correctly. In the misfire detecting apparatus according to the present embodiment, however, the following countermeasures can be taken:

an exhaust-gas temperature sensor is provided for detecting the temperature of exhausted gas and if the temperature of exhausted gas exceeds a predetermined value, the execution of the learning process is disabled, or under an operating condition in which later-burning is apt to occur such as an operating condition in a high-load state, the execution of the learning process is disabled. By taking the countermeasures described above, the problems can be well solved.

In the misfire detecting apparatus according to the present embodiment, a system for carrying out feedback (F/B) control based on the air-fuel ratio based on a signal output by the oxygen ($O_2$) sensor 15 is assumed. It should be noted, however, that a linear air-fuel ratio sensor for linearly detecting the air-fuel ratio from the burned gas of the internal combustion engine 1 can also be used in a system for carrying out feedback (F/B) control based on the air-fuel ratio based on a signal output by the linear air-fuel ratio sensor. In such a system, the signal output by the linear air-fuel ratio sensor is used in making a determination as to whether or not a misfire has occurred in place of the processings carried out at the steps S314 to S316 in the routine for checking the conditions for the execution of the tolerance learning process shown in FIGS. 9 and 10.

In the case of the linear air-fuel ratio sensor, if a misfire occurs in the internal combustion engine 1, a state results wherein either of the following takes place:

(a) the signal output by the linear air-fuel ratio sensor changes to a value on the lean side, or (b) the signal output by the linear air-fuel ratio sensor as a whole has an offset to the lean side Accordingly, in this case, the learning-process control unit 906:

increments the contents of the CF counter by one when the signal output by the linear air-fuel ratio sensor is on the lean side for a time longer than a predetermined period, and increments the contents of the CT counter by one when the average value of the signals output by the linear air-fuel ratio sensor is on the lean side for a time longer than a predetermined period.

It should be noted that, as a sensor that can contribute to the determination made to determine whether or not a misfire has occurred, an HC concentration sensor or the like can also be employed as well.

In addition, the selection of items to be checked or their combination in the routine for checking the conditions for the execution of the tolerance learning-process routine shown in FIGS. 9 and 10 is arbitrary. Items to be checked or their combination can be selected with a high degree of freedom in accordance with the size of the system in which the occurrence of a misfire is to be detected. It is needless to say that, if all the items described above are selected, the reliability of the learned values are maximized to the highest degree.

In the misfire detecting apparatus according to the present embodiment, the 360° −CA differential technique based on Eq. (21) is adopted in the calculation of the difference in difference $\Delta(\Delta\omega)n-1$ carried out at the step S305 in the routine for checking the conditions for the execution of the tolerance learning process shown in FIGS. 9 and 10.

If a misfire occurs in the cylinder, however, the crank angular speed ωn returns thereafter to a normal angular speed gradually. It is thus desirable to introduce later crank angular speeds ωn+2 and ωn+3 in the 360° −CA differential technique as shown in Eq. (21)' as follows:

$$\Delta(\Delta\omega)n-1=(\omega n-\omega n-1)-(\omega n+3-\omega n+4) \quad (21)'$$

By using Eq. (21)' in the 360° CA differential technique, an even greater value is obtained as a difference in difference $\Delta(\Delta\omega)n-1$ in the event of a misfire, enhancing the S/N (signal-to-noise) ratio.

In addition, in the misfire detecting apparatus according to the present embodiment, in the processing shown in FIG. 13 for making a determination as to whether or not the conditions for the execution of a tolerance learning process are satisfied, learned values are updated on the condition that the flag to indicate an executable tolerance learning process is set. Instead of this condition, a learning algorithm can also be adopted wherein, for example, a learned value is updated only if the difference between a new value for updating and the previous learned value to be updated is equal to or greater than a predetermined value and the new value for updating remains all but unchanged in consecutive learning processes. With such an algorithm, a previously learned value will not be updated in an incorrect learning process with a newly learned value which is found by chance in the learning process. As a result, the reliability of the learned value is further enhanced.

As described above, in the calculation of the learned value of the tolerance carried out in the misfire detecting apparatus according to the present embodiment, the deviation for each operating condition is calculated till a predetermined number of samples are reached and the learned value $\Delta\theta nL$ (NE, PM) is found from the average value $\Delta\theta n$ (NE, PM)AV (strictly speaking, by means of the averaging processing based on Eq. (20)). It should be noted, however, that a value obtained from an averaging process carried out on the deviation for each operating condition till the predetermined number of samples are reached can also be used properly in place of the average value.

In the misfire detecting apparatus according to the present embodiment as described earlier, in a process of making a determination as to whether or not a misfire has occurred in the main routine shown in FIGS. 3 to 5, the difference in angular-speed variance $\Delta(\Delta\omega)n-1$ which is compared with the misfire criterion value REF is corrected by using the learned value described above. It should be noted that, instead of the difference in angular-speed variance $\Delta(\Delta\omega)$ n−1, the misfire criterion value REF itself can of course be corrected.

The learned value does not have to be the difference in crank angle (or the tolerance in crank angle between cylinders). Instead, a value equivalent to the difference in crank angle such as the crank-angular speed or the deviation in crank-angular speed can also be used as well as a learned value.

(Second Embodiment)

Figure 16:
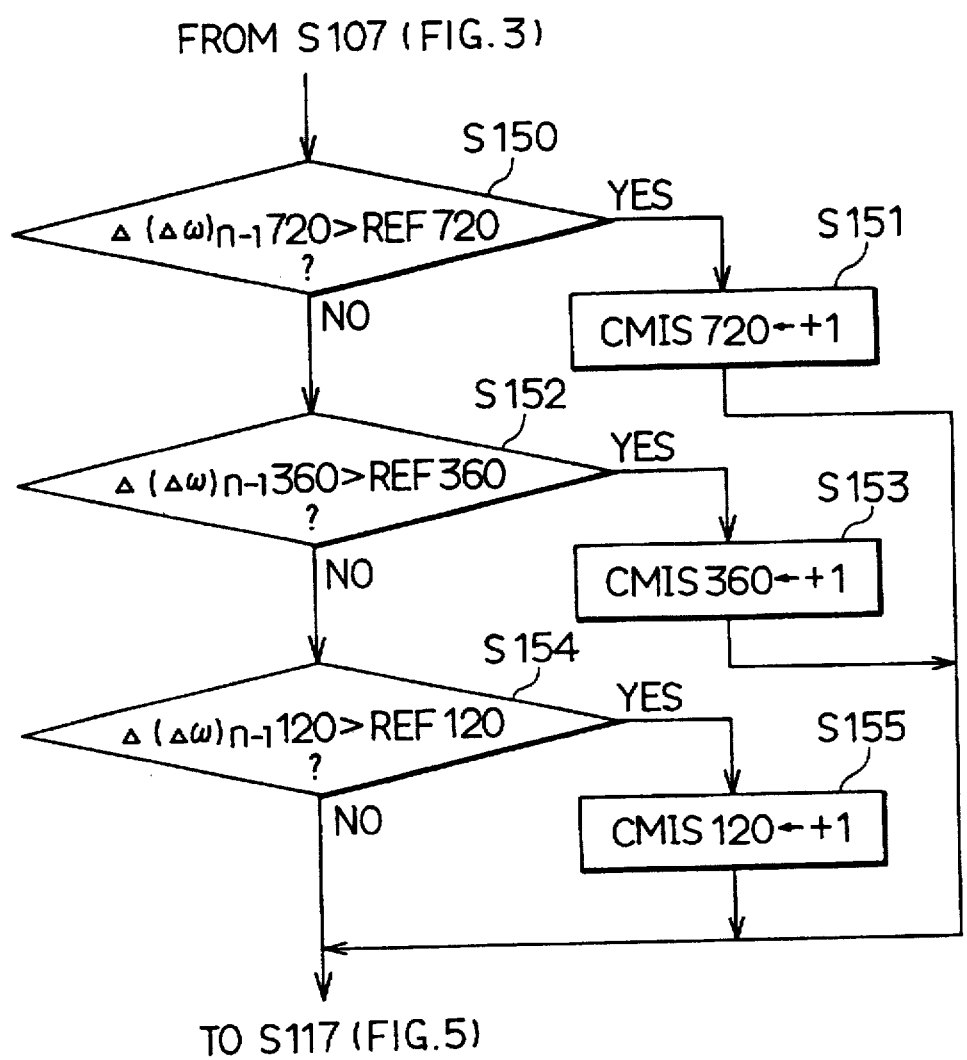
FIG. 16 is a flowchart partially showing a main routine according to a second embodiment of the present invention for making a determination as to whether or not a misfire has occurred.

The second embodiment is a modification of a portion of the main routine of the first embodiment shown in FIGS. 3 to 5. FIG. 16 shows a flowchart of the modified portion. The operational flow shown in FIG. 16 corresponds to the steps S108 to S116 of the main routine shown in FIGS. 3 to 5. The rest conforms to the operational flow shown in FIGS. 3 to 5.

At the step S107 shown in FIG. 3, the difference in angular-speed variance among cylinders $\Delta(\Delta\omega)n-1720$, the difference in angular-speed variance among cylinders $\Delta(\Delta\omega)$ n−1360 and the difference in angular-speed variance among cylinders $\Delta(\Delta\omega)n-1120$ are calculated by means of the 720° −CA differential technique, the 360° −CA differential technique and the 120° −CA differential technique respectively as shown by a flowchart of FIG. 16. At steps S150, S152 and S154 shown in FIG. 16, the ECU 9 compares the difference in angular-speed variance among cylinders $\Delta(\Delta\omega)n-1720$, the difference in angular-speed variance among cylinders $\Delta(\Delta\omega)n-1360$ and the difference in angular-speed variance among cylinders $\Delta(\Delta\omega)n-1120$ with the predetermined misfire criterion values REF720, REF360 and REF120 respectively in a priority order of the 720° −CA differential technique followed by the 360° −CA differential technique and ending with the 120° −CA differential technique. To be more specific, the difference in angular-speed variance among cylinders $\Delta(\Delta\omega)n-1720$ is compared with the predetermined criterion value REF720 first and the difference in angular-speed variance among cylinders $\Delta(\Delta\omega)n-1120$ is compared with the predetermined criterion value REF120 last. If a comparison of a difference in angular-speed variance among cylinders with a predetermined misfire criterion value corresponding thereto carried out at a step indicates that a misfire has occurred, the remaining lower-priority comparisons need not to be carried out at the subsequent steps.

If the outcome of the comparison carried out at the step S150, S152 or S154 is an affirmation (YES), the ECU 9 increments the contents of the counter CMISn for each cylinder of the tentative-misfire counter 904 shown in FIG. 2 (in this case, the counter CMIS720, CMIS360 or CMIS120) by one at a step S151, S153 or S155. After completing the processing shown in FIG. 16, the ECU 9 returns to the step S117 shown in FIG. 5 to carry out hereafter processing of making a determination as to whether or not a misfire has occurred in accordance with the number of misfires stored in each counter. Since this processing is the same as the one already described before, the explanation thereof is omitted here.

Much like the first embodiment, with the second embodiment, the differential techniques can be used for detecting different misfire patterns. As a result, misfires can be prevented from being undetected, making it possible to detect all misfire patterns generated in the internal combustion engine 1 with a high degree of accuracy. In comparison with the first embodiment, the processings carried out at the steps S113, S114 and S115 shown in FIG. 4 are eliminated, making the entire operational flow simple.

(Third Embodiment)

Figure 17:
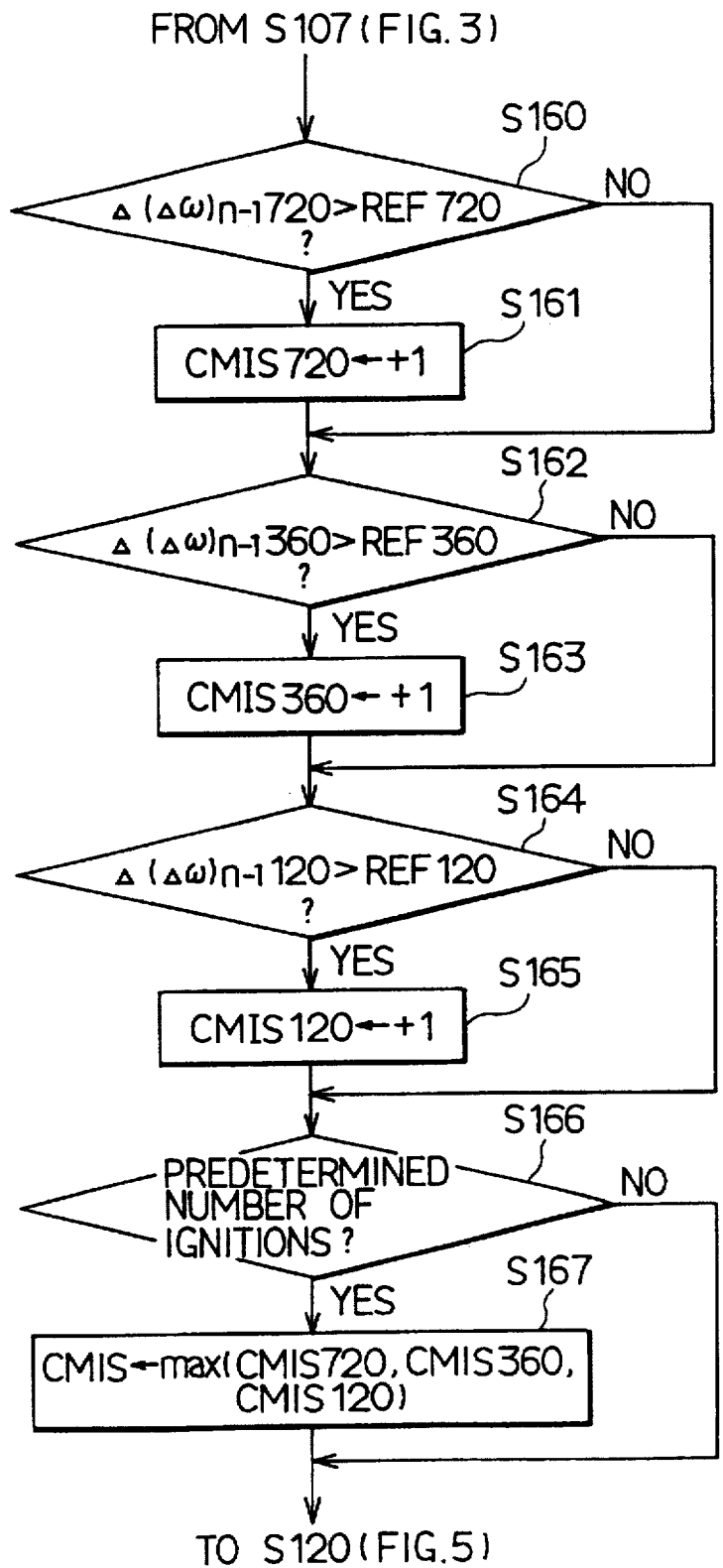
FIG. 17 is a flowchart partially showing a main routine according to a third embodiment of the present invention for making a determination as to whether or not a misfire has occurred.

Much like the second embodiment, the third embodiment is also obtained by modifying a portion of the main routine of the first embodiment shown in FIGS. 3 to 5. FIG. 17 shows a flowchart of the modified portion. To be more specific, the operational flow shown in FIG. 17 corresponds to the steps S108 to S119 of the main routine shown in FIGS. 3 to 5. The rest conforms to the operational flow shown in FIGS. 3 to 5.

At the step S107 shown in FIG. 3, the difference in angular-speed variance among cylinders $\Delta(\Delta\omega)n-1720$, the difference in angular-speed variance among cylinders $\Delta(\Delta\omega)n-1360$ and the difference in angular-speed variance among cylinders $\Delta(\Delta\omega)n-1120$ are calculated by means of the 720° $-CA$ differential technique, the 360° $-CA$ differential technique and the 120° $-CA$ differential technique respectively. Then, the operational flow goes on to a step S160 at which the ECU 9 starts to successively make misfire determination in three ways.

At the step S160, the ECU 9 compares the difference in angular-speed variance among cylinders $\Delta(\Delta\omega)n-1720$ with the predetermined misfire criterion value REF720. If the difference in angular-speed variance among cylinders $\Delta(\Delta\omega)n-1720$ is found greater than the predetermined misfire criterion value REF720 (that is, if $\Delta(\Delta\omega)n-1720>REF720$), the operational flow proceeds to a step S161 at which the ECU 9 increments the contents of the counter CMISn for each cylinder of the tentative-misfire counter 904 shown in FIG. 2 (in this case, the counter CMIS720) by one.

The operational flow then goes on to a step S162 at which the ECU 9 compares the difference in angular-speed variance among cylinders $\Delta(\Delta\omega)n-1360$ with the predetermined misfire criterion value REF360. If the difference in angular-speed variance among cylinders $\Delta(\Delta\omega)n-1360$ is found greater than the predetermined misfire criterion value REF360 (that is, if $\Delta(\Delta\omega)n-1360>REF360$), the operational flow proceeds to a step S163 at which the ECU 9 increments the contents of the counter CMISn for each cylinder of the tentative-misfire counter 904 shown in FIG. 2 (in this case, the counter CMIS360) by one. The operation further proceeds to a step S164 at which the ECU 9 compares the difference in angular-speed variance among cylinders $\Delta(\Delta\omega)n-1120$ with the predetermined misfire criterion value REF120. If the difference in angular-speed variance among cylinders $\Delta(\Delta\omega)n-1120$ is found greater than the predetermined misfire criterion value REF120 (that is, if $\Delta(\Delta\omega)n-1120>REF120$), the operational flow proceeds to a step S165 at which the ECU 9 increments the contents of the counter CMISn for each cylinder of the tentative-misfire counter 904 shown in FIG. 2 (in this case, the counter CMIS120) by one.

The operational flow then continues to a step S166 at which the ECU 9 checks whether or not the number of ignitions has achieved a predetermined value. If the number of ignitions has achieved the predetermined value, the operational flow proceeds to a step S167 at which the ECU 9 takes the maximum value among the contents of the counters CMIS720, CMIS360 and CMIS120 as the contents of the CMIS counter which represents a final number of misfires (CMIS=MAX (CMIS720, CMIS360, CMIS120). It should be noted that the CMIS counter which represents a final number of misfires can be found once the number of misfires for each cylinder has been calculated.

Then, after completing the processing shown in FIG. 17, the operational flow goes on to a step S120 shown in FIG. 5 at which the ECU 9 carries out a misfire determining process in accordance with the contents of the CMIS counter. Since this processing is the same as the processing which has already been described, the explanation thereof is omitted.

Also with the third embodiment, various misfire patterns can be detected by the differential techniques much like the first embodiment. As a result, undetected misfires can be avoided, allowing all misfire patterns that may be generated in the internal combustion engine 1 to be detected with a high degree of accuracy. In addition, in the case of the third embodiment in particular, all the differential techniques are implemented at the same time, resulting an effect of avoiding undetected misfires with an even higher degree of reliability.

In the case of the third embodiment, in a period till a predetermined number of ignitions are carried out, a maximum value of the number of misfires obtained by implementing a plurality of differential calculation techniques is used as a final number of misfire detections and a determination as to whether or not a misfire has occurred is made by using this final number of misfire detections. As a result, in the case of a misfire pattern followed by the same misfire patterns, the detection of the occurrence of a misfire can be implemented effectively.

(Fourth Embodiment)

A characteristic of an internal combustion engine which has not been mentioned in the description of the embodiments given so far is the fact that the difference in crank angle at a specific rotational speed becomes strikingly non-uniform due to, among other causes, vibration of the internal combustion engine's body. As an example, due to vibration of the internal combustion engine's body, the installation arm (or the stay) of an electromagnetic pick-up for detecting a crank angle resonates, causing the positional relation between the pick-up and the rotor detection unit to change.

Figure 18:
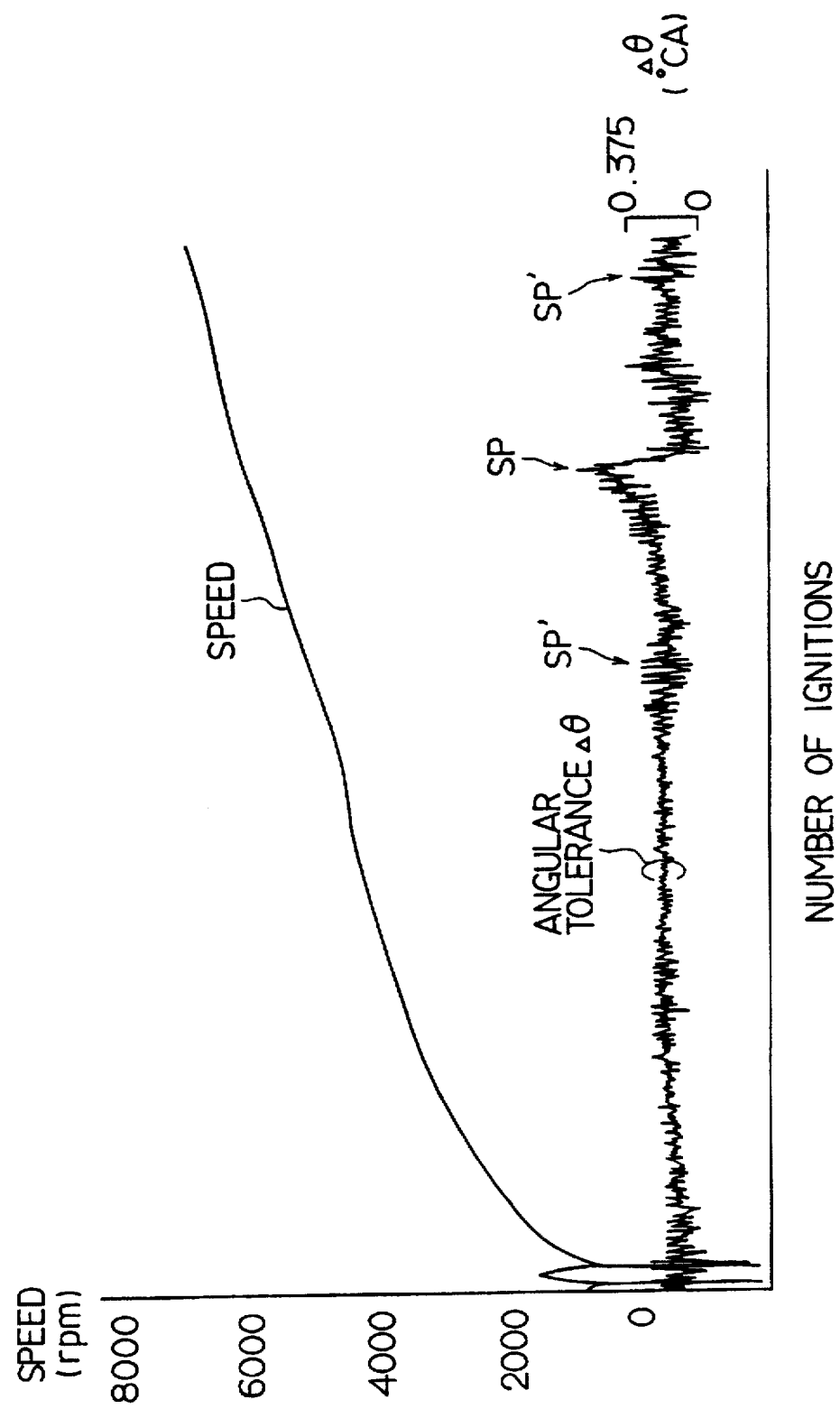
FIG. 18 is a graph indicating special points in the deviation in crank angle (or the tolerance)

In such a case, since the detection gap (thus, the detection time) of the rotor detection unit by means of the electromagnetic pickup becomes irregular, peculiar points SP and SP' shown in FIG. 18 may appear also in the difference in crank angle (the tolerance in crank angle) $\Delta\theta$ which is computed by using Eq. (12) for the detection time. FIG. 18 shows a relation between the rotational speed and the difference in crank angle (the tolerance in crank angle) $\Delta\theta$ which relation was measured for a series four cylinder internal combustion engine with a displacement of 1,800 cc.

When such peculiar points SP and SP' are observed, a tolerance learning process is carried out for each operating condition (rotational speed) with respect to the difference in crank angle (the tolerance in crank angle) $\Delta\theta$. Even if the difference in crank angle (the tolerance in crank angle) for other rotational-speed ranges is found from the learned values of the tolerance by linear interpolation, the characteristic of the tolerance in crank angle can not be reflected in the difference in crank angle with a high degree of accuracy. As a result, an incorrect determination as to whether or not a misfire has occurred made through the execution of the main routine shown in FIGS. 3 to 5 is inevitably entailed.

It should be noted that the way in which such peculiar points SP and SP' are generated varies depending upon the type and the shape of the internal combustion engine as well as the environment in which the internal combustion engine is located. It is difficult to identify operating conditions of the internal combustion engine under which the peculiar points SP and SP' are generated. If all tolerances in crank angle for all operating zones of the internal combustion engine in question have to be learned only because it is difficult to identify operating conditions of the internal combustion engine under which the peculiar points SP and SP' are generated, however, the memory capacity and others will appear as a limiting factor, making the misfire detecting apparatus impractical.

In order to solve those problems, this embodiment provides a misfire detecting apparatus which requires only a small amount of memory and can effectively eliminate effects of peculiar points even if the peculiar points appear in the difference in crank angle (the tolerance in crank angle) Δθ.

Figure 19:
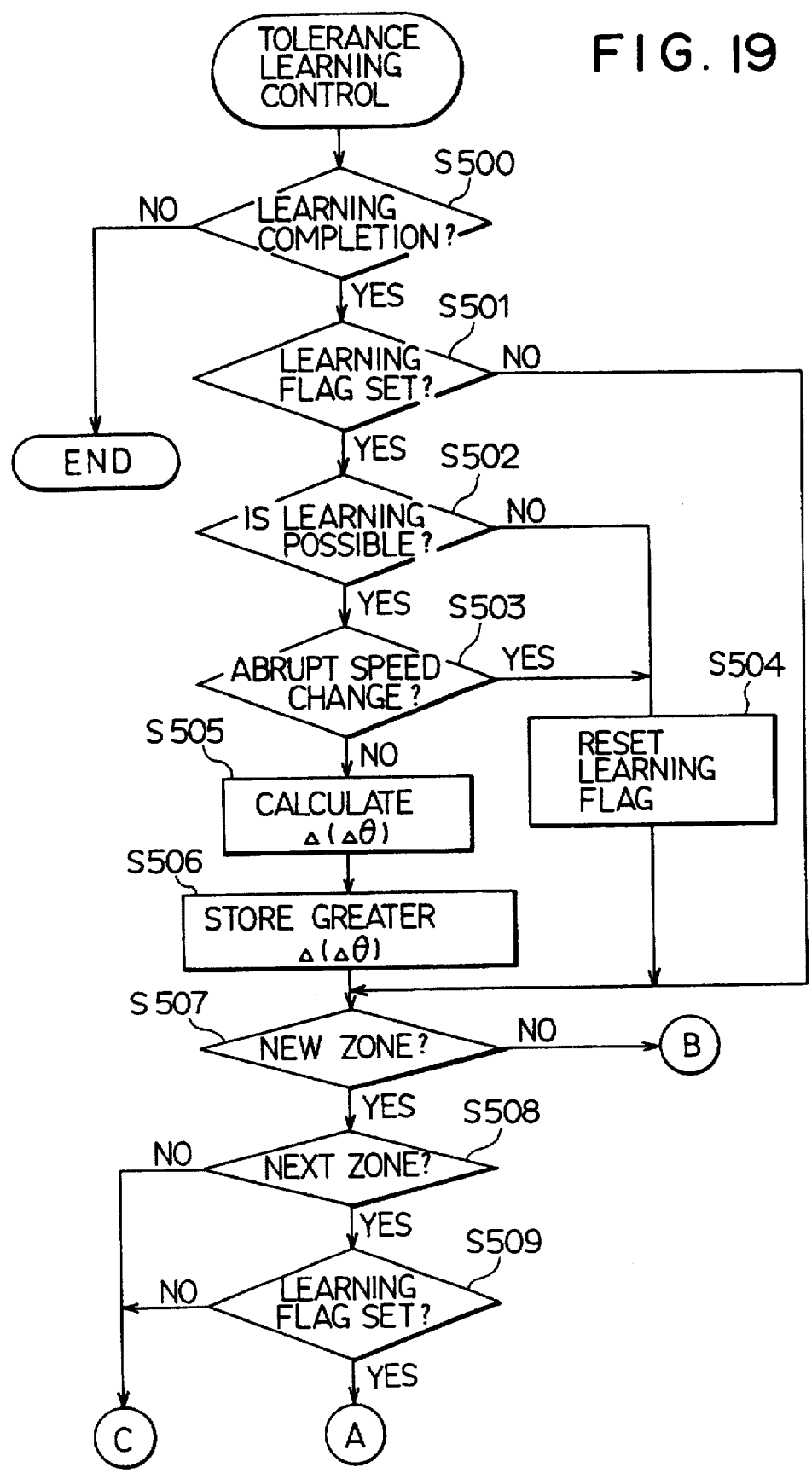
FIG. 19 is a flowchart of a deviation (tolerance) learning-process control routine, a countermeasure taken against special points, according to a fourth embodiment of the present invention.
Figure 20:
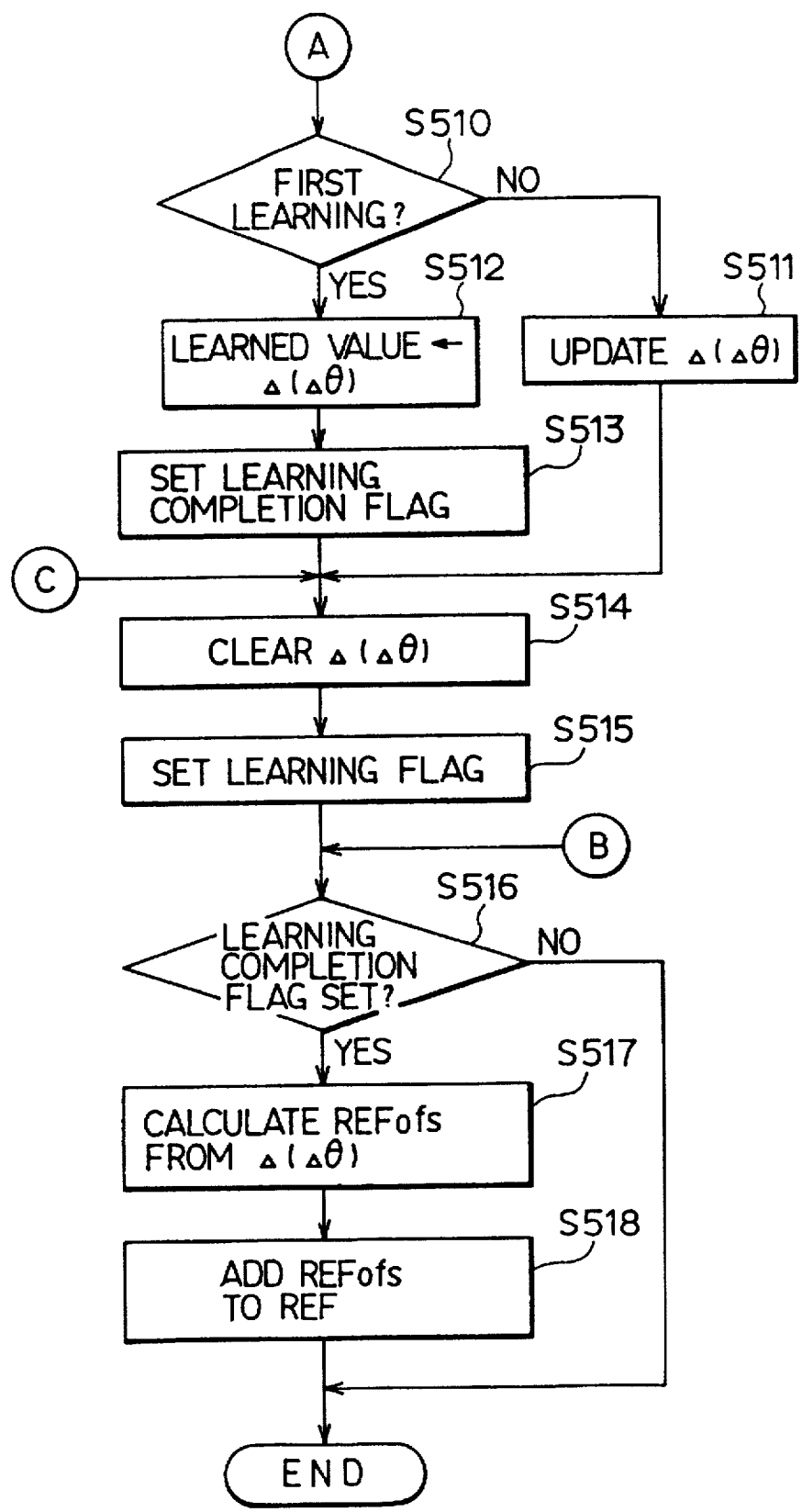
FIG. 20 shows a continuation of the flowchart of the deviation (tolerance) learning-process control routine shown in FIG. 19, a countermeasure taken against special points, according to a fourth embodiment of the present invention.

In the fourth embodiment, a deviation (tolerance) learning-process control routine shown in FIGS. 19 and 20 for learning a deviation between the learned value of the tolerance and a real tolerance including peculiar points is executed along with the tolerance learning process carried out by the preceding embodiments. The learned value of the deviation is then used for correcting the misfire criterion value REF120 used in the main routine shown in FIGS. 3 to 5. In this way, an incorrect misfire determination caused by the existence of the peculiar points can thus be avoided.

In this case, it is necessary to find a deviation between the learned value of a tolerance and a real tolerance in an interpolation region between specific rotational speeds (that is, parameters representing operating conditions) for which the tolerance learning process is carried out. Thus, the deviation (tolerance) learning-process control routine shown in FIGS. 19 and 20 divides the region of rotational speeds for which the tolerance learning process is carried out into zones or segments for each predetermined rotational speed (typically 500 rpm) associated with a learning region. Then, effects of the deviation between the learned value of a tolerance (or the interpolated value) and a real tolerance are suppressed for each of the segmentation zones. It should be noted that the deviation (tolerance) learning-process control routine is performed for execution by the ECU 9 for each ignition of the internal combustion engine 1, that is, for each 120° CA in the case of a six cylinder internal combustion engine or for each 180° CA in the case of a four cylinder internal combustion engine.

Details of the deviation (tolerance) learning-process control routine shown in FIGS. 19 and 20 are described one after another as follows.

Let the deviation (tolerance) learning-process control routine be performed accompanying an ignition in an arbitrary cylinder of the internal combustion engine 1. The operational flow begins with a step S500 at which the ECU 9 checks whether or not the tolerance learning process for a zone associated with the present rotational speed (or operating condition) of the internal combustion engine has been completed. If the tolerance learning process has not been completed, the operational flow returns to the main routine for the time being because comparison of the learned value with the real tolerance corresponding thereto can not be carried out any way.

If the tolerance learning process has been completed, on the other hand, the operational flow goes on to the next step S501 at which the ECU 9 checks whether or not a flag indicating that the tolerance learning process is being executed has been set. The flag indicating that the tolerance learning process is being executed is normally in a set state and is reset under a condition to be described next. The flag is used for preventing the tolerance learning process from being completed not sufficiently.

If only some differences between learned values of tolerances (or the interpolated values) and real tolerances are measured during tolerance learning processes for segmentation zones, it is quite within the bounds of possibility that a peculiar point with a greatest effect is not measured. In order to solve this problem, at a step S502, the ECU 9 examines whether or not the processing shown in FIGS. 9 and 10 for checking conditions for executing the tolerance learning process (which processing is carried out at the step S210 of the tolerance learning-process control routine shown in FIG. 6) has been executed and whether or not the processing shown in FIG. 13 for making a determination as to whether the conditions for executing the tolerance learning process are satisfied or not (which processing is carried out at the step S212 of the tolerance learning-process control routine shown in FIG. 6) has been executed. If either of the processings has not been executed, the operational flow goes on to a step S504. If at a step S503, the ECU 9 finds out that the measurement of tolerances in a specific zone can not be carried out with scrupulous care due to an abrupt change in rotational speed or the ECU 9 detects an insufficient state for completing the tolerance learning process in the specific region, the operational flow goes on to a step S504 at which the ECU 9 resets the flag indicating that the tolerance learning process is being carried out. In this way, the current tolerance learning process for the specific region remains to be completed.

If the flag indicating that the tolerance learning process is being carried out is found set at the step S501 and factors to cancel theses tolerance learning processes are not found, the operational flow goes on to a step S505 at which the ECU 9 finds a difference Δ(Δθ) between the learned value of the tolerance ΔθL and the real tolerance Δθ. As described above, the real tolerance Δθ can be calculated by using Eq. (12) from the detection gap (thus, the detection time) of the rotor detection unit by means of the electromagnetic pickup.

After the ECU 9 finds the difference Δ(Δθ), the operational flow goes on to a step S506 at which the ECU 9 stores the greater one of the currently stored difference Δ(Δθ) for the specific region and the difference Δ(Δθ) found this time at a predetermined location in the RAM are 9c shown in FIG. 1 in order to find a largest value of the difference Δ(Δθ). This operation indicates that the use of difference having the greatest effect such as that caused by a peculiar point as a learned value is taken into consideration.

The operational flow then goes on to a step S507 after the ECU 9 has stored a greater value of the difference Δ(Δθ) at the step S506, or has reset the flag indicating that the tolerance learning process is being carried out at the step S504 or has found out that the flag indicating that the tolerance learning process is being carried out is not set at the step S501. At the step S507, the ECU 6 checks whether or not the rotational speed has exited the present zone, transiting to a new zone. If the rotational speed has not transited to a new zone yet, only the computation of the difference Δ(Δθ) for the present zone, the operation to update the difference Δ(Δθ) with a greater value and processing carried out after a step S516 of FIG. 20 are repeated.

If the ECU 9 finds out at the step S507 that the rotational speed has already transited to a new zone, on the other hand, the operational flow proceeds to a step S508 at which the ECU 9 examines whether the new zone is a zone in which the rotational speed has been in before or a next zone following all zones passed through by the rotational speed prior to the transition, that is, a zone on a higher-speed side by one stage. If the transition is a return to a zone in which the rotational speed has been in before, the operational flow goes on to a step S514 of FIG. 20 to be described later instead of carrying out a learning process described below. This is because the measurement of the difference Δ(Δθ) can not be said to have been done for all zones prior to the transition.

If the ECU 9 finds out at the step S508 that transition to a new zone is a transition to the next zone, on the other hand, the operational flow goes on to a step S509 at which the ECU 9 checks whether or not the flag indicating that the tolerance learning process is being carried out is set. If the flag is found set, the ECU 9 carries out a tolerance learning process at steps S510 to S513. If the flag is found not set, on the other hand, or if the execution of the learning process through the steps S502 to S504 for a zone prior to the transition is found improper at one time, the operational flow also goes on to a step S514 of FIG. 20 to be described later instead carrying out a learning process described below. This is because the measurement of the difference $\Delta(\Delta\theta)$ can not be said to have been done for all zones prior to the transition.

In the execution of the tolerance learning process, first of all, at the step S510 of FIG. 20, the ECU 9 finds out whether or not the conditions for execution of the tolerance learning process in the zone being learned, that is, in the zone prior to the transition are satisfied for the first time.

If the conditions for execution of the tolerance learning process in the zone being learned, that is, in the zone prior to the transition are found satisfied for the first time, the operational flow goes on to a step S512 at which the ECU 9 catalogs the maximum value of the difference $\Delta(\Delta\theta)$ stored at a predetermined location in the RAM area 9c for the zone prior to the transition into the tolerance learned-value memory area as a learned value of the tolerance for the zone. The operational flow then continues to a step S513 at which the ECU 9 sets a tolerance learning-process completion indicating flag indicative of the completion of the tolerance learning process. Much like the tolerance learned-value memory area 910 shown previously in FIG. 8, the tolerance learned-value memory area is prepared in advance in a predetermined memory region in the back-up RAM area 9d shown in FIG. 1. The tolerance learned-value memory area has a structure that can be used for storing the difference $\Delta(\Delta\theta)$ for each zone (that is, for each rotational-speed range).

If the conditions for execution of the tolerance learning process in the zone being learned, that is, in the zone prior to the transition are found satisfied not for the first time, or if the conditions for execution of the tolerance learning process in the zone prior to the transition are found satisfied not for the second or subsequent time at the step S510, on the other hand, the operational flow goes on to a step S511 at which the ECU 9 updates the difference $\Delta(\Delta\theta)$ cataloged in the tolerance learned-value memory area as a learned value of the tolerance for the zone prior to the transition with the maximum value of the difference $\Delta(\Delta\theta)$ stored at the predetermined location in the RAM area 9c for the zone. In this updating operation, the averaging processing described previously can be carried out.

As the tolerance learning process is completed, the operational flow goes on to a step S514 at which the ECU 9 clears the value of the difference $\Delta(\Delta\theta)$ stored at the predetermined location in the RAM area 9c to a zero in order to carry out a tolerance learning process for the new zone to which the rotational speed has transited. The operational flow then proceeds to a step S515 at which the ECU 9 puts the flag indicating that the tolerance learning process is being executed into a set state, the default state thereof.

The operational flow then goes on to a step S516 to check whether or not the tolerance learning-process completion indicating flag indicative of the completion of the tolerance learning process for the zone being learned, that is, for the zone prior to the transition has been set. If the flag has been set, the operational flow continues to steps S517 and S518 at which the ECU 9 carries out processing to correct the misfire criterion value. If the flag has not been set, on the other hand, this routine is ended, bypassing the processing to correct the misfire criterion value of the steps S517 and S518.

In the processing to correct the misfire criterion value, first of all, at the step S517, an offset REFofs to be added to the misfire criterion value REF120 is computed from the difference $\Delta(\Delta\theta)$ for the zone by using Eq. (22) as follows:

$$REFofs = Kofs \times \Delta(\Delta\theta) \times \text{Rotational speed} \tag{22}$$

As expressed by the above equation, the angle (rad) of the learned value of a tolerance $\Delta(\Delta\theta)$ is transformed into a change in angular speed (rad/sec). The coefficient Kofs used in the above equation is a transformation coefficient for transforming the learned value of a tolerance $\Delta(\Delta\theta)$ into a quantity having the same dimension as the misfire criterion value REF120.

After calculating the offset REFofs, the operational flow finally goes on to a step S518 at which the ECU 9 adds the calculated offset REFofs to the misfire criterion value REF, REF120 in this case, before ending this routine.

By carrying out such a tolerance learning-process control for every ignition in the internal combustion engine, the deviation in angular speed determined by the maximum value (the learned value of the tolerance) of the difference between the learned value of interpolated value measured for each zone and the real tolerance is found separately. The deviation in angular speed found in this way is then added to the misfire criterion value REF120 as the offset REFofs.

As a result, even if a peculiar point described earlier appears in the deviation in crank angle (or the real tolerance) $\Delta\theta$, that is, even if an increase caused by a peculiar point is observed in the difference in crank-angular difference $\Delta(\Delta\omega)$ n−1 to be compared with the misfire criterion value REF120, an offset REFofs corresponding to the increase in difference in crank-angular difference is added to the misfire criterion value REF120, preventing an incorrect misfire determination caused by the peculiar point from being made.

According to the tolerance learning-process control routine, the tolerance learning process is carried out in zone units, allowing the increase in required memory capacity to be reduced to a minimum.

As described above, in the case of the misfire detecting apparatus according to the present embodiment, the offset REFofs is added to the misfire criterion value REF120 as a countermeasure against effects caused by a peculiar point. It should be noted, however, that the offset REFofs can of course be subtracted from the difference in difference $\Delta(\Delta\omega)$ n−1 to be compared in the main routine as a countermeasure against effects caused by the peculiar point.

The learned value of the tolerance does not have to be a variation from a deviation (or a tolerance in crank angle between cylinders). A value equivalent to a variation from a deviation (or a tolerance in crank angle between cylinders) can also be used. For example, values such as a deviation in angular speed or a variation in such deviation can be used as well.

(Fifth Embodiment)

In the case of any of the embodiments described so far, as elements for properly examining the conditions for the execution of the learning process, a signal output by the air-fuel ratio sensor, that is, the oxygen ($O_2$) sensor or the linear air-fuel ratio sensor, and the air-fuel ratio correction coefficient used in the feedback (F/B) control based on the air-fuel ratio are referenced. As is also obvious from details of the examination shown in FIG. 10, however, the occurrence of a misfire in the internal combustion engine can also be detected directly from the signal output by the air-fuel ratio sensor and the air-fuel ratio correction coefficient used in the feedback (F/B) control based on the air-fuel ratio.

Only the routine shown in FIG. 10 for making a determination as to whether the internal combustion engine is normally ignited can be used as a substitute for a means for detecting the occurrence of a misfire by using a difference in angular-speed variance observed by the misfire detecting apparatuses according to the embodiments described so far. Even in this case, the selection of check items or their combinations is arbitrary. Check items can be selected and combinations of check items can be determined with a relatively high degree of freedom in accordance with the size of the system to be examined.

The arbitrarily selected and combined misfire detecting techniques can be adopted in conjunction with methods other than the misfire detecting techniques embraced by the misfire detecting apparatuses according to the embodiments described so far. The combination of methods can further increase the accuracy of misfire detection.

In the check routine illustrated In FIG. 10, three techniques for checking consecutive misfires occurring in a row in cylinders operationally separated from each other by 360° CA are shown. The check routine can be modified by showing the processing at the step S311 thereof as the step S311' of FIG. 21.

Figure 21:
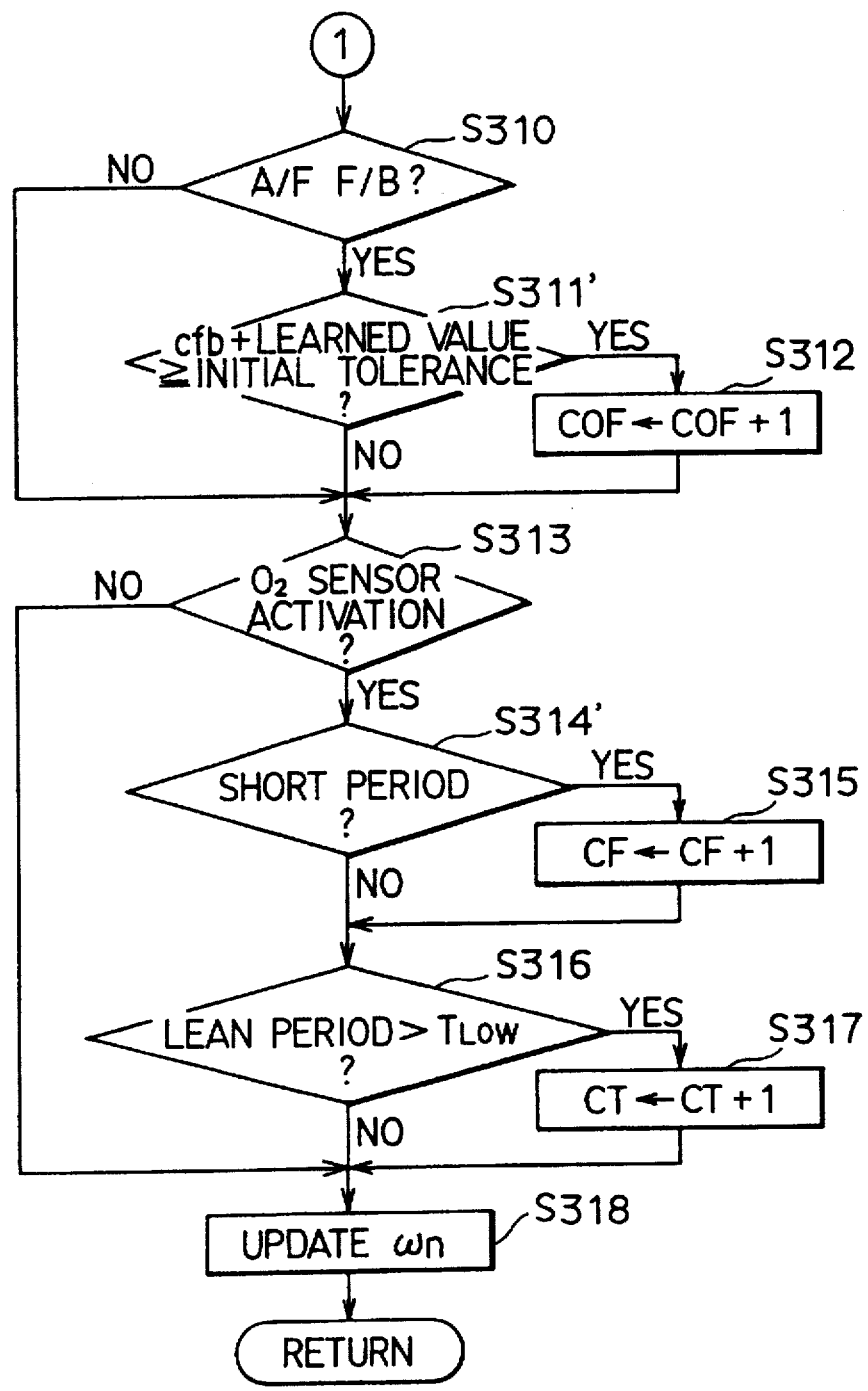
FIG. 21 is a flowchart of a check routine for checking conditions for executing a tolerance learning process according to a fifth embodiment of the present invention.

In the check routine shown in FIG. 10, the sum of the air-fuel ratio feedback correction coefficients cfb and their average value cfbAV is compared with an initial tolerance to detect the occurrence of a misfire. As an alternative, the sum of the air-fuel ratio feedback correction coefficient cfb and a learned value of the air-fuel ratio feedback correction coefficient cfb can be compared with an initial tolerance to detect the occurrence of a misfire as shown in FIG. 21.

According to the processing carried out at the step S314 of the check routine shown in FIG. 10, a misfire is determined to have occurred if the amplitude period of the oxygen (O$_2$) sensor is found shorter than an amplitude period Fs set in advance for normal ignitions. In the case of the processing carried out at the step S314' of the check routine shown in FIG. 21, on the other hand, instead of setting only the lower limit of the criterion value Fs, a predetermined range of the amplitude period is set and, if the amplitude period of the oxygen (O$_2$) sensor is outside the range, a misfire is determined to have occurred. By setting the predetermined range as such, misfires shown in FIG. 12 can also be detected in addition to misfires shown in FIG. 11.

It should be noted that, in addition to the embodiments described so far, the present invention can also be implemented as the following embodiments.

(1) In each of the embodiments described so far, the 720° –CA differential technique, the 360° –CA differential technique and the 120° –CA differential technique are adopted in the misfire detecting apparatus of the six cylinder internal combustion engine. It should be noted, however, that another technique can also be adopted. For example, in the six cylinder internal combustion engine, a plurality of combinations of 240° –CA and 480° –CA techniques can also be adopted. In addition, in the case of an internal combustion engine with an odd number of cylinders, five cylinders for example, typically, a 720° –CA differential technique and a 144° –CA differential technique (or a 288° –CA differential technique) are used for implementing detection of misfires. In short, any configuration will work as long as, in the configuration:

a plurality of cylinder pairs are formed with each cylinder pair comprising two operationally consecutive cylinders separated from each other by a unit, a smallest unit resulting from division of a crank angle by which the crankshaft rotates for accomplishing one combustion cycle of the multi-cylinder internal combustion engine by the number of cylinders employed in the multi-cylinder internal combustion engine;

a plurality of combinations of cylinder pairs are formed with each combination of cylinder pairs comprising two of the cylinder pairs operationally separated from each other by a multiple of units;

an angular-speed variance between two cylinders in a cylinder pair is computed for each cylinder pair; and a difference in angular-speed variance between two cylinder pairs in a combination of cylinder pairs is computed for each combination of cylinder pairs and compared with a predetermined misfire criterion value.

In addition, a difference in angular-speed variance between two cylinder pairs operationally separated from each other by a crank angle equal to a multiple of 720° CA is calculated by using a substitute differential technique replacing the 720° –CA differential technique, the first differential technique adopted in the embodiments described so far. A typical substitute technique is a 1440° –CA differential technique. A difference in angular-speed variance between two cylinder pairs operationally separated from each other by a crank angle equal to an odd multiple of 360° CA by using another substitute differential technique replacing the 360° –CA differential technique, the second differential technique adopted in the embodiments described so far. An example of the other substitute technique is a 1080° –CA differential technique. With the substitute differential techniques, it is also possible to achieve the object of the present invention to detect all misfire patterns generated in the internal combustion engine with a high degree of efficiency as is the case with the embodiments described so far.

(2) In the calculation of a total of final misfire counts, at the step S118 of the first embodiment shown in FIG. 5, the contents of the counters CMIS720, CMIS360 and CMIS120 are added up. As an alternative, the largest value MAX among the contents of the counters CMIS720, CMIS360 and CMIS120 can also be used as the final number of misfires. Instead of using fixed means for finding the final number of misfires, the means can be changed arbitrarily.

(3) In the embodiments described so far, when the 360° –CA differential technique and the 120° –CA differential technique are used for detecting only consecutive misfires, an averaging process can be carried out for each cylinder for reducing variations and, thus, increasing the detection accuracy. To put it concretely, an averaged value dwn-1360 for the difference in angular-speed variance between pairs of cylinders $\Delta(\Delta\omega)$n–1360 is calculated by using Eq. (23) from the difference in angular-speed variance between pairs of cylinders $\Delta(\Delta\omega)$n–1360 computed by means of the 360° –CA differential technique. An averaged value dwn–13120 for the difference in angular-speed variance between pairs of cylinders $\Delta(\Delta\omega)$n–13120 is calculated by using Eq. (24) from the difference in angular-speed variance between pairs of cylinders $\Delta(\Delta\omega)$n–1120 computed by means of the 120° –CA differential technique as follows.

$$d\omega n-1360=\{(k-1)\times d\omega n360+\Delta(\Delta\omega)n-1360/k \quad (23)$$

$$d\omega n - 1120 = \{(k-1) \times d\omega n 120 + \Delta(\Delta\omega)n - 1120/k \quad (24)$$

where notation dwn360 is an averaged value for the nth cylinder obtained in the previous averaging operation. Notation k is a constant which desirably has a value of the nth power of 2. Typically, k is 8 (for n=3), a desirable value in the computer processing. The averaging process allows a difference in angular speed for a normally operating cylinder to be distinguished from a difference in angular speed for a cylinder in which consecutive misfires have occurred in a row. As a result, the occurrence of a misfire can be detected with ease. It should be noted that, in this case, an intermittent misfire can not be detected any more. For this reason, if at the present time, a state of consecutive misfires is not detected by the consecutive-misfire determination, the determination using the method for detecting consecutive misfires can be disabled.

(4) When an averaging process of the difference in angular-speed variance $\Delta(\Delta\omega)$ between pairs of cylinders is carried out for each cylinder in the event of misfires, an averaging process can be carried out at the same time also on the criterion-value level. In this way, it is possible to avoid incorrect detection due to a lagging updating operation caused by the averaging process accompanying an abrupt change in operating condition. In addition, the averaging process carried out on the difference in angular-speed variance $\Delta(\Delta\omega)$ and the criterion-value level can be varied in accordance with the rotation range of the internal combustion engine.

(5) In the event of detected consecutive misfires, if the number of cylinders in which the occurrence of consecutive misfires has been detected is within a predetermined range of the cylinder count, the detection of the misfires is validated. If the number of cylinders in which the occurrence of consecutive misfires has been detected is not within the predetermined range of the cylinder count, on the other hand, the detection of the misfires is invalidated. For example, if the occurrence of consecutive misfires has been detected in three or more cylinders out of six during the misfire determination for each cylinder, the detection of the misfires is finally validated and the warning lamp is turned on.

(6) In addition, in the embodiments described so far, the difference $\Delta\theta n$ is learned as a deviation in rotational angular speed for each operating condition. It should be noted, however, that the learned value does not have to be the difference $\Delta\theta n$. For example, the deviation (cylinder tolerance) time $\Delta\theta n$ which is used for finding the difference $\Delta\theta n$ can also be learned as an equivalent value to the difference $\Delta\theta n$.

(7) The embodiments described so far each provide a misfire detecting apparatus for a four-cycle (stroke) internal combustion engine. It should be noted, however, that the present invention can also be applied to a two-cycle internal combustion engine. In the case of a two-cycle internal combustion engine, the operation is treated with the crank angle required for one combustion cycle being 360° CA.

(Sixth Embodiment)

In the embodiments described so far, the misfire determination segment in which the difference in rotational speed is computed is fixed. It should be noted, however, that the misfire determination segment can be changed. In the case of a sixth embodiment described below, the misfire determination segment is divided into a low-rotation zone and a high-rotation zone of the internal combustion engine. The sixth embodiment is explained by referring to FIGS. 22 to 24. It should be noted that the sixth embodiment provides a misfire detecting apparatus for a four cylinder internal combustion engine. In addition, explanation of portions of the misfire detecting apparatus which are identical with those of the first to fifth embodiments is omitted. Only processing to compute the difference in rotational speed which is different from those of the first to fifth embodiments is described in detail.

In the case of the present embodiment, the misfire determination segment is divided typically by the rotational speed 5,000 rpm into low-rotation and high-rotation zones. In the low-rotation zone, the misfire determination segment starts from 145° CA ATDC and the angular width of the misfire determination segment is set at 90° CA. In the high-rotation zone, on the other hand, in comparison with the low-rotation zone, the position (that is, the crank angle) of the lowest point of the decreased internal combustion engine rotational speed after the occurrence of a misfire is shifted to the lean side and, at the same time, increases and decreases in internal combustion engine rotational speed after the occurrence of a misfire lag behind the change in crank angle, resulting an all but flat characteristic in the neighborhood of the lowest point. For this reason, the misfire determination segment in the high-rotation zone is set to lag behind that in the low-rotation zone by 30° CA. To be more specific, the misfire determination segment is shifted to start from 175° CA ATDC with the angular width thereof set at 120° CA.

The time duration TMF0 of the misfire determination segment is calculated by summing up gaps of pulses of a signal generated during the misfire determination segment, that is, by counting the number of pulses generated during the time duration TMF0. The time duration TMF0 is then compared with a time duration TMF1 obtained in the immediately previous calculation, that is, a time duration of the misfire determination segment leading ahead of the present one by 180° CA in the case of a four cylinder internal combustion engine in order to calculate the difference DMF between them. In this way, the change in misfire determination segment, that is, the change in rotational speed can be found.

Figure 22:
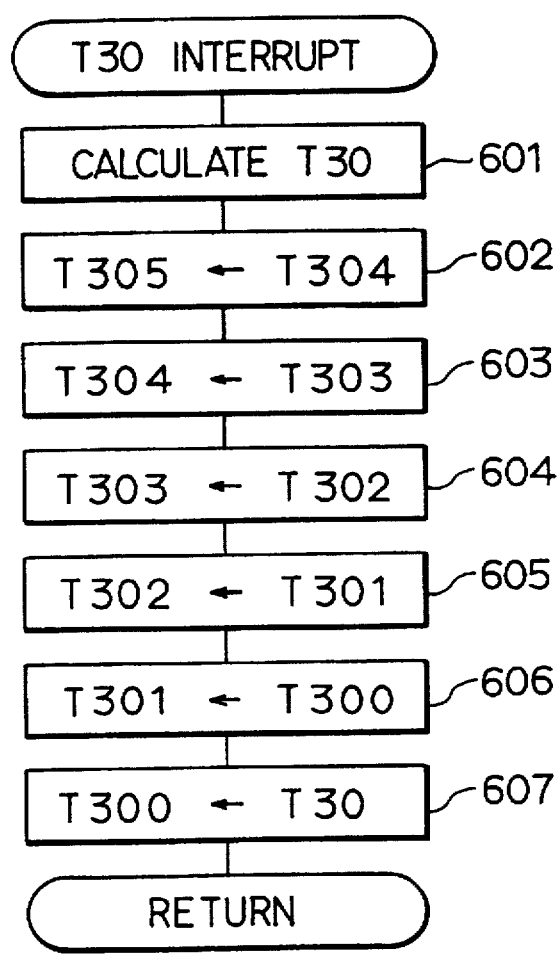
FIG. 22 is a flowchart of an interrupt routine according to a sixth embodiment of the present invention.
Figure 23:
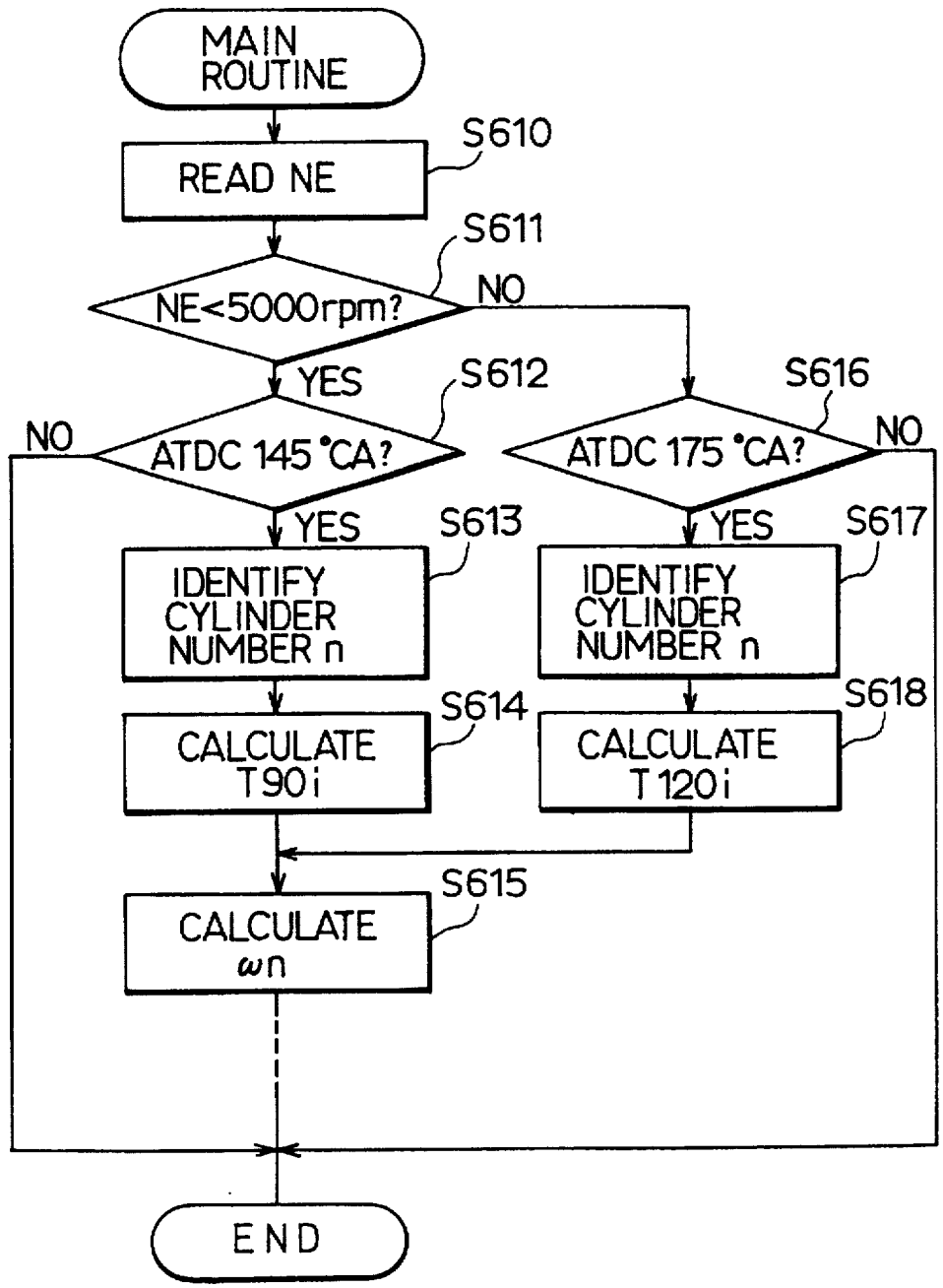
FIG. 23 iws a flowchart of a main routine according to the sixth embodiment of the present invention.

The processing to calculate the change in rotational speed is carried out by executing a program shown in FIGS. 22 and 23. It should be noted that the processing shown in FIGS. 22 and 23 corresponds to the processings carried out at the steps S100 to S104 shown in FIG. 3. The processing shown in FIGS. 22 and 23 is carried out in place of the processings carried out at the steps S100 to S104 shown in FIG. 3.

A T30 interrupt routine shown in FIG. 22 is performed at each falling edge of the signal and executed as an interrupt handler. When this T30 interrupt routine is performed, first of all, at a step S601, the time duration T30 between this falling edge of the signal and the immediately preceding falling edge of the signal, that is, the time required by the crankshaft to rotate 30° CA is calculated. The time required by the crankshaft to rotate 30° CA is referred to hereafter as a 30° –CA time duration.

Then, in the processings carried out at the steps S602 to S607, pieces of data T305 to T300 of the 30° –CA time duration which have been obtained since the invocation at a previous time leading ahead of the present time by 150° CA are successively updated. T300 is the 30° –CA time duration calculated this time and T301 is the 30° –CA time duration leading ahead of T300 by 30° CA while T302 is the 30° –CA time duration leading ahead of T300 by 60° CA and T303 is the 30° –CA time duration leading ahead of T300 by 90° CA. Finally, T304 is the 30° –CA time duration leading ahead of T300 by 120° CA whereas T305 is the 30° –CA time duration leading ahead of T300 by 150° CA. It should be noted that the suffix n of the notation T30n is the number of the crank shown in FIG. 24.

The misfire detection processing shown in FIG. 23 corresponds to the processing starting at the step S101 shown in FIG. 3 for the first embodiment. The routine shown in FIG. 23 is performed on each falling edge of the signal of crank No.0 shown in FIG. 24 and executed as an interrupt handler. When this routine is performed, first of all, at a step S610, the rotational speed NE of the internal combustion engine is read in. The operational flow then goes on to a step S611 at which the ECU 9 checks whether or not the internal combustion engine rotational speed NE is lower than 5,000 rpm, that is, to find out whether the rotational speed NE is in the low-rotation zone or the high-rotation zone. If the internal combustion engine rotational speed NE is found lower than 5,000 rpm (that is, if NE<5,000 rpm), the operational flow proceeds to a step S612 at which the ECU 9 finds out whether or not the current interrupt timing is at 145° CA ATDC from the reference-position signal CYL. If the current interrupt timing is not at 145° CA ATDC, the ECU 9 completes this processing for the time being.

If the current interrupt timing is at 145° CA ATDC, on the other hand, the operational flow continues to a step S614 at which the ECU 9 calculates the time duration T90i of the misfire determination segment in the low-rotation zone by using the following equation:

$$T90i=T304+T303+T302$$

The misfire determination segment in the low-rotation zone is defined as a segment which starts at 145° CA ATDC, ends at 235° CA ATDC and has an angular width of 90° CA. The 30° –CA time durations T304, T303 and T302 found by the T30 interrupt routine shown in FIG. 22 for this segment are summed up to find the time duration T90i of the misfire determination segment in the low-rotation zone. The operational flow then goes on to a step S615 at which the ECU 9 executes thereafter the same processing as that carried out by the first embodiment.

If the internal combustion engine rotational speed NE is found equal to or higher than 5,000 rpm (that is, if NE≧5,000 rpm) at the step S611, on the other hand, the operational flow proceeds to a step S616 at which the ECU 9 finds out whether or not the current interrupt timing is at 175° CA ATDC from the reference-position signal CYL. If the current interrupt timing is not at 175° CA ATDC, the ECU 9 completes this processing for the time being.

In addition, if the current interrupt timing is at 175° CA ATDC, on the other hand, the operational flow continues to a step S617 at which the ECU 9 identifies the number of the cylinder. The operational flow then goes on to a step S618 at which the ECU 9 calculates the time duration T120i of the misfire determination segment in the high-rotation zone by using the following equation:

$$T120i=T303+T302+T301+T300$$

The misfire determination segment in the low-rotation zone is defined as a segment which starts at 175° CA ATDC, ends at 295° ATDC and has an angular width of 120° CA. The 30° –CA time durations T303, T302, T301 and T300 found by the T30 interrupt routine in this segment are summed up to find the time duration T120i of the misfire determination segment in the low-rotation zone. The operational flow then goes on to a step S615 at which the ECU 9 executes thereafter the same processing as that carried out by the first embodiment.

Figure 24:
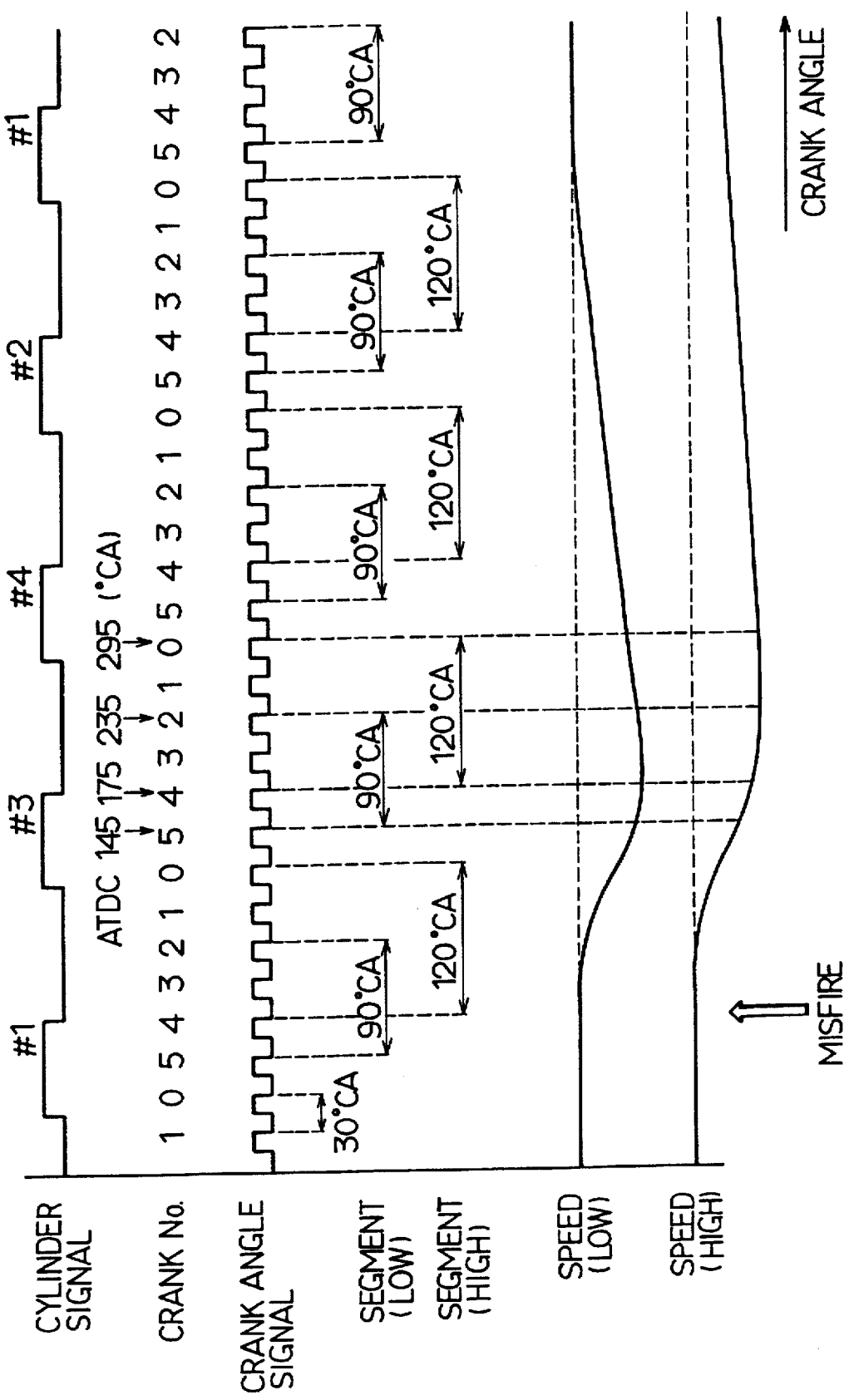
FIG. 24 is a set of timecharts showing operations carried out by the sixth embodiment of the present invention.

As described above, according to the sixth embodiment, both the position and the angular width of the misfire determination segment for the low-rotation zone are made different from those for the high-rotation zone. As shown in FIG. 24, the higher the rotational speed, the more the position (the crank angle) of the lowest point of the decreased rotational speed of the internal combustion engine after the occurrence of a misfire is shifted to the rear side and, the higher the rotational speed, the slower the way in which the rotational speed of the internal combustion engine is restored from the lowest point. In other words, in the low-rotation zone, the increase and decrease in internal combustion engine rotational speed with the crank angle are fast in comparison with those in the high-rotation zone. As a result, by shifting the position of the misfire determination segment to the front side and making the angular width of the misfire determination segment smaller to a certain degree for the low-rotation zone in comparison with those for the high-rotation zone, the difference in rotational speed in a range close to the lowest point can be detected with a high degree of accuracy.

In the case of the high-rotation zone, on the other hand, the position (the crank angle) of the lowest point of the decreased rotational speed of the internal combustion engine after the occurrence of a misfire is shifted to the rear side and, at the same time, the increase and decrease in internal combustion engine rotational speed with the crank angle after the occurrence of a misfire become slower, resulting in an all but flat characteristic in the neighborhood of the lowest point. As a result, by shifting the position of the misfire determination segment to the rear side and making the angular width of the misfire determination segment greater to a certain degree for the high-rotation zone, the difference in rotational speed can be detected with a high degree of accuracy. Since the pulse gap (time) of the crank signal is smaller in the high-rotation zone, by making the angular width of the misfire determination segment greater to a certain degree, merits can be gained from the time-measurement-accuracy point of view and the misfire detection becomes less prone to effects of a transient variation in rotational speed due to external causes.

As described above, in the case of the sixth embodiment, both the position and the angular width of the misfire determination segment are changed by taking variations in rotation into consideration in accordance with such rotation zones. As a result, the accuracy of detection of variations in rotation over the entire rotation zone can be increased, resulting in an enhanced detection accuracy of the occurrence of a misfire. It should be noted that only the position of the misfire detection segment can be changed in accordance with the rotational speed of the internal combustion engine without varying the angular width of the misfire detection segment. Even in this case, the original object of the present invention can be achieved sufficiently.

The boundary between the low-rotation and high-rotation zones is set at 5,000 rpm. It should be noted, however, that the boundary does not have to be at 5,000 rpm. For example, the boundary can be set at 5,500, 4,500, 4,000 or 3,500 rpm. The rotation region can be divided into three or more zones which each have a unique position and a unique angular width of the misfire determination segment. As an alternative, the rotation region can also be divided into a plurality of zones which each have a unique position but a uniform angular width of the misfire determination segment.

In the case of the present embodiment, the pulse of the signal is generated at 30° –CA intervals. It should be noted that, the interval does not have to be 30° CA. For example, the interval can be 15° CA.

Other modifications are also possible without departing from the spirit of the invention.

What is claimed is:

1. A misfire detection apparatus for a multi-cylinder internal combustion engine, said apparatus comprising:

means for outputting a signal representing rotation of a crankshaft of said multi-cylinder internal combustion engine;

means for calculating a rotational speed of each cylinder from said signal; and a misfire detecting means for finding a difference in rotational-speed variance defined as a difference in rotational speed between a pair of cylinders to detect a misfire occurring in said multi-cylinder internal combustion engine, wherein the improvement comprises:

a difference calculating means for calculating a difference in rotational-speed variance between cylinder pairs in each of a plurality of combinations of cylinder pairs operationally separated from each other by a multiple of smallest units which are each defined by division of a crank angle required by each cylinder for accomplishing one combustion cycle by the number of cylinders of said multicylinder internal combustion engine; and a comparison means for comparing said difference in rotational-speed variance with a predetermined misfire criterion value for each of said combinations of cylinder pairs.

2. A misfire detection apparatus as in claim 1 wherein said difference calculating means performs at least two of the following three steps:

(a) calculating a difference in rotational-speed variance for a combination of cylinder pairs operationally separated from each other by a multiple of 720° crank angles;

(b) calculating a difference in rotational-speed variance for a combination of cylinder pairs operationally separated from each other by an odd multiple of 360° crank angles; and (c) calculating a difference in rotational-speed variance for a combination of cylinder pairs operationally separated from each other by a multiple of said smallest units excluding a multiple of 360° crank angles.

3. A misfire detecting apparatus as in claim 2 wherein:

said steps (a), (b) and (c) are implemented independently of each other.

4. A misfire detecting apparatus as in claim 2 wherein:

in case the occurrence of a misfire is detected by any one of said steps (a), (b) or (c), a determination as to whether a misfire has occurred in said multi-cylinder internal combustion engine is not made using other differential calculating methods.

5. A misfire detecting apparatus as in claim 2, further comprising:

a learning means for performing a learning process to find a difference in signal among said cylinders as a learned value, wherein said difference calculating means uses said learned value for calculating a difference in rotational-speed variance by means of said step (c).

6. A misfire detecting apparatus as in claim 5, wherein:

said learning means carries out said learning process only if said multi-cylinder internal combustion engine is found to have ignited normally.

7. A misfire detecting apparatus as in claim 1 wherein:

said misfire detecting means comprises means for calculating a plurality of misfire counts in accordance with comparison results output by said comparison means; and a final misfire determining means for finally making a determination as to whether a misfire has occurred in said multi-cylinder internal combustion engine in accordance with said misfire counts calculated by said calculation means.

8. A misfire detecting apparatus as in claim 7, wherein:

said final misfire determining means determines whether a misfire has occurred in said multi-cylinder internal combustion engine in accordance with a total number of said misfire counts calculated by said calculation means during a predetermined period of time.

9. A misfire detecting apparatus as in claim 7 wherein:

said final misfire determining means determines whether a misfire has occurred in said multi-cylinder internal combustion engine in accordance with a largest number among said misfire counts calculated by said calculation means during a predetermined period of time.

10. A misfire detecting means as in claim 1, wherein:

said misfire detecting means (a) detects a difference in rotational-speed variance from a time required for said crank angle to rotate by a misfire determination crank angle segment having a predetermined angular width, and (b) changes said misfire determination crank angle segment in accordance with the rotational speed of said multi-cylinder internal combustion engine.

11. A misfire detecting apparatus for a multi-cylinder internal combustion engine, said apparatus comprising:

means for outputting a signal representing rotation of a crankshaft of said multi-cylinder internal combustion engine;

means for calculating a rotational speed of each cylinder from said signal; and a misfire detecting means for finding a difference in rotational-speed variance defined as a difference in rotational speed between a pair of cylinders, in order to detect a misfire occurring in said multi-cylinder internal combustion engine, wherein the improvement comprises:

a difference calculating means for calculating a difference in rotational-speed variance between cylinder pairs in each of a plurality of combinations of cylinder pairs operationally separated from each other by a multiple of smallest units which are each defined by division of a crank angle required by each cylinder for accomplishing one combustion cycle by the number of cylinders of said multi-cylinder internal combustion engine; and a comparison means for comparing said difference in rotational-speed variance with a predetermined misfire criterion value for each of said combinations of cylinder pairs, wherein said difference calculating means performs at least two of the following three steps:

(a) calculating a difference in rotational-speed variance for a combination of cylinder pairs operationally separated from each other by a multiple of 720° crank angles;

(b) calculating a difference in rotational-speed variance for a combination of cylinder pairs operationally separated from each other by an odd multiple of 360° crank angles; and (c) calculating a difference in rotational-speed variance for a combination of cylinder pairs operationally separated from each other by a multiple of said smallest units excluding a multiple of 360° crank angles; and wherein highest, intermediate and lowest priorities are assigned to said steps (a), (b) and (c) respectively.

12. A misfire detecting apparatus for an internal combustion engine said apparatus comprising:

means for outputting a signal representing rotation of a crankshaft of said internal combustion engine;

means for calculating the rotational speed of each cylinder from said signal; and a misfire detecting means for finding a difference in rotational-speed variance defined as a difference in crank-shaft rotational speed between a pair of cylinders to detect a misfire occurring in said internal combustion engine by comparison of said difference in rotational-speed variance with a predetermined misfire criterion value;

wherein the improvement comprises:

a learning means for performing a learning process to obtain a learned value for said difference in rotational-speed variance;

a correction means for correcting said predetermined misfire criterion value or said difference in rotational-speed variance prior to comparison with said predetermined misfire criterion value by using said learned value obtained under a relevant operating condition prevailing at that time, wherein said learning means performs said learning process only if said internal combustion engine is found to have ignited normally with a high degree of certainty, an air-fuel ratio sensor for detecting an air-fuel ratio from an oxygen concentration of gas exhausted by said internal combustion engine; and a feedback control means which uses an air-fuel ratio for performing feedback control on the amount of fuel injected to said internal combustion engine by using air-fuel ratio correction coefficients to obtain a desired air-fuel ratio, which feedback control is based on a signal output by said air-fuel ratio sensor, wherein said learning means includes a tentative determination means for making a tentative determination as to whether said internal combustion engine has been ignited normally by examining whether a sum of said air-fuel ratio correction coefficients and an average value of said air-fuel ratio correction coefficients or a sum of said air-fuel ratio correction coefficients and learned values of said air-fuel ratio correction coefficients is leaner than a predetermined value during execution of said feedback control by said feedback control means based on said air-fuel ratio.

13. A misfire detecting apparatus for an internal combustion engine, said apparatus comprising:

means for outputting a signal representing rotation of a crankshaft of said internal combustion engine;

means for calculating the rotational speed of each cylinder from said signal; and a misfire detecting means for finding a difference in rotational-speed variance defined as a difference in crank-shaft rotational speed between a pair of cylinders to detect a misfire occurring in said internal combustion engine by comparison of said difference in rotational-speed variance with a predetermined misfire criterion value;

wherein the improvement comprises:

a learning means for performing a learning process to obtain a learned value for said difference in rotational-speed variance for each of plural operating conditions of said engine; and a correction means for correcting said predetermined misfire criterion value or said difference in rotational-speed variance prior to comparison with said predetermined misfire criterion value by using said learned value obtained under a relevant operating condition prevailing at that time, wherein said learning means performs said learning process only if said internal combustion engine is found to have ignited normally with a high degree of certainty.

14. A misfire detecting apparatus as in claim 13, wherein:

said learning means detects a difference in crank-shaft rotation angle between cylinders and performs a learning process to obtain a learned value of said difference in crank-shaft rotation angle between cylinders for each cylinder and each operating condition of said internal combustion engine; and said correction means corrects said difference in crank-shaft rotation angle between cylinders by using said learned value obtained for a relevant cylinder and under a relevant operating condition prevailing at that time in order to find the rotational speed of a crankshaft for said cylinder and calculates said difference in rotational-speed variance from a change in found rotational speed of said crankshaft which difference in rotational-speed variance is to be compared with said predetermined misfire criterion value.

15. A misfire detecting apparatus as in claim 13, wherein:

said learning means includes a tentative determination means for making a tentative determination as to whether or not said internal combustion engine has been ignited normally which tentative determination is based on said difference in crankshaft rotational speed between cylinders found from said signal and a tentative-misfire criterion value.

16. A misfire detecting apparatus as in claim 15, wherein:

said tentative determination means compares a difference in rotational-speed variation between cylinder pairs operationally separated from each other by an odd multiple of 360° crank angle with said tentative misfire criterion value in order to make a determination as to whether or not said internal combustion engine has been ignited normally.

17. A misfire detecting apparatus as in claim 13, wherein:

said correction means includes a difference correcting means for (a) measuring a variance between a learned value produced by said learning means and said difference in rotational-speed variance and (b) correcting said misfire criterion value or said difference in rotational-speed variance to be compared with said misfire criterion value in accordance with said measured variance.

18. A misfire detecting apparatus as in claim 17, wherein:

said difference correcting means learns a greatest variance between said learned value produced by said learning means and said difference in rotational-speed variance for each operating condition of said internal combustion engine in measurement of said variance.

19. A misfire detecting means as in claim 13, wherein:

said misfire detecting means detects a difference in crankshaft rotational speed from a time required by said crankshaft to rotate by a misfire determination crank angle segment having a predetermined crank angular width and changes said misfire determination crank angle segment in accordance with the rotational speed of said internal combustion engine.

20. A misfire detecting apparatus for an internal combustion engine, said apparatus comprising:

means for outputting a signal representing rotation of crankshaft of said internal combustion engine;

means for calculating the rotational speed of each cylinder from said signal; and a misfire detecting means for finding a difference in rotational-speed variance defined as a difference in crank-shaft rotational speed between a pair of cylinders to detect a misfire occurring in said internal combustion engine by comparison of said difference in rotational-speed variance with a predetermined misfire criterion value;

wherein the improvement comprises:

a learning means for performing a learning process to obtain a learned value for said difference in rotational-speed variance;

a correction means for correcting said predetermined misfire criterion value or said difference in rotational-speed variance prior to comparison with said predetermined misfire criterion value by using said learned value obtained under a relevant operating condition prevailing at that time, wherein said learning means performs said learning process only if said internal combustion engine is found to have ignited normally with a high degree of certainty, a linear air-fuel ratio sensor for linearly detecting an air-fuel ratio from gas exhausted by said internal combustion engine, wherein said learning means includes a tentative determination means for making a tentative determination as to whether said internal combustion engine has been ignited normally by examining whether a signal output by said linear air-fuel ratio sensor is leaner than a predetermined value.

21. A misfire detecting apparatus for an internal combustion engine, said apparatus comprising:

means for outputting a signal representing rotation of a crankshaft of said internal combustion engine;

means for calculating the rotational speed of each cylinder from said signal; and a misfire detecting means for finding a difference in rotational-speed variance defined as a difference in crank-shaft rotational speed between a pair of cylinders to detect a misfire occurring in said internal combustion engine by comparison of said difference in rotational-speed variance with a predetermined misfire criterion value;

wherein the improvement comprises:

a learning means for performing a learning process to obtain a learned value for said difference in rotational-speed variance;

a correction means for correcting said predetermined misfire criterion value or said difference in rotational-speed variance prior to comparison with said predetermined misfire criterion value by using said learned value obtained under a relevant operating condition prevailing at that time, wherein said learning means performs said learning process only if said internal combustion engine is found to have ignited normally with a high degree of certainty, an air-fuel ratio sensor for detecting an air-fuel ratio from an oxygen concentration of gas exhausted by said internal combustion engine, wherein said learning means includes a tentative determination means for making a tentative determination as to whether said internal combustion engine has been ignited normally by examining whether a signal output by said air-fuel ratio sensor is on a lean side for a period of time longer than a predetermined duration while said air-fuel ratio sensor is being activated.

22. A misfire detecting apparatus for an internal combustion engine, said apparatus comprising:

means for outputting a signal representing rotation of a crankshaft of said internal combustion engine;

means for calculating the rotational speed of each cylinder from said signal; and a misfire detecting means for finding a difference in rotational-speed variance defined as a difference in crank-shaft rotational speed between a pair of cylinders to detect a misfire occurring in said internal combustion engine by comparison of said difference in rotational-speed variance with a predetermined misfire criterion value;

wherein the improvement comprises:

a learning means for performing a learning process to obtain a learned value for said difference in rotational-speed variance;

a correction means for correcting said predetermined misfire criterion value or said difference in rotational-speed variance prior to comparison with said predetermined misfire criterion value by using said learned value obtained under a relevant operating condition prevailing at that time, wherein said learning means performs said learning process only if said internal combustion engine is found to have ignited normally with a high degree of certainty, an air-fuel ratio sensor for detecting rich/lean states of an air-fuel ratio from an oxygen concentration of gas exhausted by said internal combustion engine, wherein said learning means includes a tentative determination means for making a tentative determination as to whether said internal combustion engine has been ignited normally by examining whether a period of a signal output by said air-fuel ratio sensor is within a predetermined range while said air-fuel ratio sensor is being activated.

23. A misfire detecting apparatus for an internal combustion engine, said apparatus comprising:

means for outputting a signal representing rotation of a crankshaft of said internal combustion engine;

means for calculating the rotational speed of each cylinder from said signal; and a misfire detecting means for finding a difference in rotational speed between cylinders in order to detect a misfire occurring in said internal combustion engine from said difference in rotational speed between cylinders, wherein the improvement comprises:

a calculation means for calculating said difference in rotational speed between cylinders from a time required by a crankshaft to rotate by a misfire determination segment having a predetermined crank angular width, and a means for changing said misfire determination segment in accordance with the rotational speed of said internal combustion engine.

24. A misfire detecting apparatus as in claim 23, wherein:

said misfire detecting means further changes the angular width of said misfire determination segment in accordance with the rotational speed of said internal combustion engine.

25. A misfire detecting apparatus as in claim 24, wherein:

said misfire detecting means delays said misfire determination segment by a predetermined crank angle and increases the angular width of said misfire determination segment when the rotational speed of said internal combustion engine becomes equal to or greater than a predetermined value.

26. A misfire detection method for a multi-cylinder internal combustion engine, said method comprising:

generating a signal at predetermined increments of angular crankshaft rotation of said multi-cylinder internal combustion engine;

calculating a rotational speed for each cylinder from said signal;

calculating a rotational speed difference from two of said calculated rotational speeds;

calculating a speed difference-related value between two of said calculated rotational speed differences, for each of a plurality of combinations of cylinder pairs operationally separated from each other by a multiple of a crank rotation unit defined by dividing the crank angle required by each cylinder to accomplish one combustion cycle by the number of cylinders; and comparing each of said speed difference-related values with a corresponding misfire criterion value predetermined for each of said combinations of cylinder pairs.

27. A misfire detection method as in claim 26, wherein said speed difference-related calculating step includes at least two of the following three steps:

(a) calculating a first differential value for a first combination of cylinder pairs operationally separated from each other by a multiple of 720° crank angles;

(b) calculating a second differential value for a second combination of cylinder pairs operationally separated from each other by an odd multiple of 360° crank angles; and (c) calculating a third differential value for a third combination of cylinder pairs operationally separated from each other by said crank rotation unit but excluding a multiple of 360° crank angles.

28. A misfire detection method for a multi-cylinder internal combustion engine, said method comprising:

generating a signal at predetermined increments of angular crankshaft rotation of said multi-cylinder internal combustion engine;

calculating a rotational speed for each cylinder from said signal;

calculating a rotational speed difference from two of said calculated rotational speeds;

calculating a speed difference-related value between two of said calculated rotational speed differences;

comparing said speed difference-related value with a misfire criterion value;

performing a learning process for each of a plurality of engine operating conditions thereby to obtain a learned value for said speed difference-related value, said learning process being carried out only when said internal combustion engine is determined to have been ignited normally; and correcting at least one of said misfire criterion and said speed difference-related value prior to said comparison step by using said learned value obtained under the same engine operating condition.

29. A misfire detecting apparatus as in claim 5, wherein:

said learning means carries out said learning process only if a variation in rotational speed does not occur due to a road-surface condition or another special driving operation.

* * * * *